US012724528B2

(12) United States Patent
Yoshida

(10) Patent No.: US 12,724,528 B2
(45) Date of Patent: Sep. 1, 2026

(54) TACTILE SENSATION PRESENTATION APPARATUS AND TACTILE SENSATION PRESENTATION SYSTEM

(71) Applicant: SONY GROUP CORPORATION, Tokyo (JP)

(72) Inventor: Kentaro Yoshida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/879,268

(22) PCT Filed: Aug. 25, 2022

(86) PCT No.: PCT/JP2022/032058
§ 371 (c)(1),
(2) Date: Dec. 27, 2024

(87) PCT Pub. No.: WO2024/014006
PCT Pub. Date: Jan. 18, 2024

(65) Prior Publication Data

US 2025/0390211 A1 Dec. 25, 2025

(30) Foreign Application Priority Data

Jul. 14, 2022 (JP) ................................ 2022-113221

(51) Int. Cl.
*G06F 3/0488* (2022.01)
*G06F 3/041* (2006.01)

(52) U.S. Cl.
CPC ............ *G06F 3/0488* (2013.01); *G06F 3/041* (2013.01)

(58) Field of Classification Search
CPC ............................... G06F 3/0488; G06F 3/041
See application file for complete search history.

(56) References Cited

U.S. PATENT DOCUMENTS

2012/0286944 A1* 11/2012 Forutanpour ........... G06F 3/016 340/407.1
2014/0092322 A1* 4/2014 Lee ..................... G06F 3/04164 349/12

(Continued)

FOREIGN PATENT DOCUMENTS

JP 2005-530215 A 10/2005
JP 2014-207236 A 10/2014

(Continued)

OTHER PUBLICATIONS

International Search Report and Written Opinion of PCT Application No. PCT/JP2022/032058, issued on Nov. 8, 2022, 10 pages of ISRWO.

*Primary Examiner* — Sahlu Okebato
(74) *Attorney, Agent, or Firm* — CHIP LAW GROUP

(57) ABSTRACT

Provided is a tactile sense presentation apparatus that includes an enclosure section, a plurality of operation sections, and an exposure section. The plurality of operation sections includes a first operation section whose height in a first direction with respect to the enclosure section changes and a second operation section whose height in the first direction with respect to the enclosure section changes. The exposure section includes a first contact portion with which the first operation section makes contact, a second contact portion with which the second operation section makes contact, and a middle portion which is a portion between the first contact portion and the second contact portion, and is deformed along with displacement of the middle portion due to a change in the heights in the first direction of the first operation section and the second operation section.

20 Claims, 45 Drawing Sheets

(56) References Cited

U.S. PATENT DOCUMENTS

2014/0145977 A1* 5/2014 Kang .................... G06F 3/0446
345/173
2015/0338990 A1* 11/2015 Bae ....................... G06F 1/1626
345/173
2024/0252872 A1* 8/2024 Filonzi ................. A63B 21/072

FOREIGN PATENT DOCUMENTS

JP 2016-192229 A 11/2016
WO 2019/044111 A1 3/2019

* cited by examiner 121
131
132
133
Z
X
Y

TACTILE SENSATION PRESENTATION APPARATUS AND TACTILE SENSATION PRESENTATION SYSTEM

CROSS REFERENCE TO RELATED APPLICATIONS

This application is a U.S. National Phase of International Patent Application No. PCT/JP2022/032058 filed on Aug. 25, 2022, which claims priority benefit of Japanese Patent Application No. JP 2022-113221 filed in the Japan Patent Office on Jul. 14, 2022. Each of the above-referenced applications is hereby incorporated herein by reference in its entirety.

TECHNICAL FIELD

The present technology relates to a tactile sense presentation apparatus and a tactile sense presentation system that present a tactile sense to a user.

BACKGROUND ART

A tactile sense presentation apparatus is an apparatus that generates a tactile sense on a member on which a finger or the like of a user touches, and is increasingly used in a field such as VR (virtual reality). Some tactile sense presentation apparatuses actually deform the member on which the finger or the like of the user touches, thereby generating pressure sense stimulation to the user. For example, Patent Literature 1 discloses a system in which a plurality of displacement devices are arranged. The displacement devices are configured to cause fluid to flow into a space covered with an elastic member to expand the elastic member and form a pressure stimulation point.

CITATION LIST

Patent Literature

Patent Literature 1: Japanese Patent Application Laid open No. 2014 207236

DISCLOSURE OF INVENTION

Technical Problem

However, in a tactile sense presentation apparatus with a plurality of pressure stimulation points as described in Patent Literature 1, the pressure stimulation cannot be presented in the middle of the pressure stimulation point, and the pressure stimulation is felt discretely. Therefore, it is difficult to generate a large area pressure stimulation or to move the pressure stimulation.

In view of the circumstances as described above, an object of the present technology is to provide a tactile sense presentation apparatus and a tactile sense presentation system with excellent control of the pressure stimulation.

Solution to Problem

In order to achieve the above described object, the tactile sense presentation apparatus according to an embodiment of the present technology includes an enclosure section, a plurality of operation sections, and an exposure section.

The plurality of operation sections includes a first operation section whose height in a first direction with respect to the enclosure section changes and a second operation section whose height in the first direction with respect to the enclosure section changes.

The exposure section includes a first contact portion with which the first operation section makes contact, a second contact portion with which the second operation section makes contact, and a middle portion which is a portion between the first contact portion and the second contact portion, and is deformed along with displacement of the middle portion due to a change in the heights in the first direction of the first operation section and the second operation section, and the displacement of the middle portion includes a component in the first direction.

The exposure section may include a component in a second direction perpendicular to the first direction in the displacement of the middle portion.

The exposure section may have flexibility.

The enclosure section may have a placement surface that faces the exposure section, on which the plurality of operation sections are placed, and the placement surface may be a concave surface.

At least one of the plurality of operation sections may have a drive section whose height in the first direction is changed by electromagnetic force, and a flexible section placed between the drive section and the exposure section and having flexibility.

At least one of the plurality of operation sections may be filled with fluid, and the height in the first direction may change due to a change in volume or pressure of the fluid.

The tactile sense presentation apparatus may further include a boundary section that is placed between the first operation section and the second operation section and separates the fluid between the first operation section and the second operation section.

The boundary section may connect the enclosure section and the exposure section.

A thickness of a portion of the boundary section connected to the exposure section may be 3 mm or less.

The boundary section may have a bellows structure.

The enclosure section may have a concave portion that accommodates the boundary section when the bellows structure of the boundary section is folded.

The exposure section may have a concave portion that accommodates the boundary section when the bellows structure of the boundary section is folded.

Tensile strength of the exposure section may be greater than tensile strength of the boundary section.

The fluid may be air.

A tactile sense presentation system according to an embodiment of the present technology includes a tactile sense presentation apparatus and a control apparatus.

The tactile sense presentation apparatus includes an enclosure section, a plurality of operation sections including a first operation section whose height in a first direction with respect to the enclosure section changes and a second operation section whose height in the first direction with respect to the enclosure section changes, and an exposure section including a first contact portion with which the first operation section makes contact, a second contact portion with which the second operation section makes contact, and a middle portion which is a portion between the first contact portion and the second contact portion, and which is deformed along with displacement of the middle portion due to a change in the heights in the first direction of the first operation section and the second operation section, wherein the displacement of the middle portion includes a component in the first direction.

The control apparatus determines respective control parameters of the plurality of operation sections based on the respective representative positions of the plurality of operation sections when one of the plurality of operation sections is most distant from the enclosure, the other of the plurality of operation sections is closest to the enclosure, and a position where the exposure section protrudes most is the representative position of the one of the operation sections.

The control apparatus may determine the respective control parameters of the plurality of operation sections based on a presentation position that is a position at which the height in the first direction is to be highest in the exposure section, and the respective representative positions of the plurality of operation sections.

The control apparatus may determine the respective control parameters of the plurality of operation sections based on a distance between the presentation position and the respective representative positions of the plurality of operation sections.

The control apparatus may determine the respective control parameters of the plurality of operation sections based on the presentation position, the respective representative positions of the plurality of operation sections, and an area of a presentation region when the presentation region is a region where the height in the first direction is to be above a certain level in the exposure section.

The control apparatus may determine the respective control parameters of the plurality of operation sections based on a shape of a presentation subject that is a shape of an object to be presented in the exposure section and the respective representative positions of the plurality of operation sections.

The control apparatus may determine the shape of the presentation subject based on a positional relationship between the presentation subject that is a virtual object and the tactile sense presentation apparatus.

MODE(S) FOR CARRYING OUT THE INVENTION

A tactile sense presentation apparatus according to embodiments of the present technology.

[Schematic Configuration of Tactile Sense Presentation Apparatus]

Figure 5:
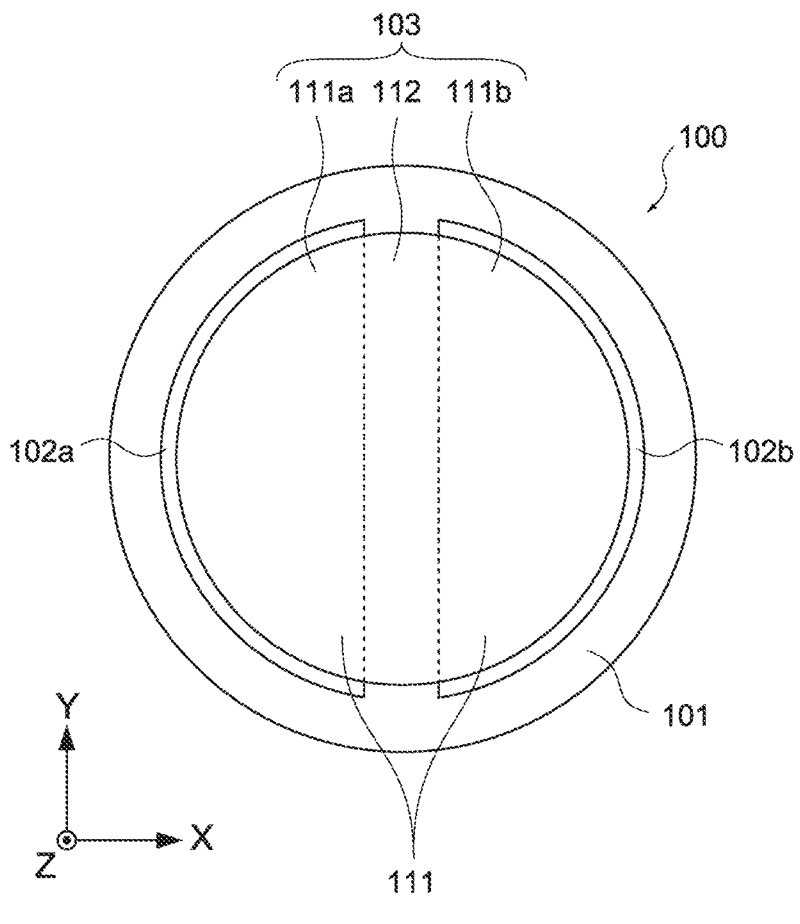
FIG. 5 A cross sectional diagram of the tactile sense presentation apparatus.

FIGS. 1 to 4 are cross sectional diagrams of a tactile sense presentation apparatus 100. FIGS. 1 to 4 show the tactile sense presentation apparatus 100 in different operation states. FIG. 5 is a plan diagram of the tactile sense presentation apparatus 100. As shown in these figures, the tactile sense presentation apparatus 100 has an enclosure section 101, operation sections 102, and an exposure section 103.

The enclosure section 101 supports the operation sections 102. The enclosure section 101 has a placement surface 104 that faces the exposure section 103, on which the operation sections 102 are placed. A shape of the enclosure section 101 is not limited, but has a disc shape, for example, as shown in FIG. 5.

Figure 1:
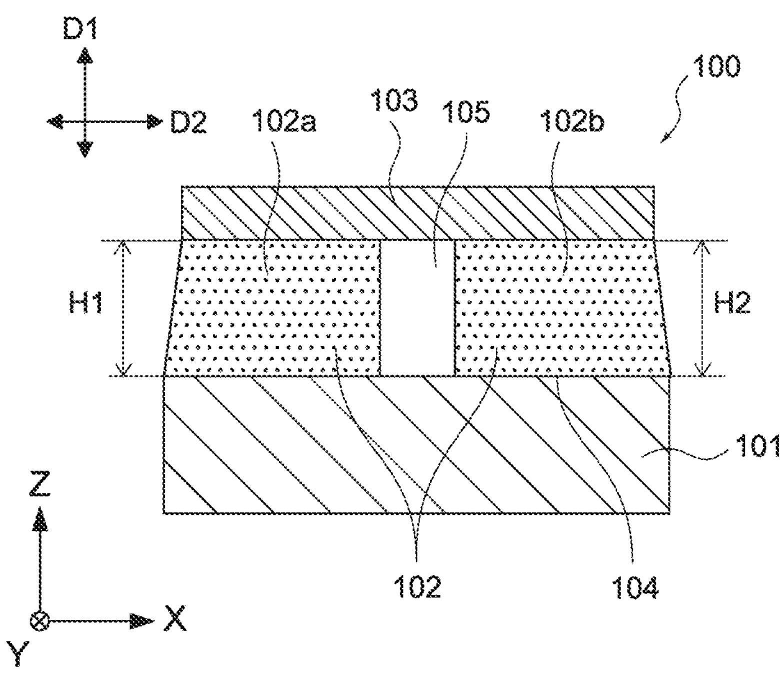
FIG. 1 A cross sectional diagram of a tactile sense presentation apparatus according to an embodiment of the present technology.
Figure 2:
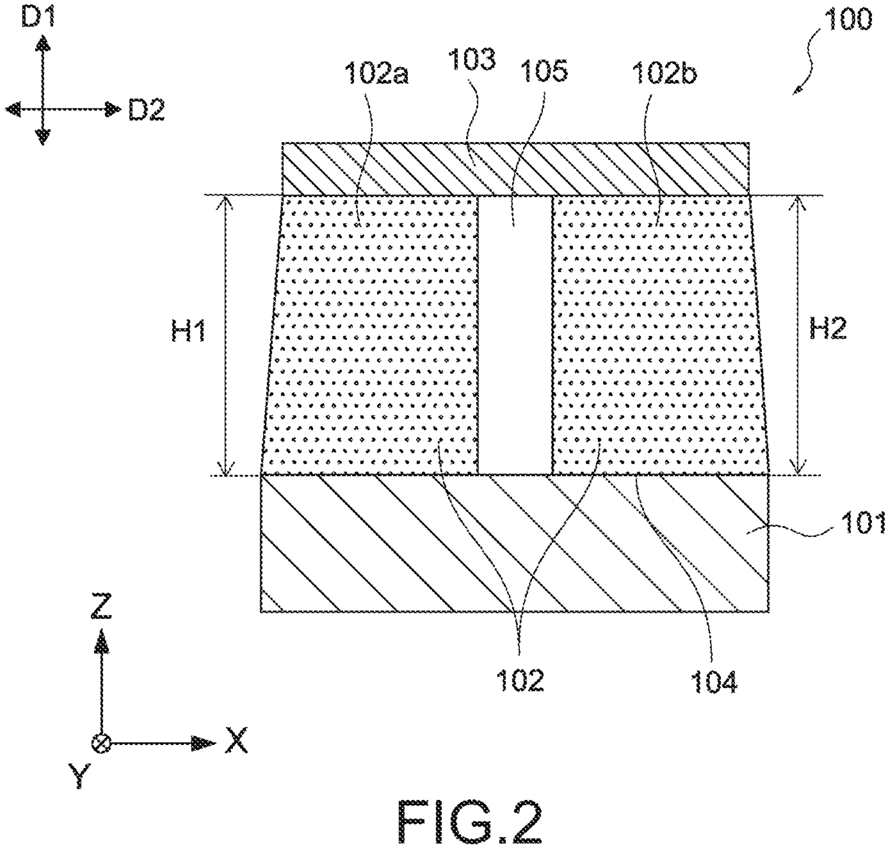
FIG. 2 A cross sectional diagram of the tactile sense presentation apparatus.
Figure 3:
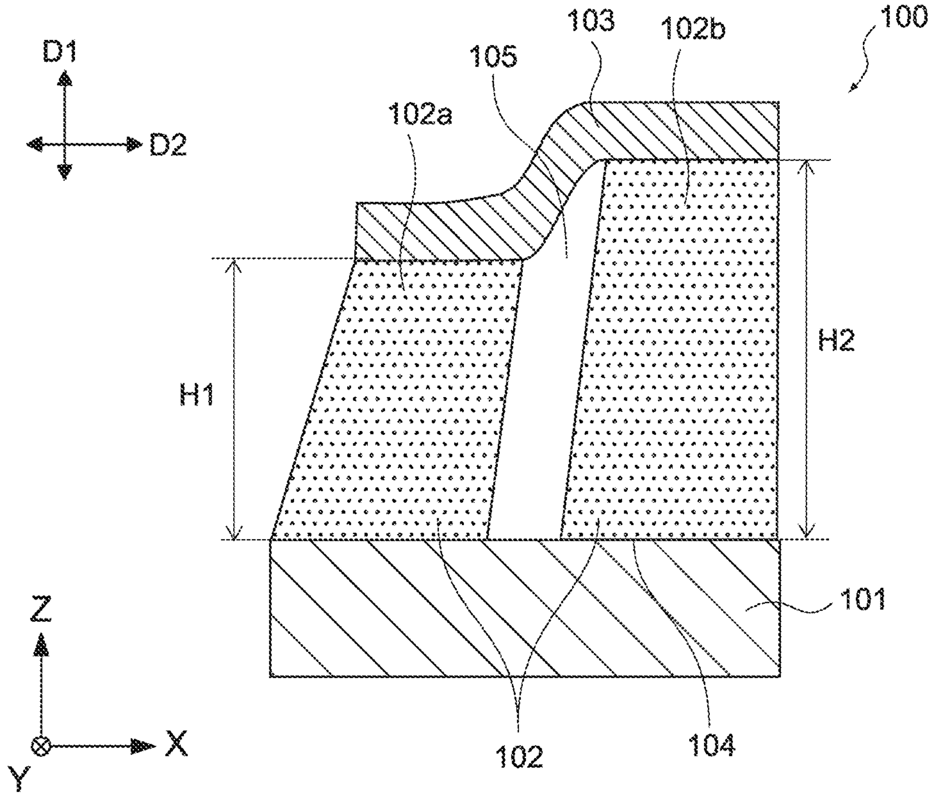
FIG. 3 A cross sectional diagram of the tactile sense presentation apparatus.
Figure 4:
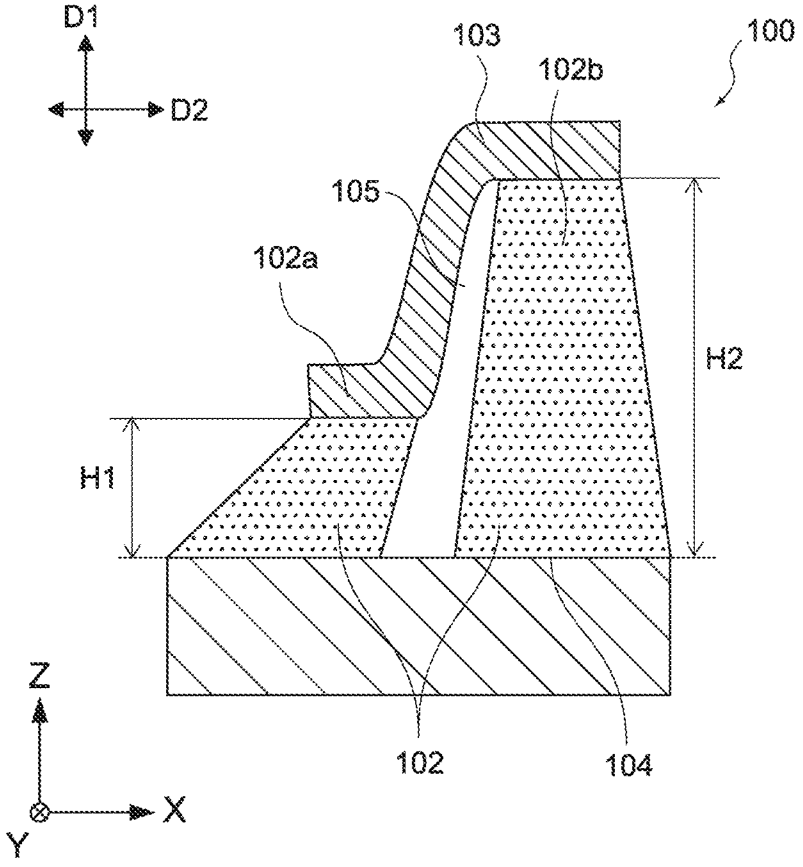
FIG. 4 A cross sectional diagram of the tactile sense presentation apparatus.

The operation sections 102 vary in heights with respect to the enclosure section 101. As shown in FIGS. 1 and 5, the tactile sense presentation apparatus 100 has two operation sections 102. Hereafter, the two operation sections 102 are defined as a first operation section 102*a* and a second operation section 102*b*. A void 105 is provided between each of the operation sections 102.

Each of the operation sections 102 changes its height in a first direction D1 with respect to the enclosure section 101. The first direction D1 is a direction of approaching to and separating from the enclosure section 101. In each figure, the first direction D1 corresponds to the Z direction. A direction perpendicular to the first direction D1 is defined as a second direction D2. In each figure, the second direction D2 is one direction parallel to an X Y plane. In FIGS. 1 to 4, a height of the first operation section 102*a* in the first direction D1 is defined as H1, and a height of the second operation section 102*b* in the first direction D1 is defined as H2. As shown in FIGS. 1 to 4, each of the operation sections 102 changes its height in the first direction D1 independently. A specific configuration of the operation sections 102 is described below.

Figure 6:
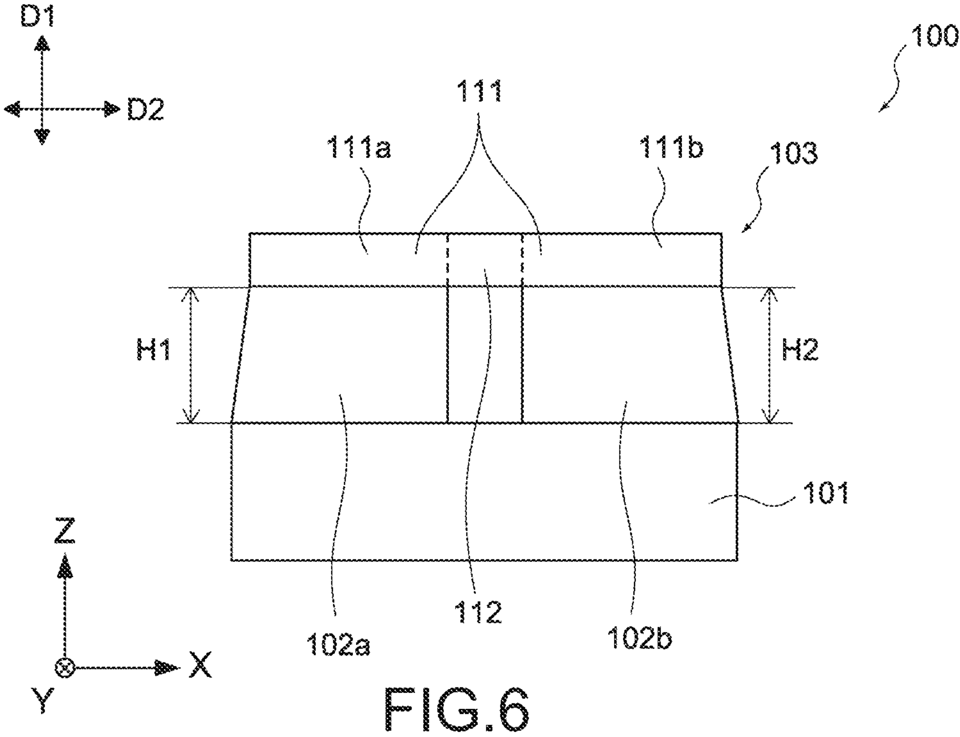
FIG. 6 A schematic diagram showing an exposure section of the tactile sense presentation apparatus.

The exposure section 103 is flexible and deforms passively due to the change in the heights of the operation sections 102. FIG. 6 is a schematic diagram showing the exposure section 103. As shown in FIGS. 5 and 6, the exposure section 103 has contact portions 111 and a middle portion 112. The contact portions 111 are portions of the exposure section 103 with which the operation sections 102 make contact, and the middle portion 112 is a portion between the contact portions 111. Hereinafter, the contact portion 111 with which the first operation section 102*a* makes contact is defined as a first contact portion 111*a*, and the contact portion 111 with which the second operation section 102*b* makes contact is defined as a second contact portion 111*b*. When the exposure section 103 deforms due to the change in the heights of the operation sections 102, it deforms along with displacement of the middle portion 112.

Figure 7:
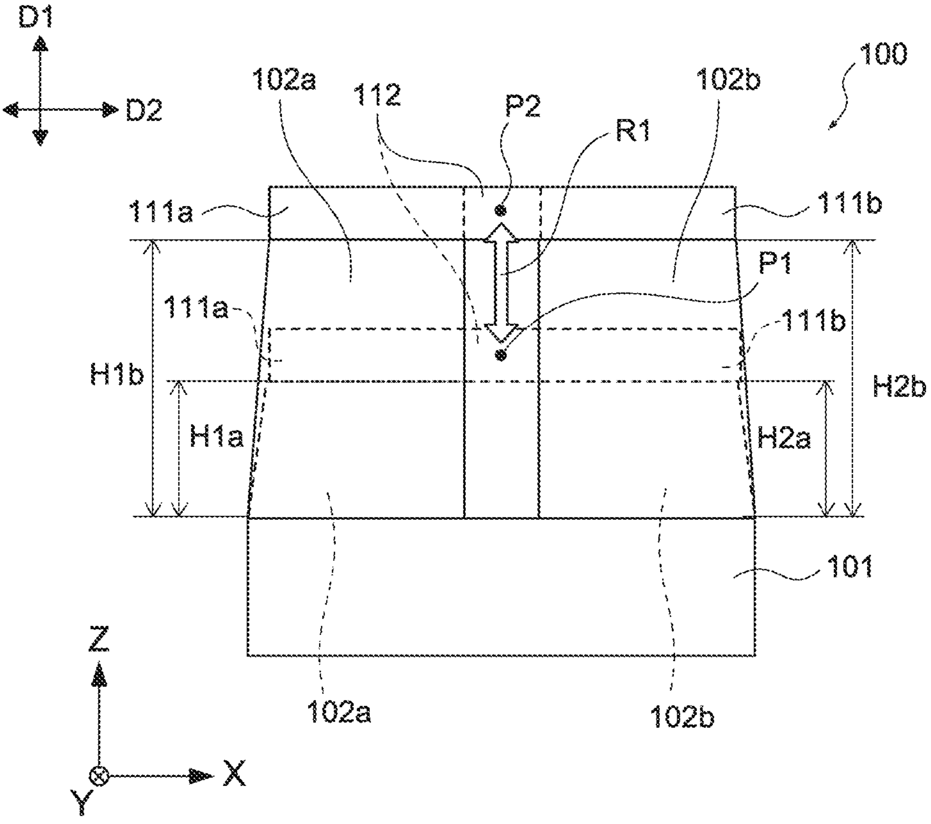
FIG. 7 A schematic diagram showing an operation of the tactile sense presentation apparatus.

FIGS. 7 to 11 are schematic diagrams showing the displacement of the middle portion 112. As shown in FIG. 7, when the height of the first operation section 102*a* is increased from a height Hla to a height H1*b* and the height of the second operation section 102*b* is increased from a height H2*a* to a height H2*b*, a center point P1 of the middle portion 112 moves to a center point P2. The height Hla and the height H2*a* are the same height, and the height H1*b* and the height H2*b* are the same and higher than the height Hla and the height H2*a*. Conversely, when the height of the first operation section 102*a* is decreased from the height H1*b* to the height Hla and the height of the second operation section 102*b* is decreased from the height H2*b* to the height H2*a*, the center point P2 of the middle portion 112 moves to the center point P1. The displacement between the center point P1 and the center point P2 is shown as displacement R1 in FIG. 7. The displacement R1 includes a component in the first direction D1, i.e., the displacement of the middle portion 112 includes a component in the first direction D1.

Figure 8:
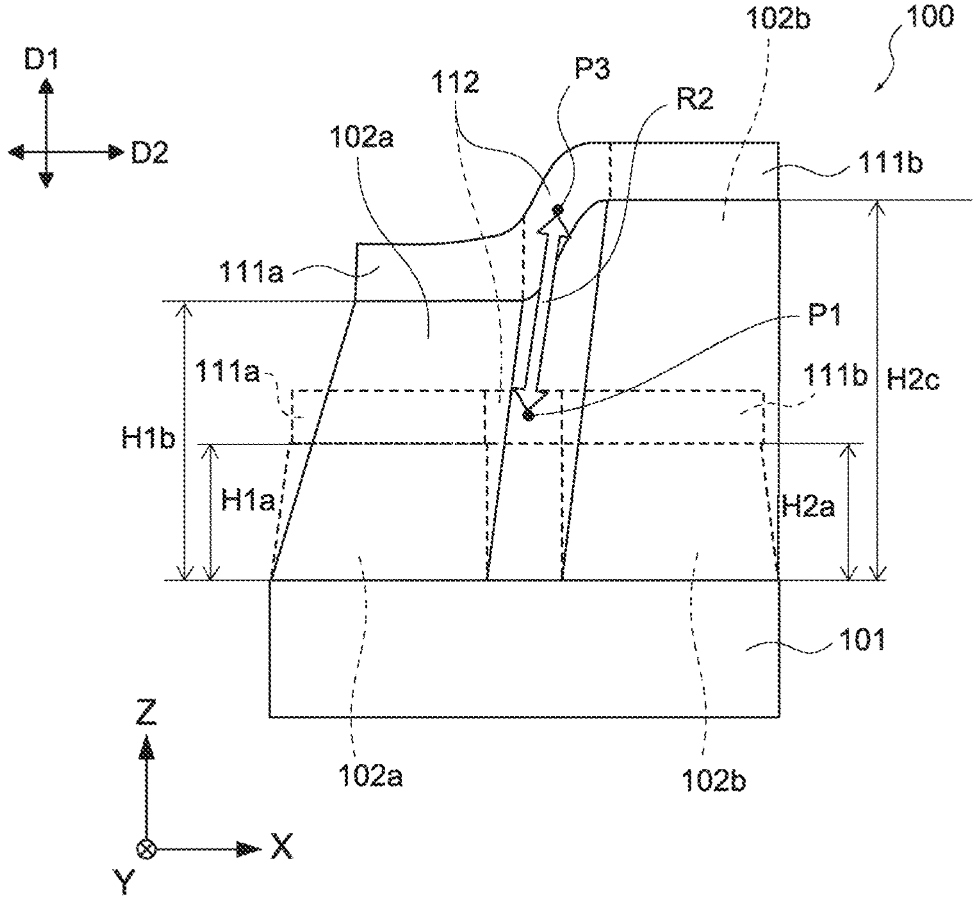
FIG. 8 A schematic diagram showing the operation of the tactile sense presentation apparatus.
Figure 9:
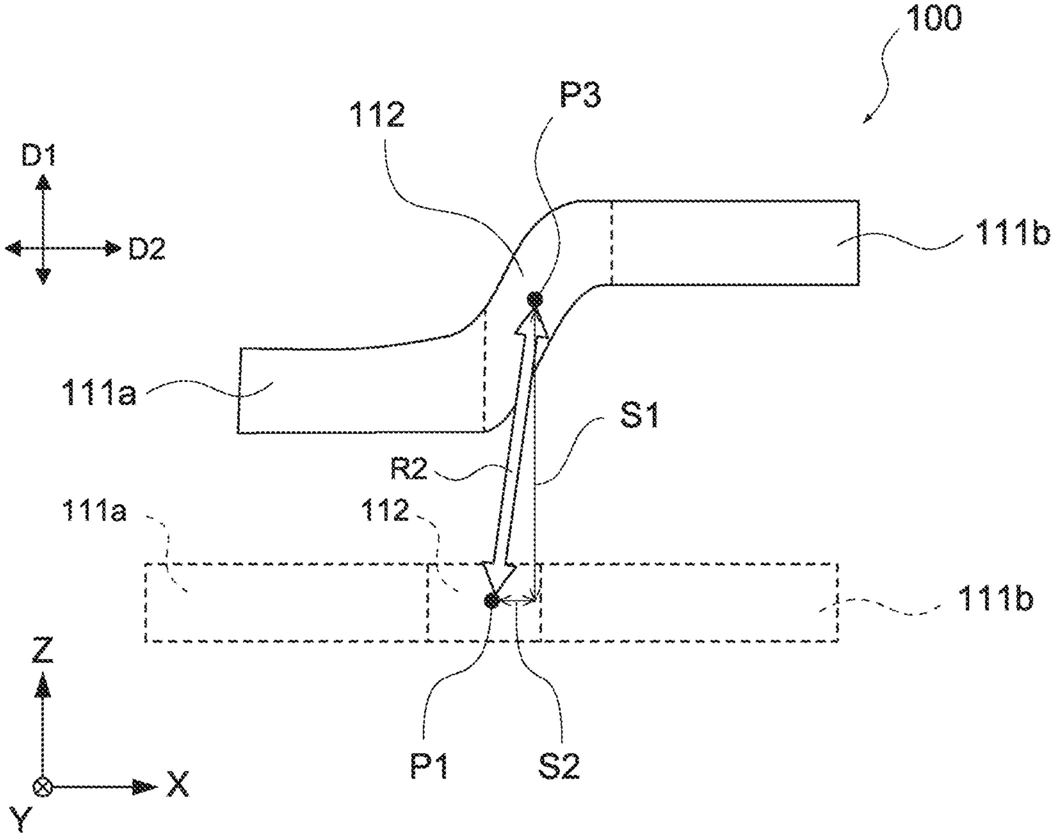
FIG. 9 A schematic diagram showing displacement of a middle portion of the exposure section included in the tactile sense presentation apparatus.

As shown in FIG. 8, when the height of the first operation section 102*a* is increased from the height Hla to the height H1*b* and the height of the second operation section 102*b* is increased from the height H2*a* to a height H2*c*, the center point P1 of the middle portion 112 moves to a center point P3. The height H2*c* is higher than the height H2*b*. Conversely, when the height of the first operation section 102*a* is decreased from the height H1*b* to the height Hla and the height of the second operation section 102*b* is decreased from the height H2*c* to the height H2*a*, the center point P3 of the middle portion 112 moves to the center point P1. The displacement between the center point P1 and the center point P3 is shown as displacement R2 in FIG. 8. FIG. 9 is a schematic diagram showing only the exposure section 103 in FIG. 8. As shown in the same figure, the displacement R2 includes a component S1 in the first direction D1 and a component S2 in the second direction D2, that is, the displacement of the middle portion 112 includes the component S1 in the first direction D1 and the component S2 in the second direction D2.

Figure 10:
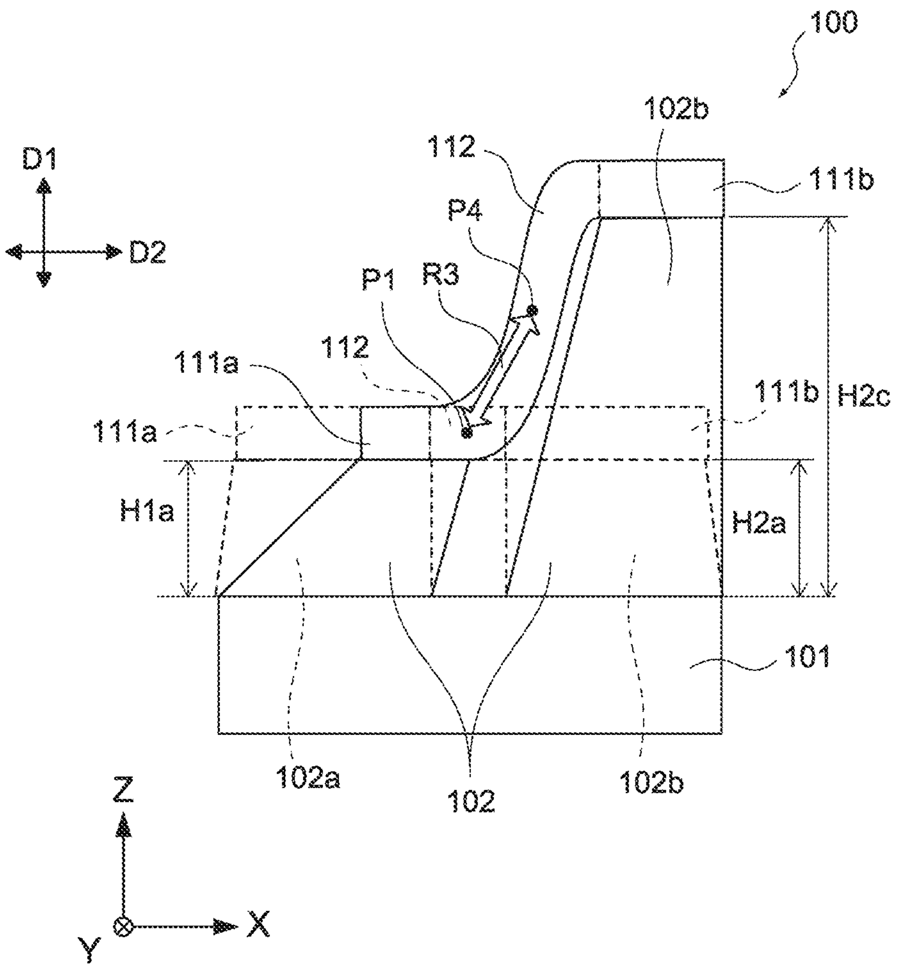
FIG. 10 A schematic diagram showing an operation of the tactile sense presentation apparatus.
Figure 11:
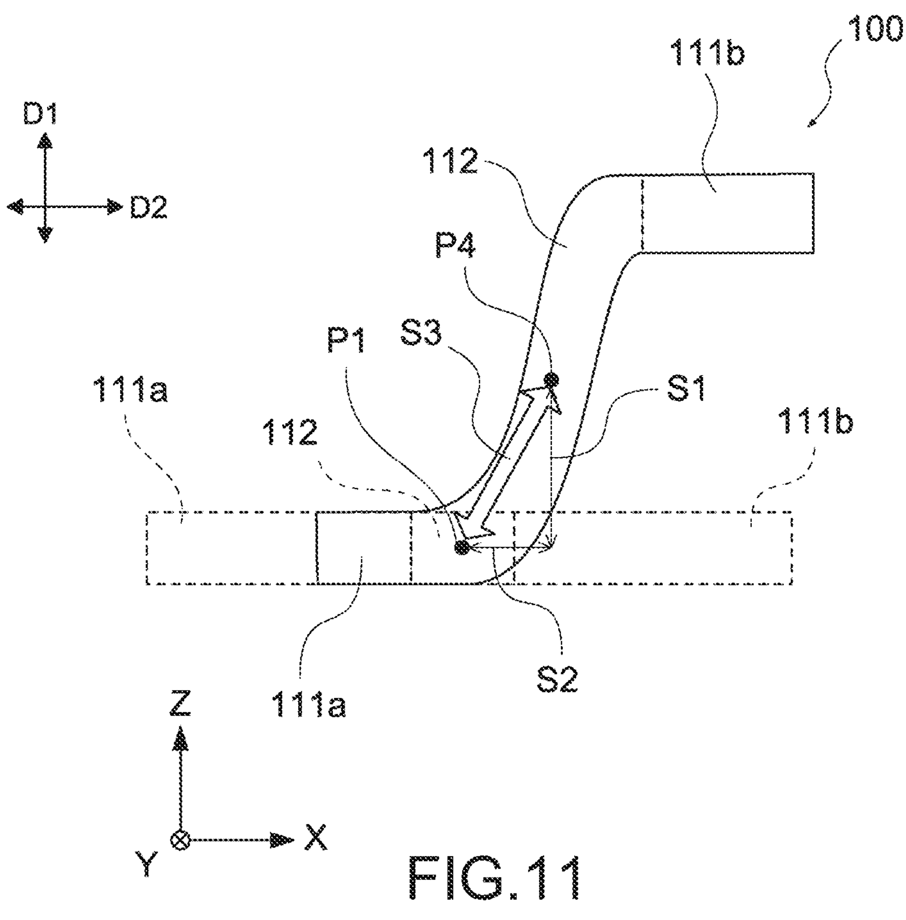
FIG. 11 A schematic diagram showing the displacement of the middle portion of the exposure section included in the tactile sense presentation apparatus.

Furthermore, as shown in FIG. 10, when the height of the first operation section 102*a* is left at the height Hla and the height of the second operation section 102*b* is increased from the height H2*a* to the height H2*c*, the center point P1 of the middle portion 112 moves to a center point P4. Conversely, when the height of the first operation section 102*a* is left at the height Hla and the height of the second operation section 102*b* is decreased from the height H2*c* to the height H2*a*, the center point P4 of the middle portion 112 moves to the center point P1. In FIG. 10, the displacement between the center point P1 and the center point P4 is shown as the displacement R3. FIG. 11 is a schematic diagram showing only the exposure section 103 in FIG. 10. As shown in the same figure, the displacement R3 includes the component S1 in the first direction D1 and the component S2 in the second direction D2, that is, the displacement of the middle portion 112 includes the component S1 in the first direction D1 and the component S2 in the second direction D2. As compared to the case in FIG. 8, in the displacement R3, the component S1 in the first direction D1 is smaller and the component S2 in the second direction D2 is larger.

Thus, the tactile sense presentation apparatus 100 can passively deform the exposure section 103 by changing the heights of the operation sections 102, and control a magnitude of the component of the first direction D1 and the component of the second direction D2 in the displacement of the middle portion 112. In the above described example, a case in which the height H2 of the second operation section 102*b* is greater than the height H1 of the first operation section 102*a* is described. Similarly, when the height H1 of the first operation section 102*a* is greater than the height H2 of the second operation section 102*b*, the magnitude of the component of the first direction D1 and the component of the second direction D2 in the displacement of the middle portion 112 can also be controlled. The displacement of the middle portion 112 may not include the component in the second direction D2, but only include the component in the first direction D1, or it may not include the component in the first direction D1, but include only the component in the second direction D2.

Figure 12:
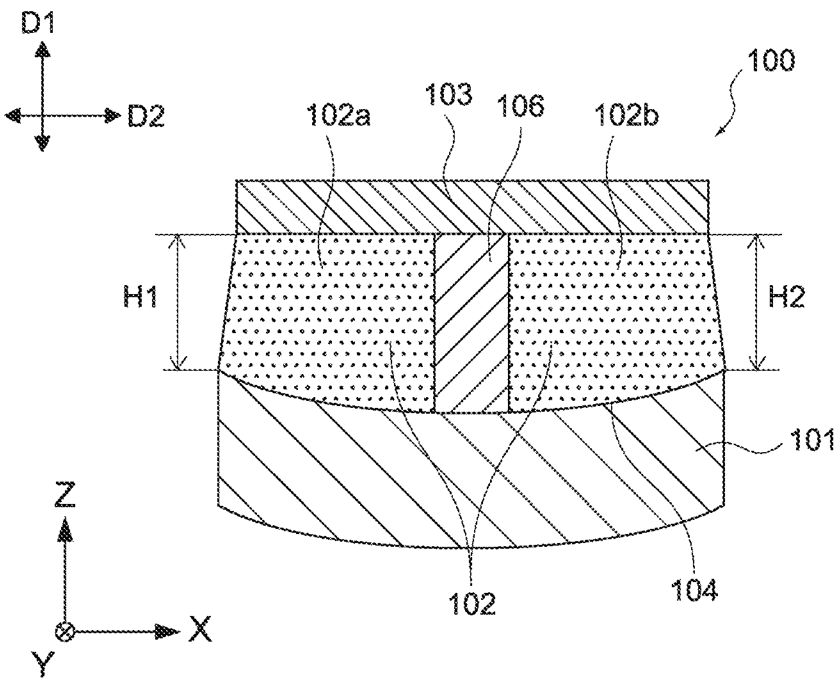
FIG. 12 A cross sectional diagram of a tactile sense presentation apparatus with a different configuration according to an embodiment of the present technology.

FIG. 12 is a schematic diagram showing other configuration of the tactile sense presentation apparatus 100. As shown in the same figure, the tactile sense presentation apparatus 100 may have a boundary section 106 instead of a void 105. As shown in the same figure, the boundary section 106 is provided between each of the operation sections 102. A specific configuration of the boundary section 106 is described below. As shown in the same figure, the placement surface 104 may be a concave surface. The concave surface includes a cylindrical surface, a spherical surface, and other curved surfaces.

[Specific Configuration 1 of Tactile Sense Presentation Apparatus]

Figure 13:
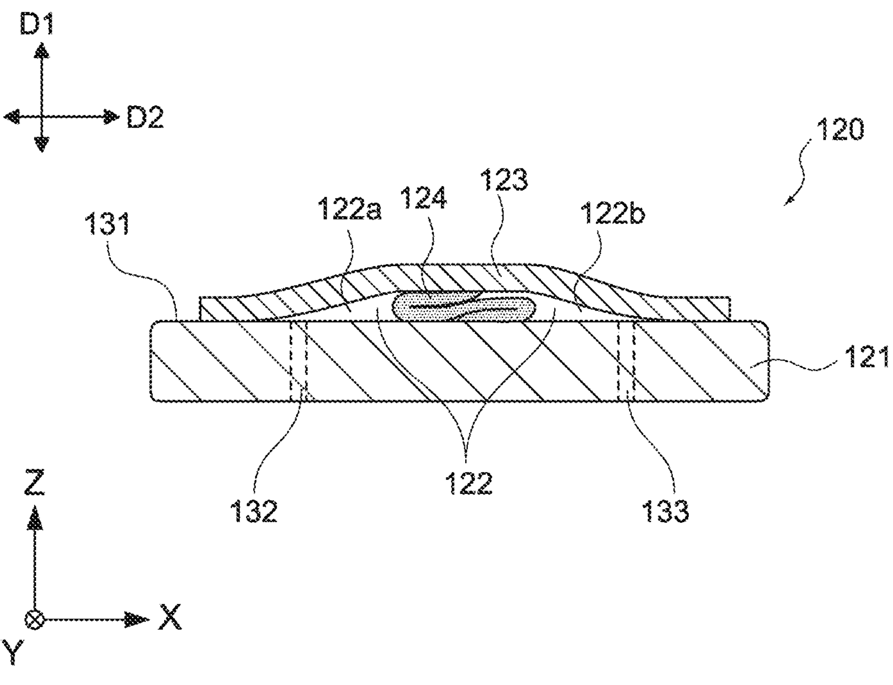
FIG. 13 A cross sectional diagram of a tactile sense presentation apparatus having a first specific configuration according to an embodiment of the present technology.
Figure 14:
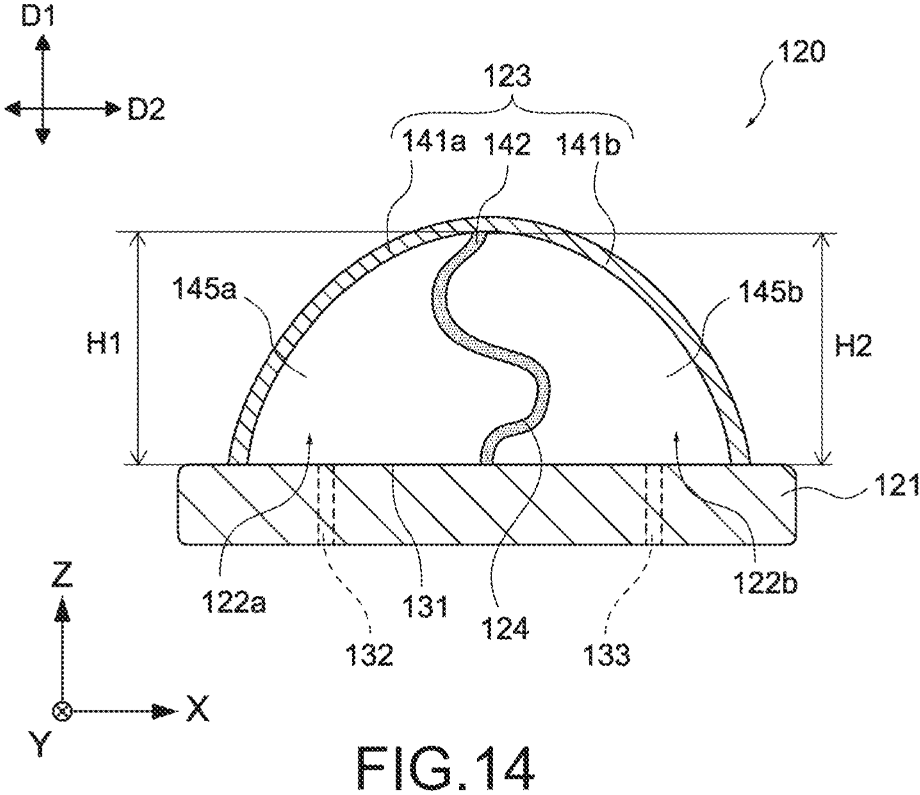
FIG. 14 A cross sectional diagram of the tactile sense presentation apparatus.
Figures 15, 16:
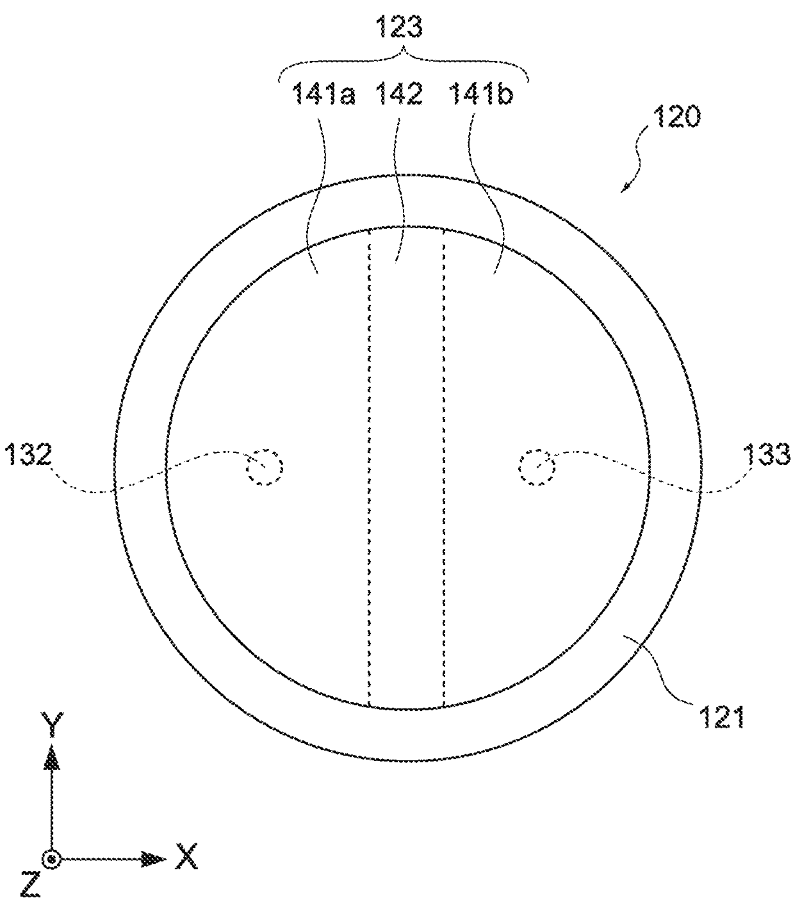
FIG. 15 A plan diagram of the tactile sense presentation apparatus.
FIG. 16 A cross sectional diagram of an enclosure section included in the tactile sense presentation apparatus.

As a specific configuration of the tactile sense presentation apparatus 100A, a tactile sense presentation apparatus 120 will be described. FIGS. 13 and 14 are cross sectional diagrams of the tactile sense presentation apparatus 120. FIG. 15 is a plan diagram of the tactile sense presentation apparatus 120. As shown in these figures, the tactile sense presentation apparatus 120 has an enclosure section 121, operation sections 122, an exposure section 123, and a boundary section 124.

The enclosure section 121 supports the operation sections 122. FIG. 16 is a cross sectional diagram of the enclosure section 121. As shown in the same figure, the enclosure section 121 has a placement surface 131 that faces the exposure section 123, on which the operation sections 122 are placed. The enclosure section 121 has a first flow channel 132 and a second flow channel 133 connected to the placement surface 131, respectively. A material of the enclosure section 121 is not particularly limited and is made of metal or synthetic resin or the like. A shape of the enclosure section 121 is not particularly limited, but has a disc shape, for example, as shown in FIG. 15.

The operation sections 122 are filled with fluid inside and their heights with respect to the enclosure section 121 change. The tactile sense presentation apparatus 120 has two operation sections 122, and the two operation sections 122 are hereinafter referred to as a first operation section 122*a* and a second operation section 122*b*. The first operation section 122*a* and the second operation section 122*b* change in heights in a first direction D1 with respect to the enclosure section 121, respectively. The first direction D1 is a direction of approach and leave to/from the enclosure section 121. In FIG. 14, the height of the first operation section 122*a* in the first direction D1 is defined as H1, and the height of the second operation section 122*b* in the first direction D1 is defined as H2. As described below, the tactile sense presentation apparatus 120 may have three or more operation sections 122. Not all of the operation sections 122 may change in the heights due to fluid, and the tactile sense presentation apparatus 120 may have the operation sections 122 that change in the heights due to other configurations.

The exposure section 123 is passively deformed by the change in the heights of the operation sections 122. The exposure section 123 is a membrane like member having flexibility and covers circumferences of the operation sections 122. An outer periphery of the exposure section 123 is bonded to the enclosure section 121 by adhesion or other means. As shown in FIG. 14, the exposure section 123 has a first contact portion 141*a*, a second contact portion 141*b*, and a middle portion 142. The first contact portion 141*a* is a portion of the exposure section 123 with which the first operation section 122*a* makes contact, and the second contact portion 141*b* is a portion of the exposure section 123 with which the second operation section 122*b* makes contact. The middle portion 142 is a portion of the exposure section 123 between the first contact portion 141*a* and the second contact portion 141*b*, to which the boundary section 124 is connected.

The boundary section 124 is placed between the first operation section 122*a* and the second operation section 122*b*, separates the fluid between the first operation sections 122*a* and the second operation section 122*b*, and connects the middle portion 142 and the enclosure section 121. The boundary section 124 has a bellows structure, as shown in FIG. 14. The boundary section 124 can be a flexible and elastic member and may be made of the same material as the exposure section 123 or a different material from the exposure section 123.

As shown in FIG. 14, the first operation section 122*a* has a first sealed space 145*a* surrounded by the placement surface 131, the first contact portion 141*a*, and the boundary section 124. When fluid flows into the first sealed space 145*a* via the first flow channel 132, a pressure of the first sealed space 145*a* is increased, causing the first contact portion 141*a* to expand. As a result, the height H1 of the first operation section 122*a* with respect to the enclosure section 101 is increased. When fluid flows out of the first sealed space 145*a* through the first flow channel 132, the pressure of the first sealed space 145*a* is decreased and the first contact portion 141*a* contracts. As a result, the height H1 of the first operation section 122*a* with respect to the enclosure section 101 is decreased.

The second operation section 122*b* has a second sealed space 145*b* surrounded by the placement surface 131, the second contact portion 141*b*, and the boundary section 124. When fluid flows into the second sealed space 145*b* via the second flow channel 133, a pressure of the second sealed space 145*b* is increased, causing the second contact portion 141*b* to expand. As a result, the height H2 of the second operation section 122*b* with respect to the enclosure section 101 is increased. When fluid flows out of the second sealed space 145*b* through the second flow channel 133, a pressure of the second sealed space 145*b* is decreased and the second contact portion 141*b* contracts. As a result, the height H2 of the second operation section 122*b* with respect to the enclosure section 101 is decreased.

An inflow and an outflow of fluid through the first flow channel 132 and the second flow channel 133 can be performed by a fluid control apparatus, not shown. The fluid control apparatus is, for example, a pump. The fluid is not particularly limited and is air, for example. The fluid flowing into the first sealed space 145*a* and the fluid flowing into the second sealed space 145*b* may be the same or different.

[Operation of Tactile Sense Presentation Apparatus]

Figure 17:
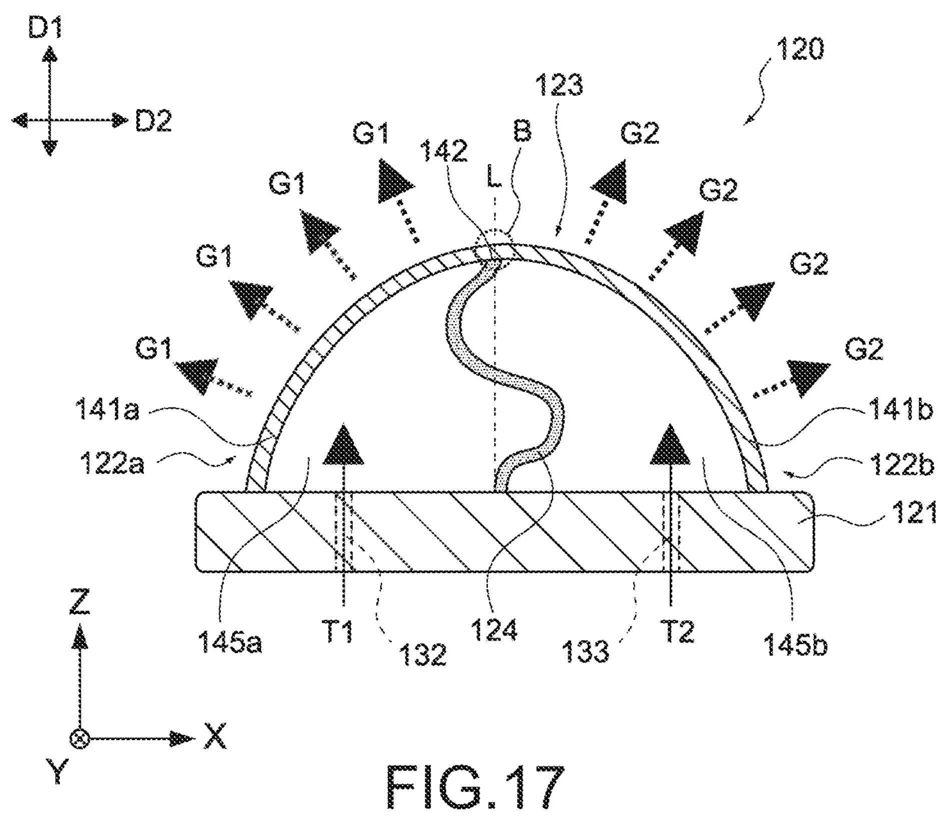
FIG. 17 A schematic diagram showing the operation of the tactile sense presentation apparatus.

An operation of the tactile sense presentation apparatus 120 will be described. FIGS. 17 to 20 are schematic diagrams showing the operation of the tactile sense presentation apparatus 120. As shown in FIG. 17, when a pressure T1 of the first sealed space 145*a* and a pressure T2 of the second sealed space 145*b* are the same, expansion amounts G1 of the first contact portion 141*a* and expansion amounts G2 of the second contact portion 141*b* become the same, and the height H1 of the first operation section 122*a* and the height H2 of the second operation section 122*b* are also the same (see FIG. 14). A position of the middle portion 142 is indicated by a circle B in FIGS. 17 to 20, showing a positional relationship with respect to a reference line L. The reference line L has a fixed position with respect to the enclosure section 121.

Figure 18:
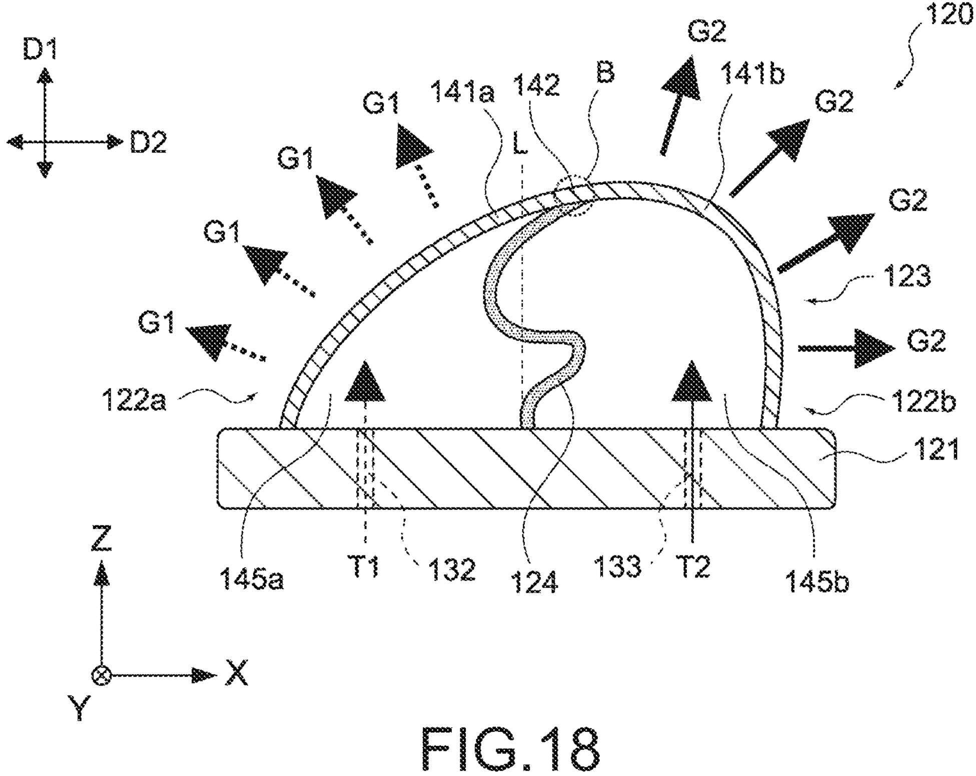
FIG. 18 A schematic diagram showing the operation of the tactile sense presentation apparatus.

As shown in FIG. 18, when the pressure T2 of the second sealed space 145*b* is greater than the pressure T1 of the first sealed space 145*a*, the expansion amounts G2 of the second contact portion 141*b* is greater than the expansion amounts G1 of the first contact portion 141*a*, and the height H2 of the second operation section 122*b* is greater than the height H1 of the first operation section 122*a*. The middle portion 142 is accordingly pulled toward a second contact portion 141*b* side and displaced toward the second contact portion 141*b* side.

Figure 19:
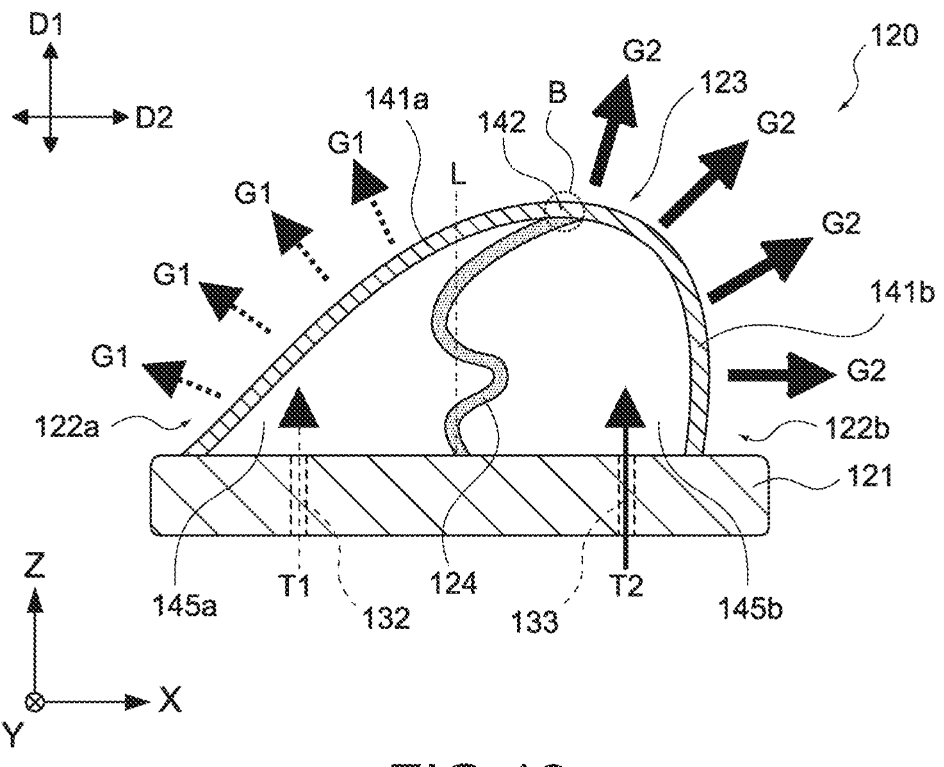
FIG. 19 A schematic diagram showing the operation of the tactile sense presentation apparatus.

Furthermore, when the pressure T2 of the second sealed space 145*b* is increased and the pressure T1 of the first sealed space 145*a* is decreased, a difference between the expansion amounts G2 of the second contact portion 141*b* and the expansion amounts G1 of the first contact portion 141*a* becomes even greater, as shown in FIG. 19, and a difference between the height H2 of the second operation section 122*b* and the height of the first operation section 122*a* H1 also becomes even greater. Therefore, the middle portion 142 is further pulled toward the second contact portion 141*b* side and is further displaced toward the second contact portion 141*b* side.

Figure 20:
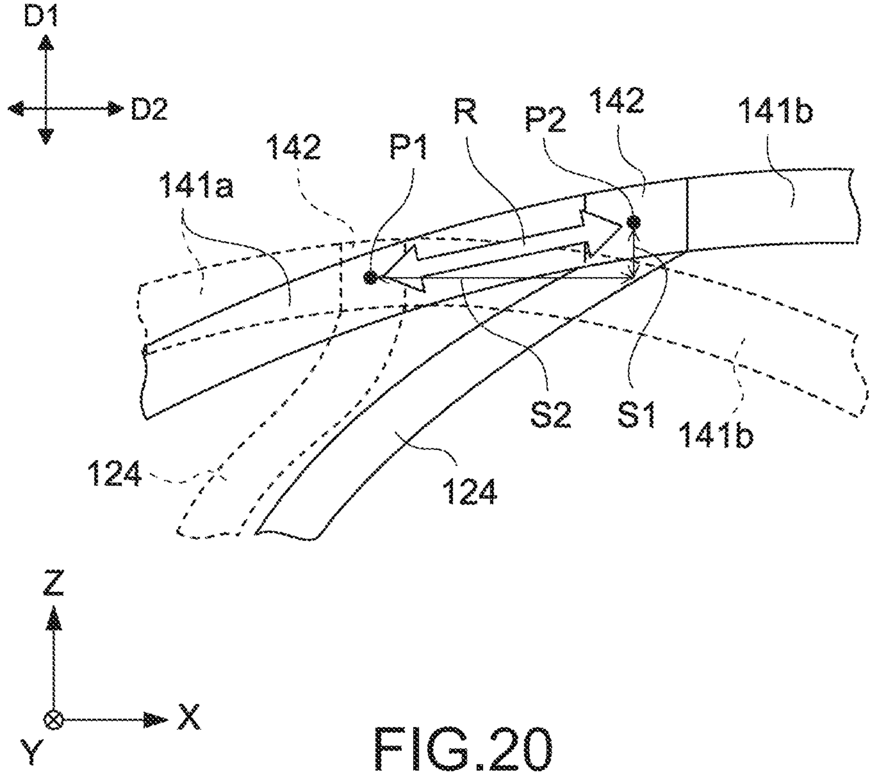
FIG. 20 A schematic diagram showing the displacement of the middle portion of the exposure section included in the tactile sense presentation apparatus.

FIG. 20 is a schematic diagram showing the displacement of the middle portion 142. When the difference between the pressure T2 and the pressure T1 is increased from a state shown in FIG. 17 to a state shown in FIG. 19, the center point P1 of the middle portion 142 is displaced to the center point P2, as shown in FIG. 20. Conversely, when the difference between pressure T2 and pressure T1 is decreased from the state shown in FIG. 19 to the state shown in FIG. 17, the center point P2 of the middle portion 142 is displaced to the center point P1, as shown in FIG. 20. Displacement R between the center point P1 and the center point P2 includes the component S1 in the first direction D1 and the component S2 in the second direction D2. Therefore, the displacement of the middle portion 142 includes the component S1 in the first direction D1 and the component S2 in the second direction D2, and the magnitudes of the component S1 and the component S2 vary according to the height H1 of the first contact portion 141*a* and the height H2 of the second contact portion 141*b*.

In FIGS. 17 to 19, a case in which the pressure T2 of the second sealed space 145*b* is greater than the pressure T1 of the first sealed space 145*a* is described. Similarly, when the pressure T2 of the first sealed space 145*a* is greater than the pressure T2 of the second sealed space 145*b*, the middle portion 142 is pulled toward a first contact portion 141*a* side and displaced toward the first contact portion 141*a* side. In this case, the displacement of the middle portion 142 also includes the component S1 in the first direction D1 and the component S2 in the second direction D2, and the magnitudes of the component S1 and the component S2 vary according to the height H1 of the first operation section 122*a* and the height H2 of the second operation section 122*b*.

In the above description, the heights H1 and H2 are controlled by the pressure T1 of the first sealed space 145*a* and the pressure T2 of the second sealed space 145*b*, but the heights H1 and H2 can also be controlled by volume of fluid in the first sealed space 145*a* and the volume of fluid in the second sealed space 145*b*.

[Effects of Tactile Sense Presentation Apparatus]

Figure 21:
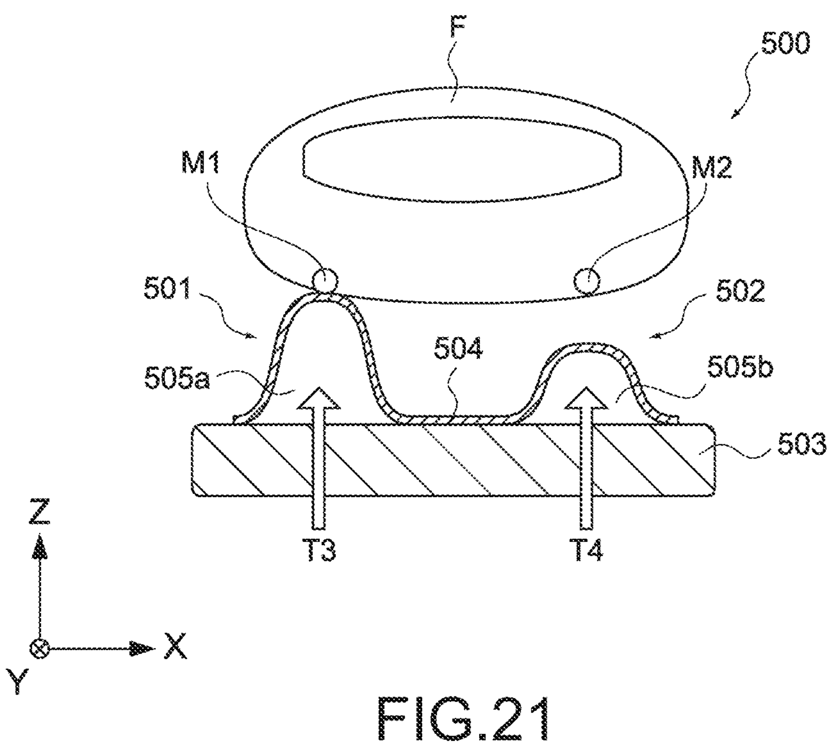
FIG. 21 A schematic diagram showing an operation of a tactile sense presentation apparatus according to a comparative example.

Effects of the tactile sense presentation apparatus 120 are described in comparison with a comparative example. FIG. 21 is a schematic diagram showing a tactile sense presentation apparatus 500 according to a comparative example. As shown in the same figure, the tactile sense presentation apparatus 500 has a first operation section 501, a second operation section 502, and an enclosure section 503. The first operation section 501 has a first sealed space 505*a* sealed by a flexible membrane 504, and is configured to expand when fluid flows into the first sealed space 505*a* and to contract when fluid flows out. The second operation section 502 has a second sealed space 505*b* sealed by the flexible membrane 504, and is configured to expand when fluid flows into the second sealed space 505*b* and to contract when fluid flows out.

When a pressure T3 of the first sealed space 505*a* and a pressure T4 of the second sealed space 505*b* are varied while a finger F touches a flexible membrane 504, the first operation section 501 makes contact a point M1 of the finger F and the second operation section 502 makes contact a point M2. Therefore, the tactile sense presentation apparatus 500 can generate pressure stimulation at two points of the point M1 and the point M2, or at either one of the points M1 and M2. On the other hand, the tactile sense presentation apparatus 500 cannot generate the pressure stimulation in the middle of between the point M1 and the point M2, and the pressure stimulation is discrete. In addition, it is not possible to generate the pressure stimulation over a fixed area from the point M1 to the point M2.

Figure 22:
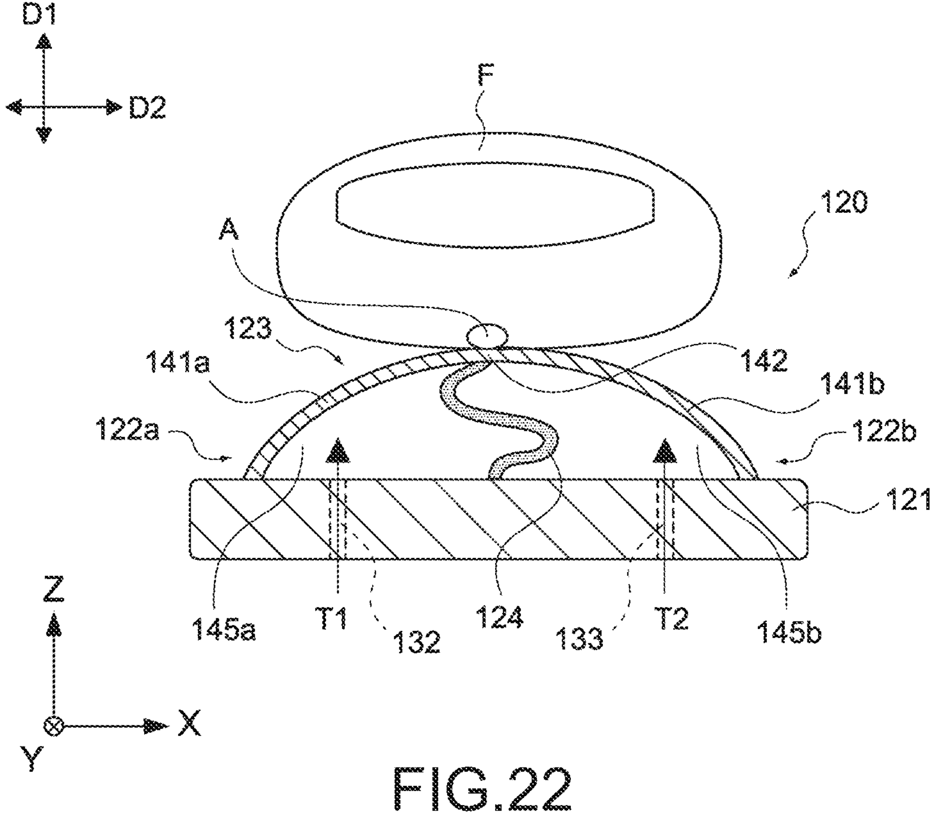
FIG. 22 A schematic diagram showing the operation of the tactile sense presentation apparatus having the first specific configuration according to the embodiment of the present technology.

FIGS. 22 to 27 are schematic diagrams showing the operation of the tactile sense presentation apparatus 120. As shown in FIG. 22, in the tactile sense presentation apparatus 120, the pressure T1 of the first sealed space 145*a* and the pressure T2 of the second sealed space 145*b* are the same, and the exposure section 123 makes contact a region A of the finger F. Therefore, the tactile sense presentation apparatus 120 can generate the pressure stimulation at one point in the region A.

Figures 23, 24:
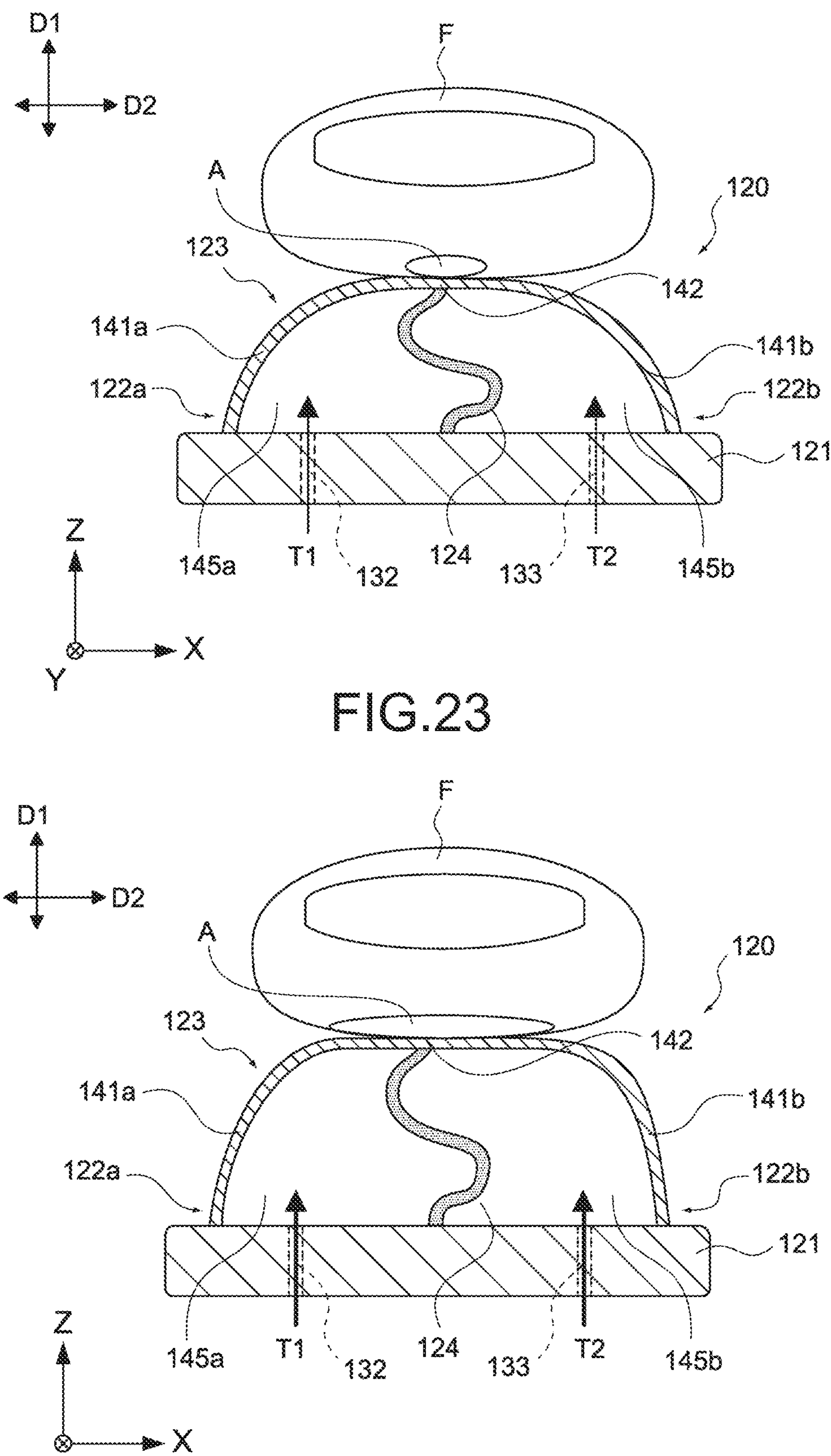
FIG. 23 A schematic diagram showing an operation of the tactile sense presentation apparatus.
FIG. 24 A schematic diagram showing the operation of the tactile sense presentation apparatus.

As the pressure T1 and pressure T2 are more increased, the height H1 of the first contact portion 141*a* and the height H2 of the second contact portion 141*b* are increased as shown in FIG. 23, and the middle portion 142 is displaced along therewith. Since the displacement of the middle portion 142 includes the component S1 in the first direction D1 as described above, this increases an area of the region A and a pressing force on the region A. Furthermore, when the pressure T1 and pressure T2 are further increased, the height H1 and height H2 become even higher as shown in FIG. 24, and the middle portion 142 is displaced along therewith. This further increases the area of the region A and the pressing force on the region A.

Thus, in the tactile sense presentation apparatus 120, the displacement of the middle portion 142 includes the component S1 in the first direction D1, which makes it possible to have one region A where the pressure stimulation is generated. The area of the region A and the pressing force on the region A are dependent on the height H1 and the height H2 and therefore can be controlled by the pressure T1 and the pressure T2.

Figure 25:
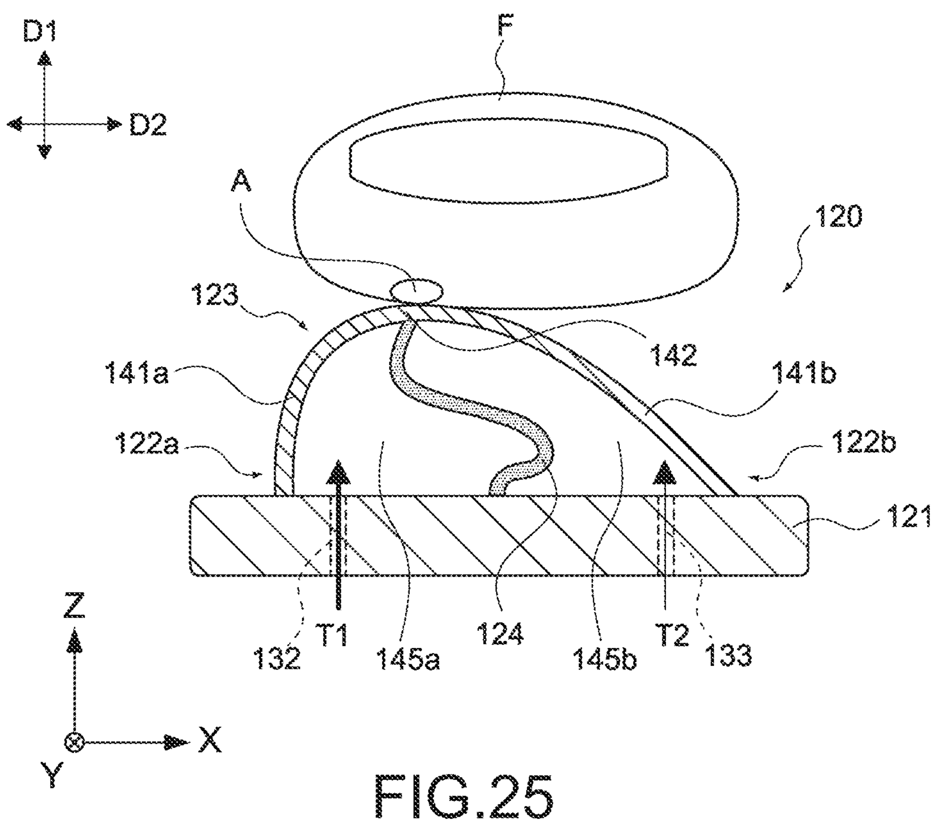
FIG. 25 A schematic diagram showing the operation of the tactile sense presentation apparatus.

When the pressure T1 is greater than the pressure T2, the height H1 becomes higher than the height H2, as shown in FIG. 25, and the middle portion 142 is displaced along therewith toward the first contact portion 141*a* side. Since the displacement of the middle portion 142 includes the component S2 in the second direction D2 as described above, this makes the region A to move toward the first contact portion 141*a* side.

Figure 26:
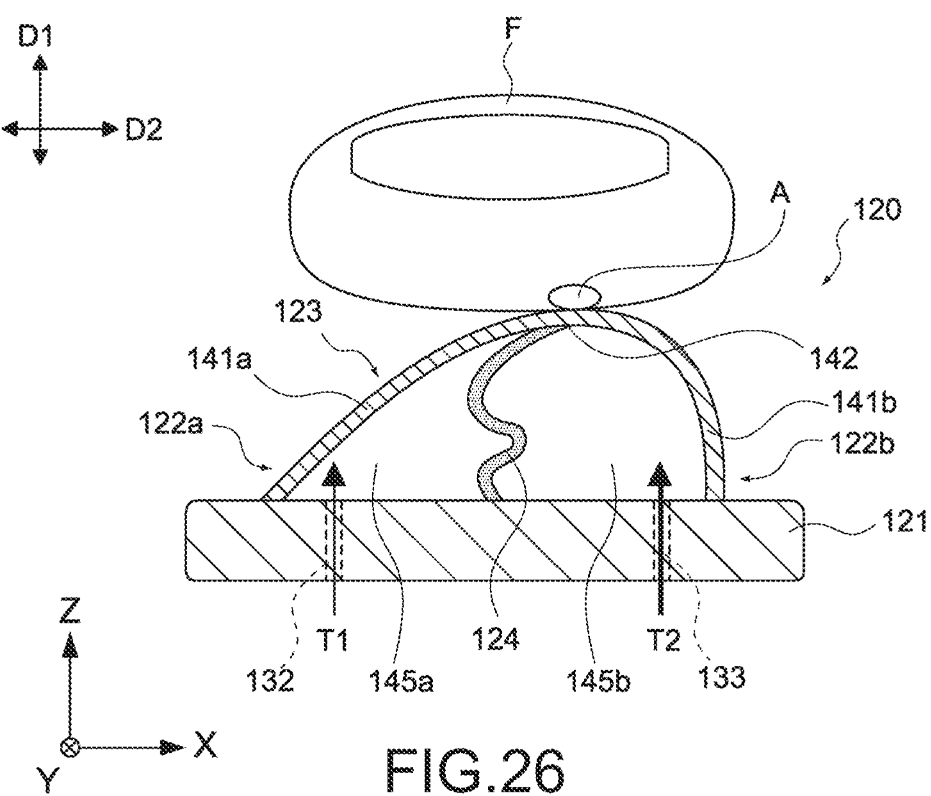
FIG. 26 A schematic diagram showing the operation of the tactile sense presentation apparatus.

Furthermore, when the pressure T2 is greater than the pressure T1, the height H2 becomes higher than the height H1 as shown in FIG. 26, and the middle portion 142 is displaced along therewith toward the second contact portion 141*b* side. Since the displacement of the middle portion 142 includes the component S2 in the second direction D2 as described above, this makes the region A to move toward the second contact portion 141*b* side.

Figure 27:
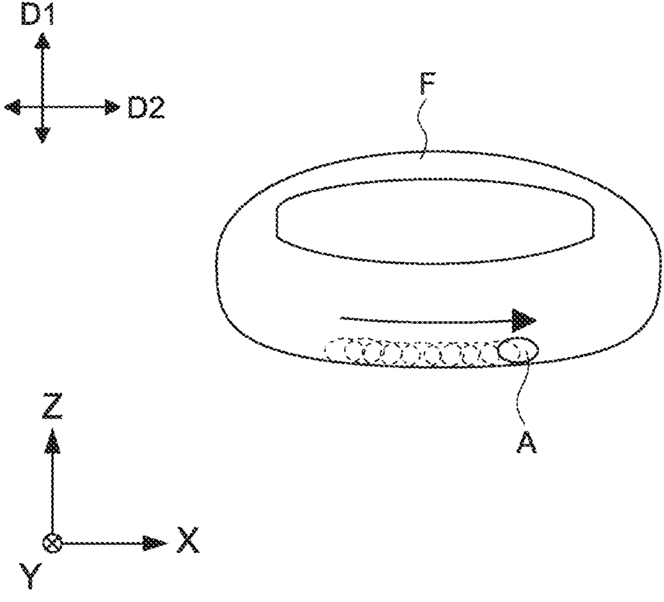
FIG. 27 A schematic diagram showing the operation of the tactile sense presentation apparatus.

Thus, in the tactile sense presentation apparatus 120, the displacement of the middle portion 142 includes the component S2 in the second direction D2, which allows the region A that generates the pressure stimulation to be moved in the second direction D2. This makes it possible to make the region A at an arbitrary position or to move it as shown in FIG. 27. The position of the region A is in accordance with the height H1 and the height H2, and can be controlled by the pressure T1 and the pressure T2. Furthermore, in the tactile sense presentation apparatus 120, it is also possible to change the area of the region A and the pressure on the region A by the height H1 and the height H2, with the region A being at an arbitrary position.

As described above, the tactile sense presentation apparatus 120 can control the position, the movement, the area, and the pressing force of the region A by the height H1 and the height H2. As a result, when presenting the tactile sense of a virtual object with the tactile sense presentation apparatus, the position of contact between a skin and the virtual object, a direction of a virtual object surface, and the like can be presented by the position of the region A. In addition, a sense of stroking the virtual object, an interval at which it is stroked by the virtual object, a tactile feeling of the virtual object on the skin, and the like can be presented by the movement of the region A. Furthermore, a size of the virtual object touched and hardness and softness of the virtual object pressed can be presented by the area and the pressing force of the region A.

[About Boundary Section]

Figure 28:
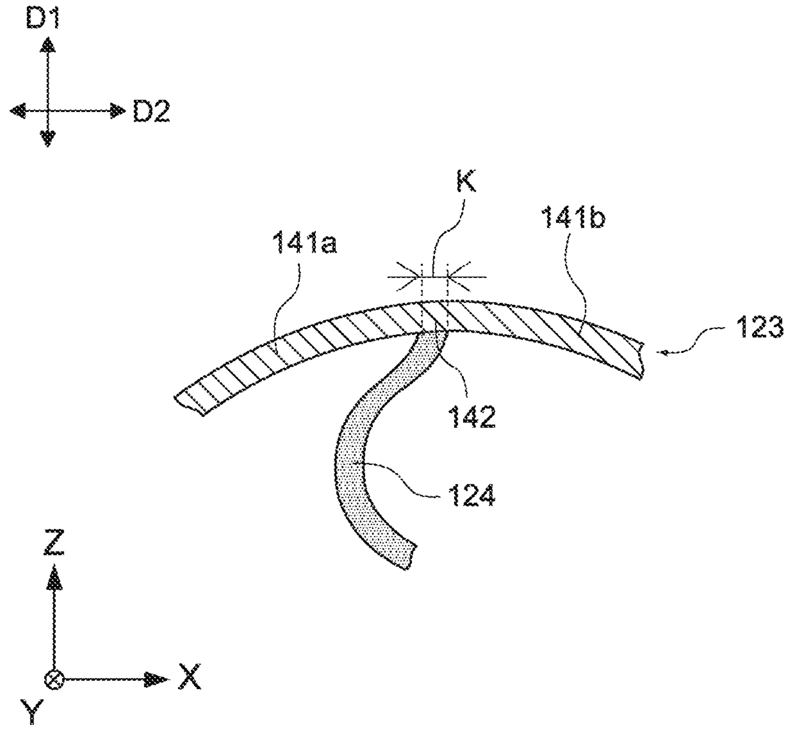
FIG. 28 A schematic diagram showing a thickness of a boundary section included in the tactile sense presentation apparatus.

Details of the boundary section 124 will be described. FIG. 28 is an enlarged diagram of the boundary section 124. As shown in the same figure, a thickness K in the second direction D2 of the portion of the boundary section 124 connected to the exposure section 123 is suitably 3 mm or less. If the thickness K is thick, the size of the region A cannot be decreased under a certain level, but by setting the thickness K to 3 mm or less, the size of a region K can be decreased and the tactile feeling control region can be maximized.

Figure 29:
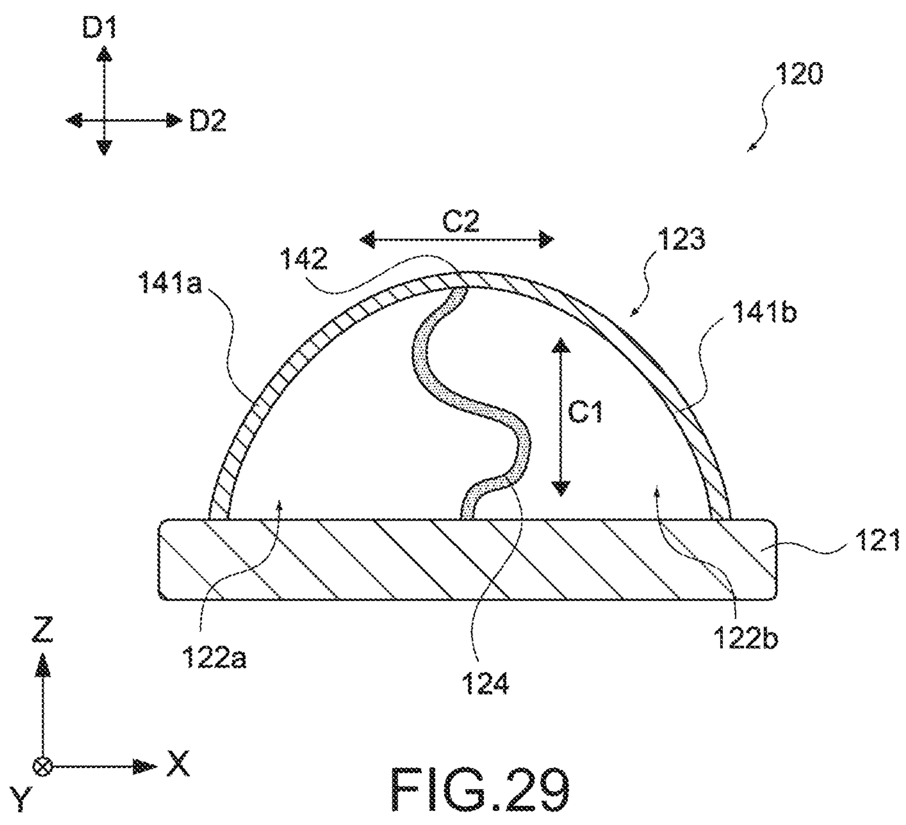
FIG. 29 A schematic diagram showing tensile strength of the boundary section and an exposure section included in the tactile sense presentation apparatus.

FIG. 29 is a schematic diagram showing tensile strength C1 of the boundary section 124 and tensile strength C2 of the exposure section 123. The tensile strength is determined by material tensile strength, thickness, and structure, and is a force required to stretch a member at a certain elongation rate. The tensile strength C1 is tensile strength along the first direction D1 and the tensile strength C2 is tensile strength along the second direction D2. The tactile sense presentation apparatus 120 is suitably configured such that the tensile strength C1 is smaller than the tensile strength C2. This is because if the tensile strength C1 is smaller than the tensile strength C2, i.e., the boundary section 124 is more easily elongated than the exposure section 123, the middle portion 142 is more easily displaced in the second direction D2 due to the expansion of the first contact portion 141*a* and the second contact portion 141*b*. The small tensile strength C1 and the small tensile strength C2 are suitable because the effect of the present technology is higher, and both of them is suitably less than 10 MPa.

[About Placement of Operation Sections and Boundary Section]

A placement of the operation sections 122 and boundary section 124 in the tactile sense presentation apparatus 120 will be described. FIGS. 30 to 35 are plan diagrams showing the placement of the operation sections 122 and the boundary section 124. The exposure section 123 is omitted in FIGS. 30 to 35.

Figure 30:
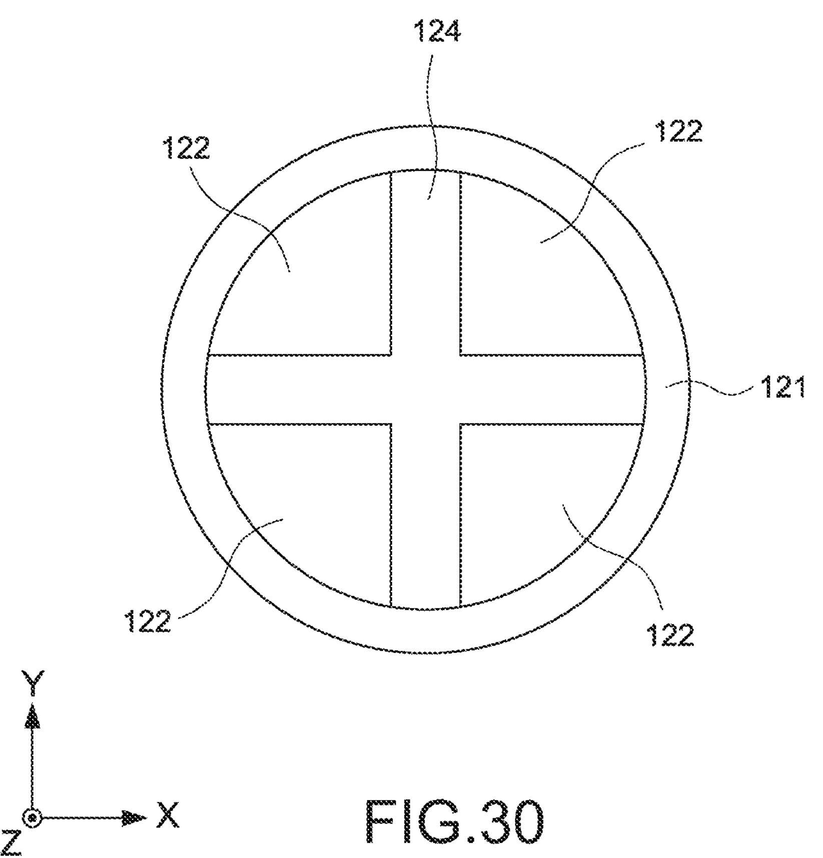
FIG. 30 A schematic diagram showing placement of the operation section and the boundary section included in the tactile sense presentation apparatus.
Figure 31:
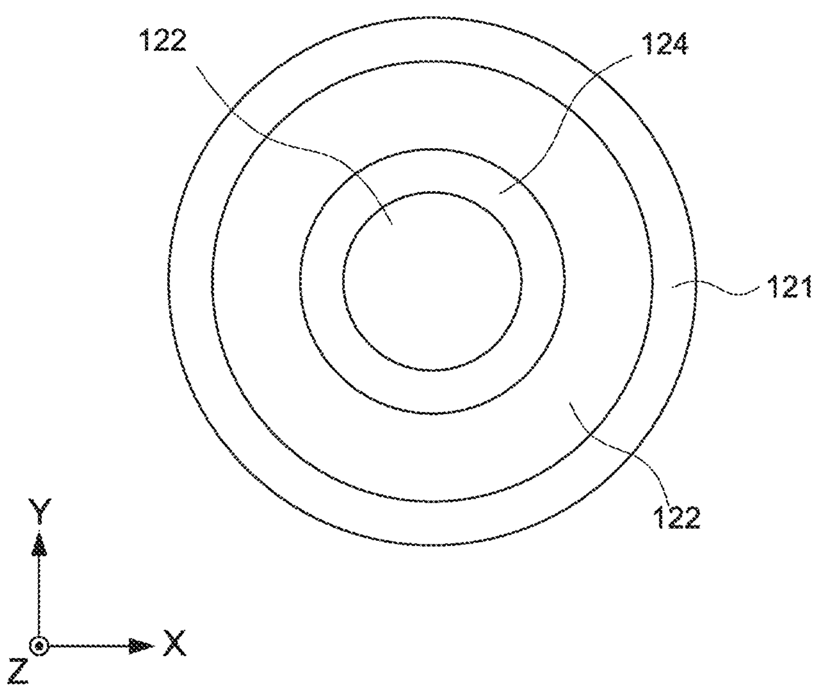
FIG. 31 A schematic diagram showing the placement of the operation section and the boundary section included in the tactile sense presentation apparatus.
Figure 32:
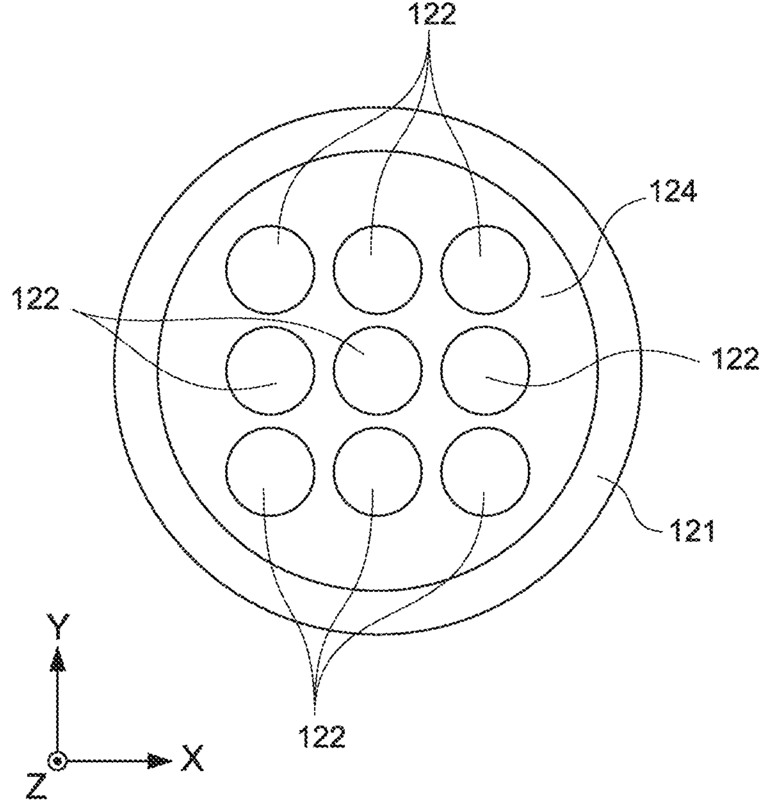
FIG. 32 A schematic diagram showing the placement of the operation section and the boundary section included in the tactile sense presentation apparatus.

As shown in FIG. 30, the tactile sense presentation apparatus 120 may have four operation sections 122 and the boundary section 124 may have a cruciform shape as viewed from the Z direction. As shown in FIG. 31, the tactile sense presentation apparatus 120 may have two operation sections 122 and the boundary section 124 may have a circular shape as viewed from the Z direction. Furthermore, as shown in FIG. 32, the tactile sense presentation apparatus 120 may have nine operation sections 122 arranged in an array.

Figure 33:
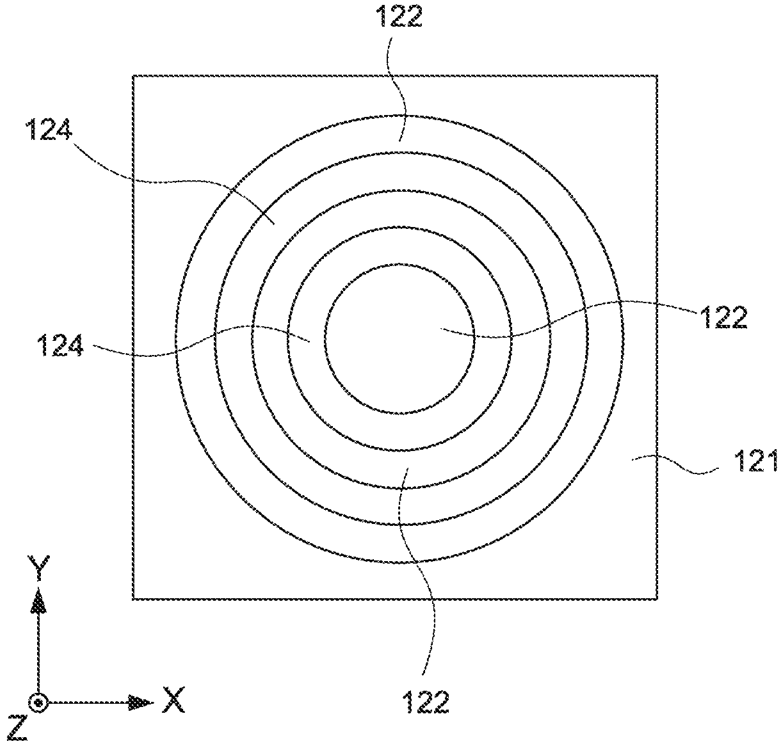
FIG. 33 A schematic diagram showing the placement of the operation section and the boundary section included in the tactile sense presentation apparatus.
Figure 34:
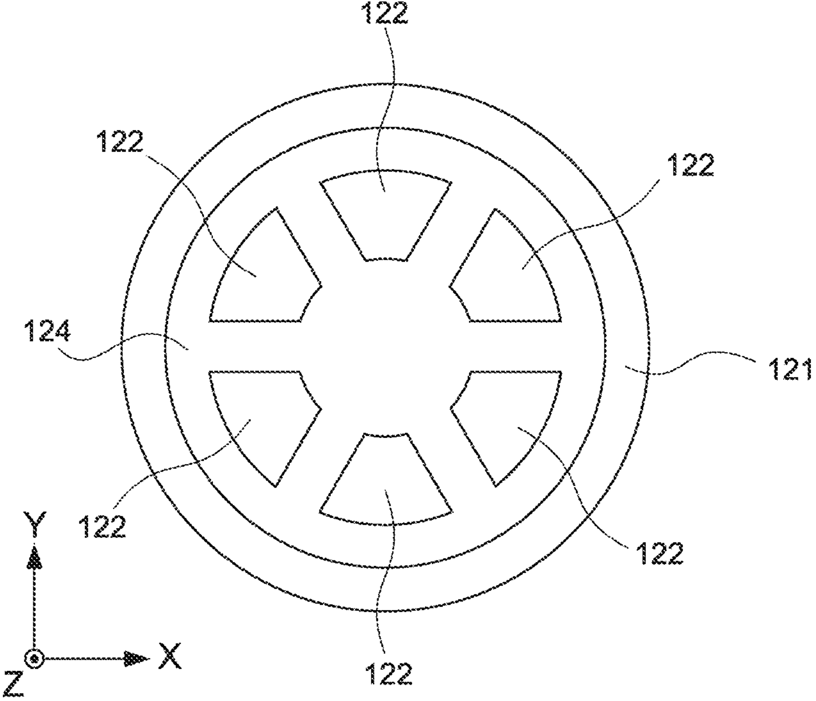
FIG. 34 A schematic diagram showing the placement of the operation section and the boundary section included in the tactile sense presentation apparatus.
Figure 35:
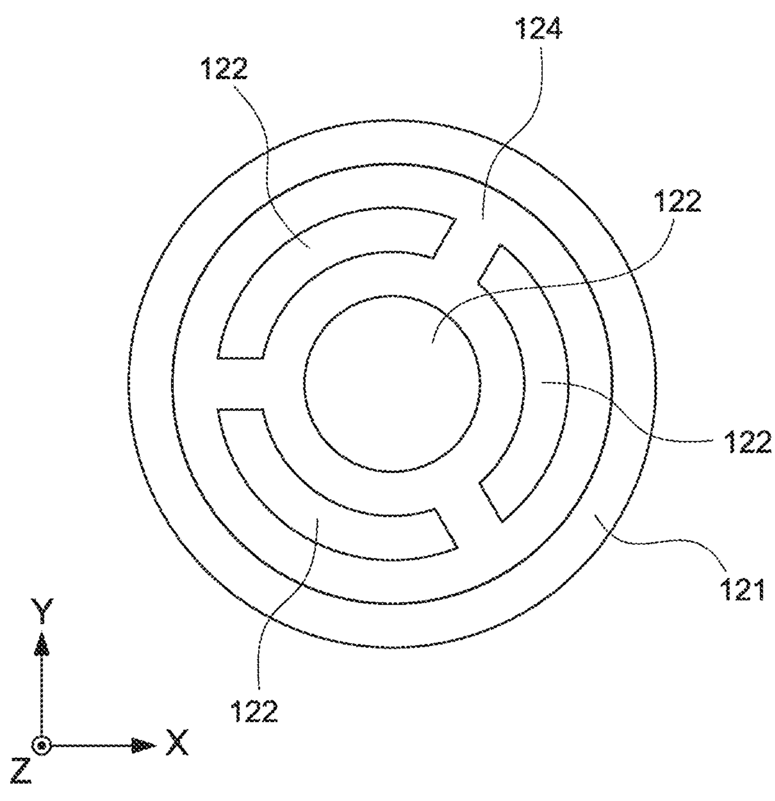
FIG. 35 A schematic diagram showing the placement of the operation section and the boundary section included in the tactile sense presentation apparatus.

As shown in FIG. 33, the tactile sense presentation apparatus 120 may have three operation sections 122 and the boundary section 124 may have a circular shape when viewed from the Z direction. Furthermore, as shown in FIG. 34, the tactile sense presentation apparatus 120 may have six operation sections 122 arranged in an annular shape. Also, as shown in FIG. 35, the tactile sense presentation apparatus 120 may have four operation sections 122 and the boundary section 124 may have a straight line and an annular shape when viewed from the Z direction. The placement of the operation sections 122 and the boundary section 124 is not limited to the above, and the tactile sense presentation apparatus 120 may have two or more operation sections 122 and the boundary section 124 placed between the operation sections 122.

[About Outer Periphery]

Figure 36:
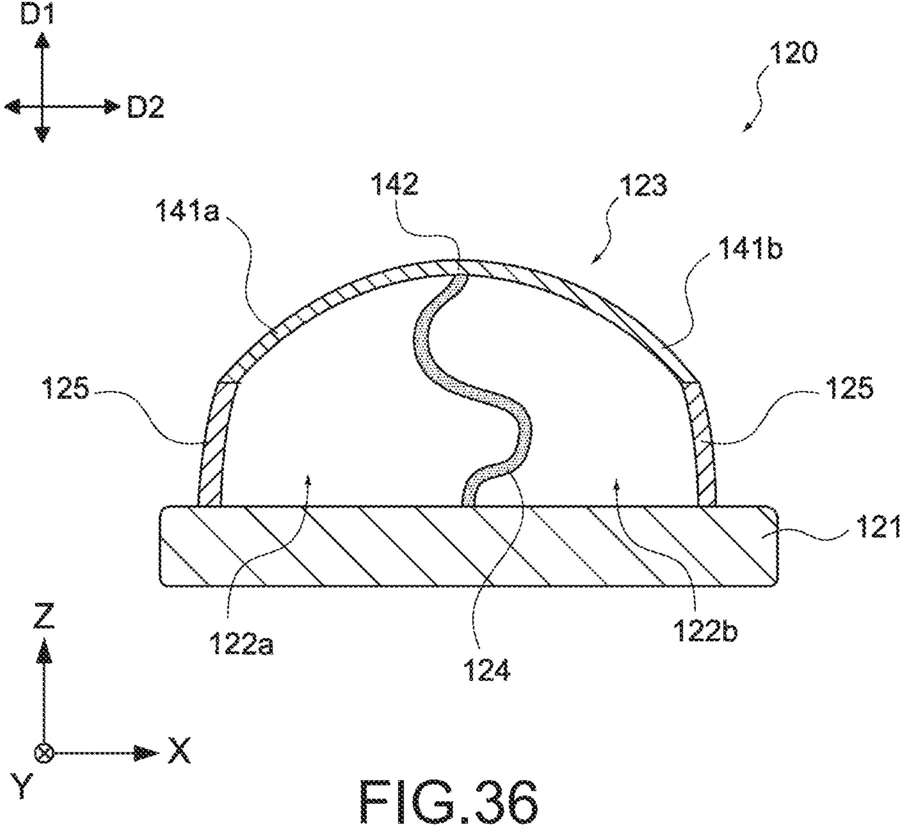
FIG. 36 A cross sectional diagram of a tactile sense presentation apparatus having the first specific configuration according to the embodiment of the present technology and including an outer periphery.
Figure 37:
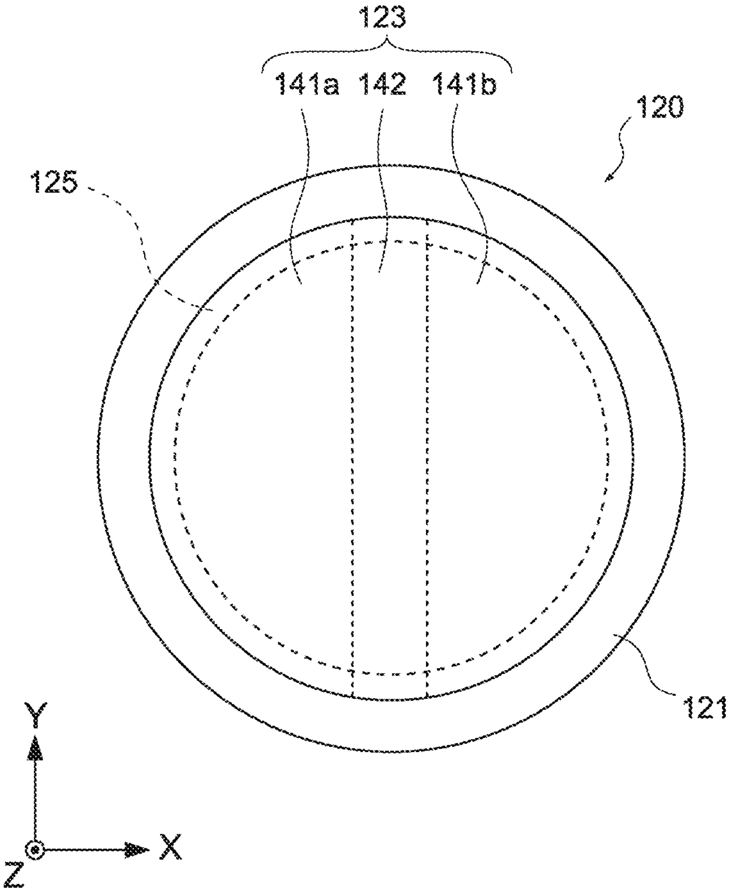
FIG. 37 A plan diagram of the tactile sense presentation apparatus.
Figure 38:
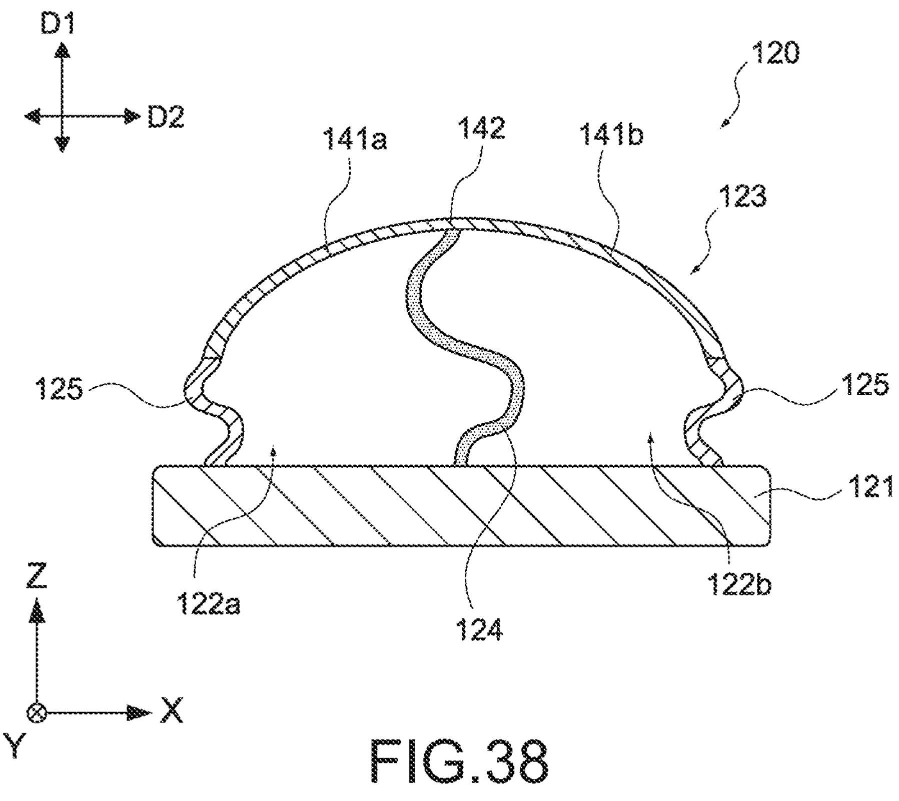
FIG. 38 A cross sectional diagram of the tactile sense presentation apparatus having the first specific configuration according to the embodiment of the present technology and including the outer periphery.

The tactile sense presentation apparatus 120 can also have the outer periphery. FIG. 36 is a cross sectional diagram of the tactile sense presentation apparatus 120 having an outer periphery 125, and FIG. 37 is a plan diagram thereof. As shown in these figures, the outer periphery 125 has a cylindrical shape and is placed around the operation sections 122. The exposure section 123 may be bonded to an end of the outer periphery 125 as shown in FIG. 36, or may be bonded to the enclosure section 121 through an outer surface of the outer periphery 125. The outer periphery 125 may be non flexible or flexible. FIG. 38 is a cross sectional diagram showing another configuration of the outer periphery 125. As shown in the same figure, the outer periphery 125 may have a bellows structure.

[Various Configurations of Boundary Section]

Figure 39:
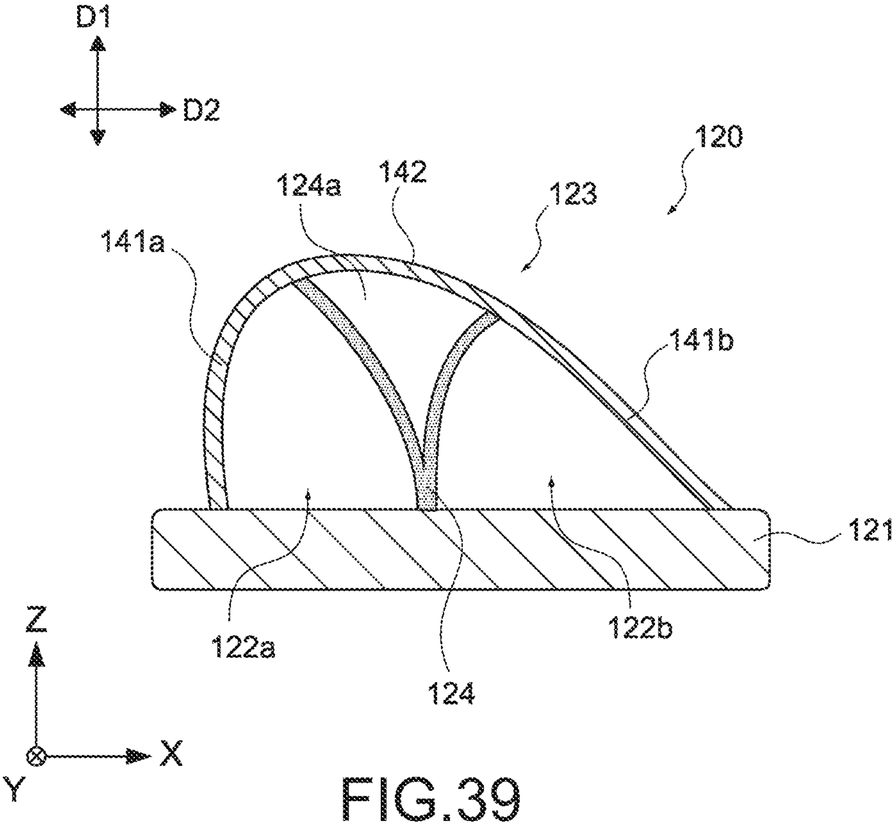
FIG. 39 A cross sectional diagram of a tactile sense presentation apparatus having the first specific configuration according to the embodiment of the present technology and including a boundary section of a different structure.
Figure 40:
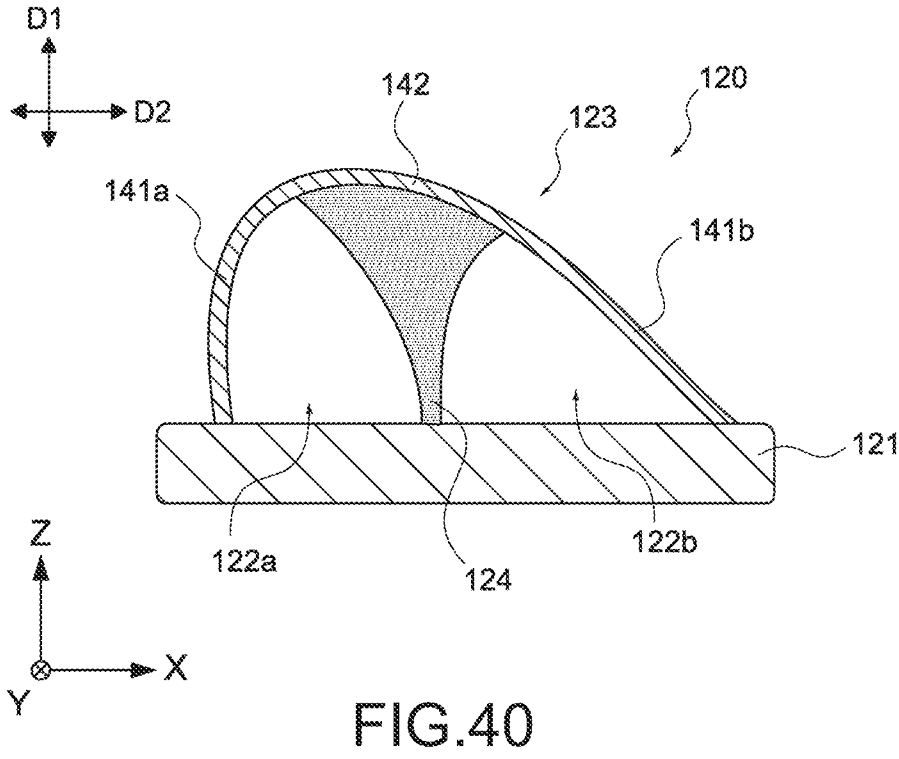
FIG. 40 A cross sectional diagram of the tactile sense presentation apparatus having the first specific configuration according to the embodiment of the present technology and including the boundary section of the different structure.
Figure 41:
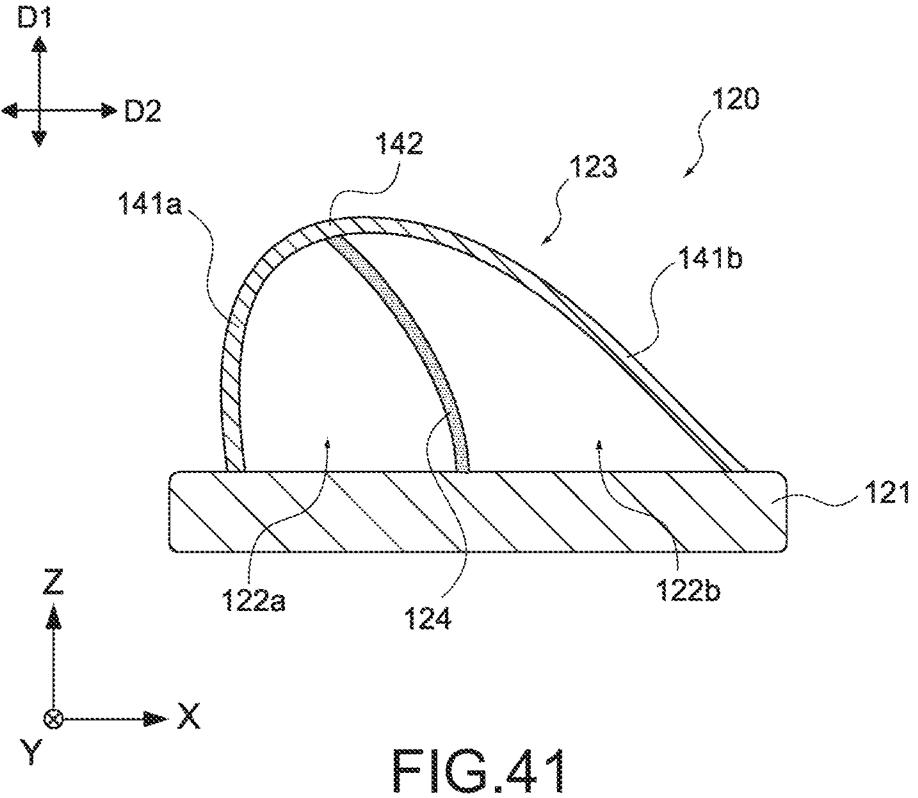
FIG. 41 A cross sectional diagram of the tactile sense presentation apparatus having the first specific configuration according to the embodiment of the present technology and including the boundary section of the different structure.

The configuration of the boundary section 124 can also be as follows: FIGS. 39 to 41 are cross sectional diagrams showing various configurations of the boundary section 124. As shown in FIG. 39, the boundary section 124 may be one that separates the first sealed space 145*a* and the second sealed space 145*b* and forms a space 124*a* between them. As shown in FIG. 40, the boundary section 124 may also fill between the first sealed space 145*a* and the second sealed space 145*b*. In the configuration shown in FIG. 39, the portion of the space 124*a* protrudes and softens, but this can be eliminated in the configuration shown in FIG. 40.

As shown in FIG. 41, the boundary section 124 may have a flat plate shape. In this configuration, the exposure section 123 is more easily displaced in the second direction D2. As described above, the boundary section 124 may have a bellows structure (see FIG. 14). In this configuration, the exposure section 123 is more easily displaced in the first direction D1 and the second direction D2. Furthermore, as shown in FIG. 38, the tactile sense presentation apparatus 120 may have the outer periphery 125 having a bellows structure. In this configuration, the exposure section 123 is easily displaced in the first direction D1 and the second direction S2, and the overall deformation of the exposure section 123 is easily increased.

[Various Configurations of Exposure Section]

Figure 42:
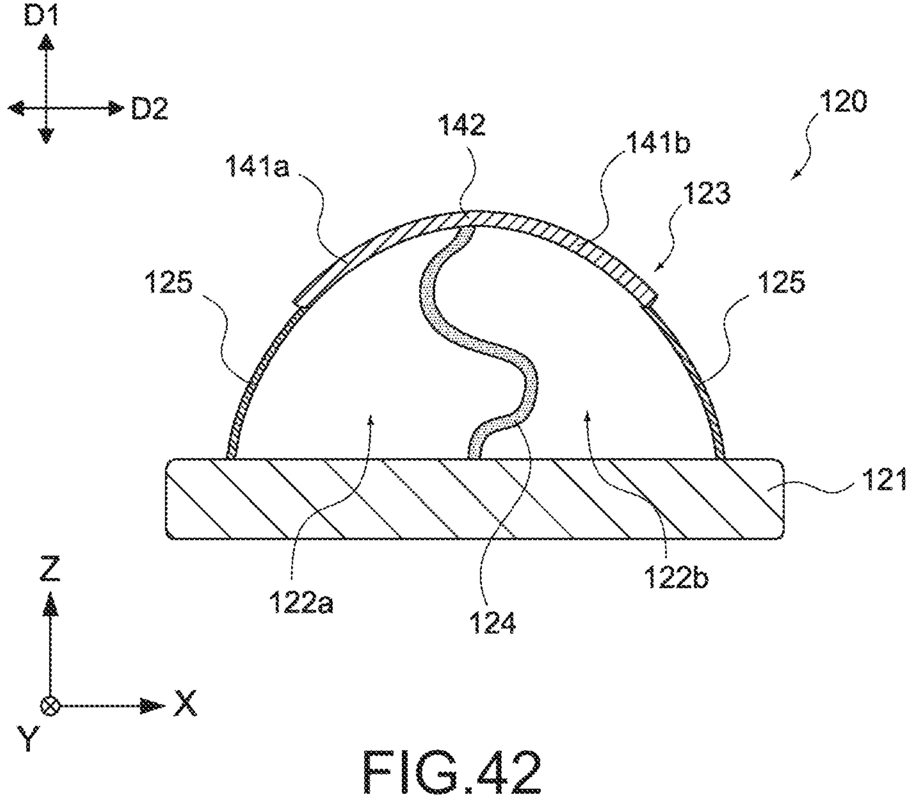
FIG. 42 A cross sectional diagram of the tactile sense presentation apparatus having the first specific configuration according to the embodiment of the present technology and including an exposure section of a different structure.
Figure 43:
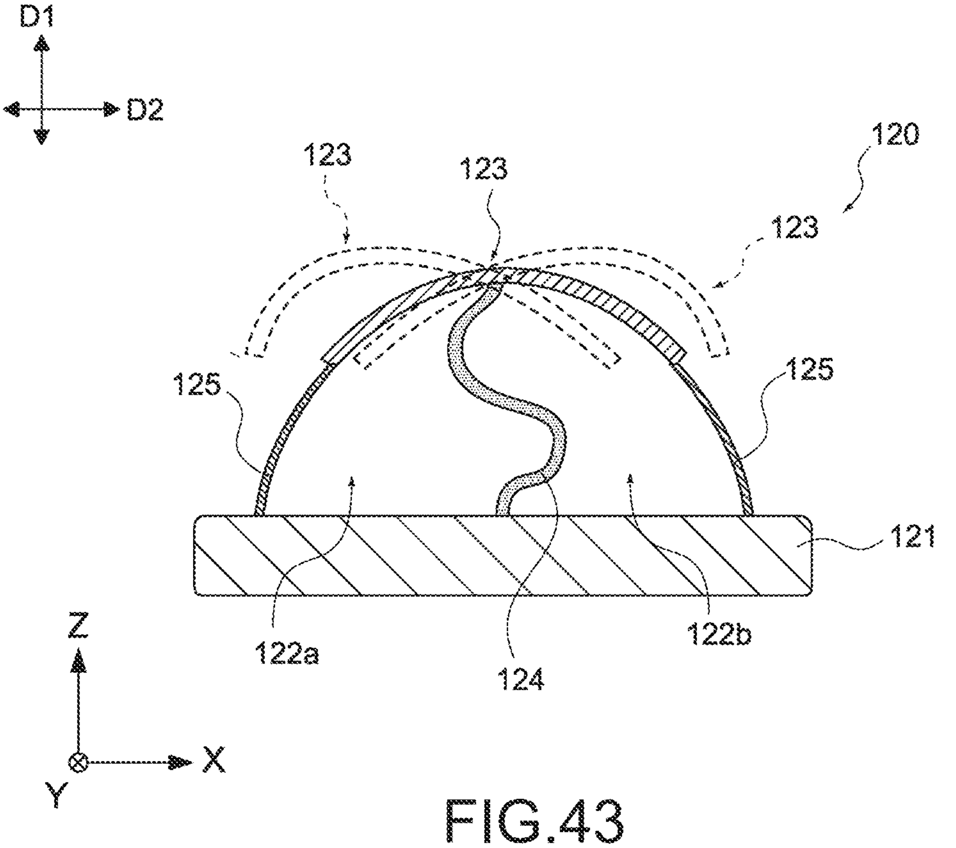
FIG. 43 A schematic diagram showing a modification of the exposure section of the tactile sense presentation apparatus.

The configuration of the exposure section 123 can also be as follows: FIGS. 42 to 50 are cross sectional diagrams showing various configurations of the exposure section 123. As described above, the exposure section 123 may cover the entire operation sections 122 (see FIG. 14). In this configuration, the exposure section 123 is required to be flexible and can have a seamless appearance and a tactile feeling. As shown in FIG. 42, the exposure section 123 may cover only an upper end portion of the operation sections 122 on which the finger touches. FIG. 43 is a schematic diagram showing the displacement of the exposure section 123. In this case, the exposure section 123 may be flexible or not flexible.

Figure 44:
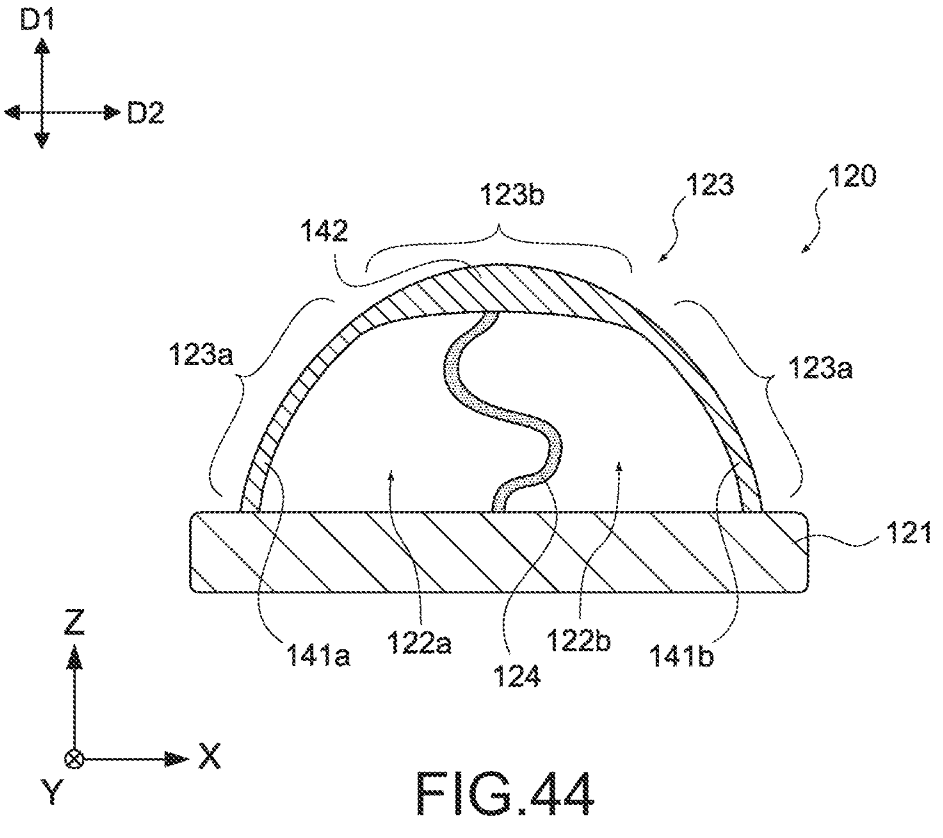
FIG. 44 A cross sectional diagram of the tactile sense presentation apparatus having the first specific configuration according to the embodiment of the present technology and including the exposure section of the different structure.
Figure 45:
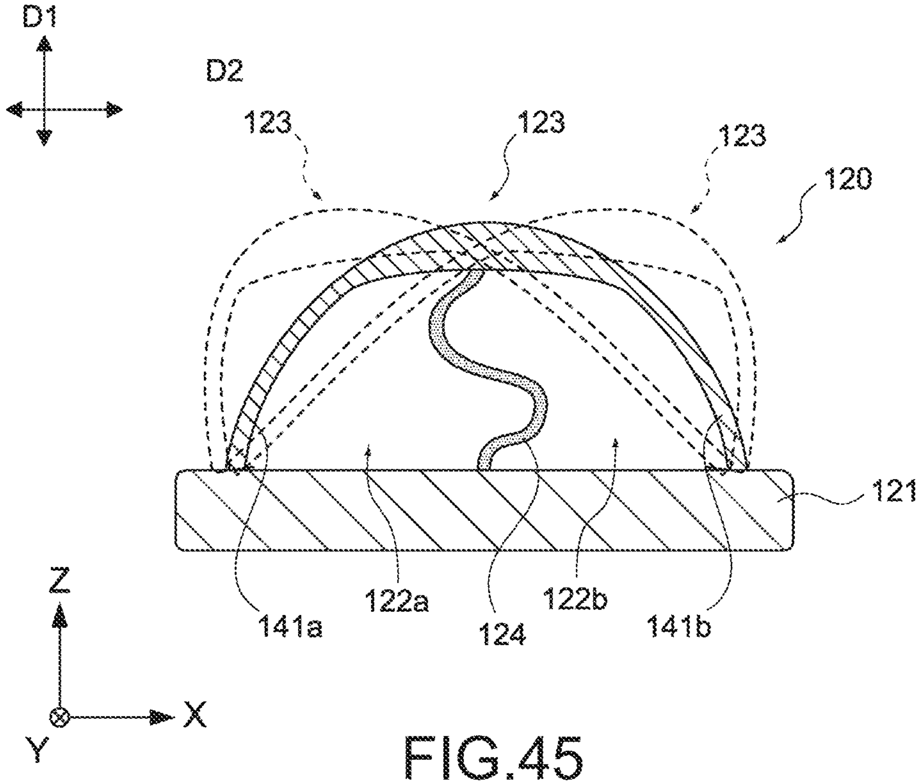
FIG. 45 A schematic diagram showing a modification of the exposure section of the tactile sense presentation apparatus.

Furthermore, as shown in FIG. 44, the exposure section 123 may have deformed portions 123*a* and a non deformed portion 123*b*. The non deformed portion 123*b* is harder or thicker than the deformed portions 123*a*, making it less prone to deformation. FIG. 45 is a schematic diagram showing the displacement of the exposure section 123. In this configuration, the area of the region A is less likely to change (see FIG. 22), allowing the finger to press in a constant area at all times and also making the displacement of the region A easier to see.

Figure 46:
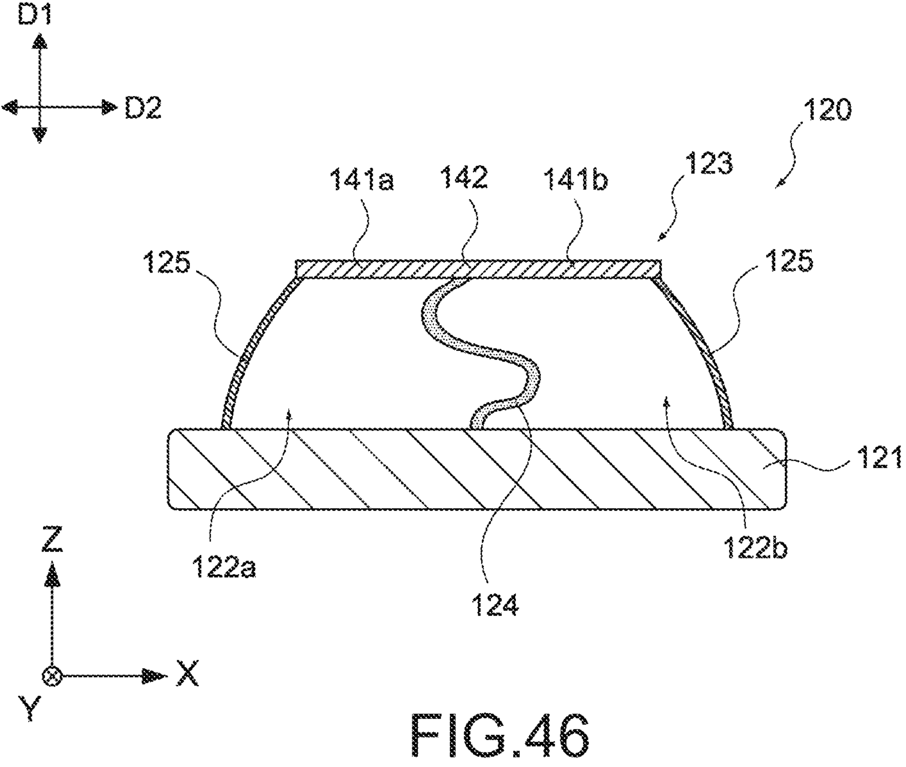
FIG. 46 A cross sectional diagram of the tactile sense presentation apparatus having the first specific configuration according to the embodiment of the present technology and including the exposure section of the different structure.
Figure 47:
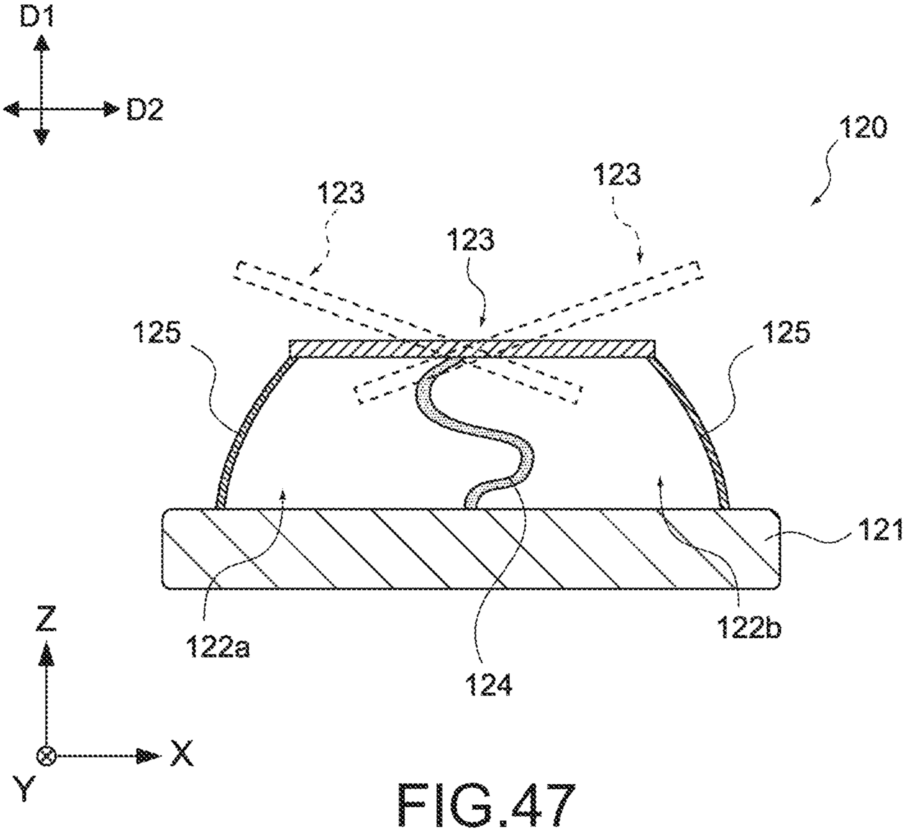
FIG. 47 A schematic diagram showing a modification of the exposure section of the tactile sense presentation apparatus.
Figure 48:
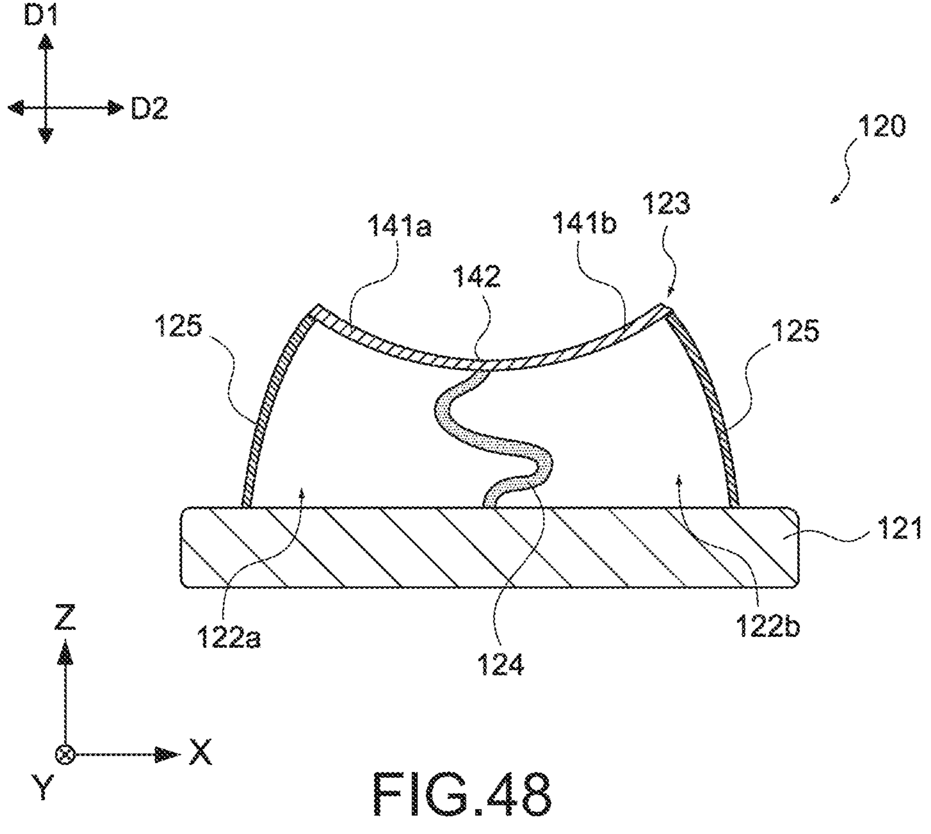
FIG. 48 A cross sectional diagram of the tactile sense presentation apparatus having the first specific configuration according to the embodiment of the present technology and including the exposure section of the different structure.
Figure 49:
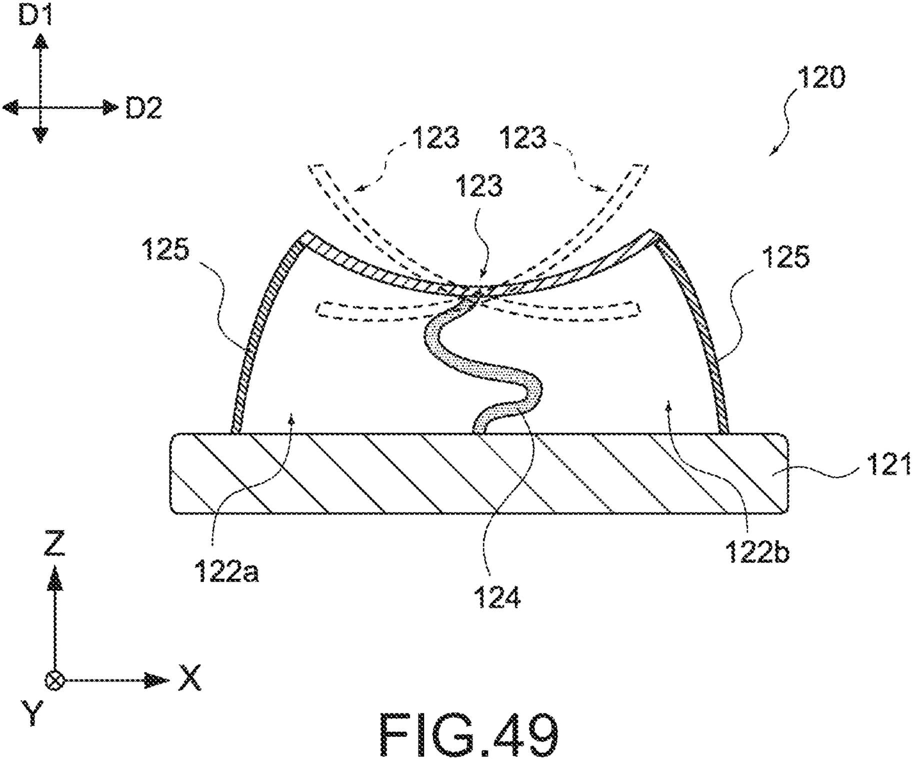
FIG. 49 A schematic diagram showing a modification of the exposure section of the tactile sense presentation apparatus.

With respect to a shape of the exposure section 123, if it is a convex shape as shown in FIGS. 42 and 43, the area of the region A is small and the displacement of the region A can be easily seen. On the other hand, the exposure section 123 may be flat as shown in FIG. 46. FIG. 47 is a schematic diagram showing the displacement of the exposure section 123. In this configuration, a change in inclination of the exposure section 123 is easier to see. Furthermore, as shown in FIG. 48, the exposure section 123 may be concave in shape. FIG. 49 is a schematic diagram showing the displacement of the exposure section 123. In this configuration, the exposure section 123 follows the shape of the finger, thus increasing a movement range of the region A.

Figure 50:
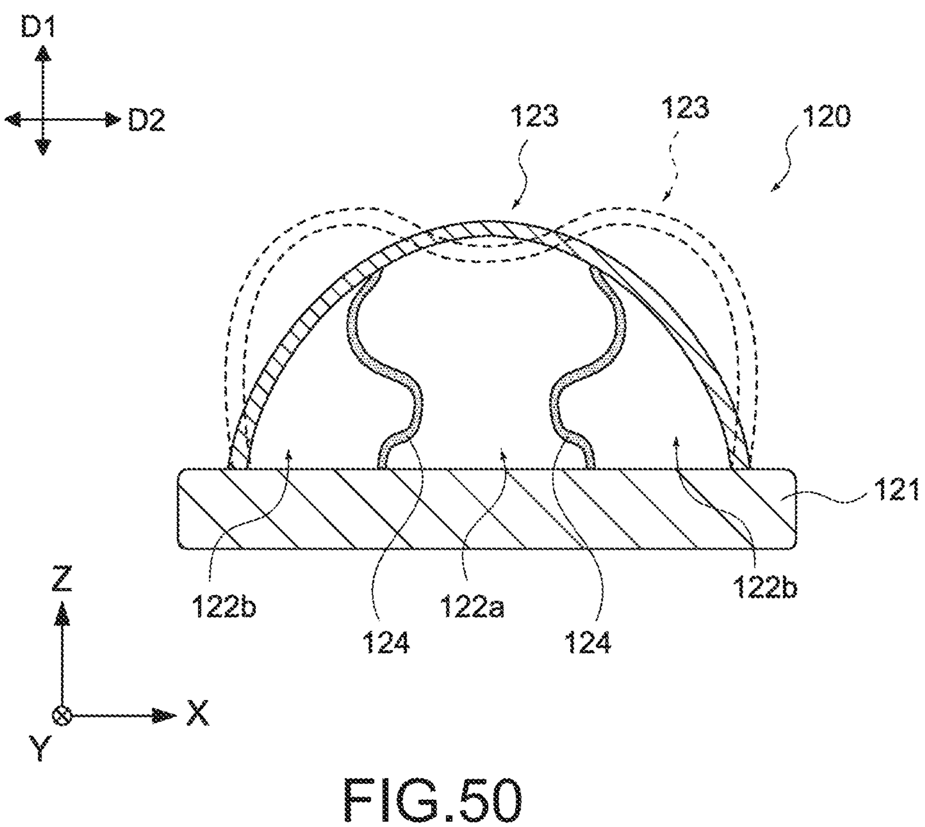
FIG. 50 A schematic diagram showing a modification of the exposure section of the tactile sense presentation apparatus having the first specific configuration according to the embodiment of the present technology.

As shown in FIG. 44, in a case in which the exposure section 123 has the deformed portions 123*a* and the non deformed portion 123*b*, the non deformed portion 123*b* can likewise have the convex shape, the flat shape, and the concave shape to change a mode of the tactile sense. As shown in FIG. 50, the exposure section 123 may change between the convex shape and the concave shape in response to the operation of the operation sections 122. The exposure section 123 changes between the convex shape and the concave shape when the boundary section 124 is annular as shown in FIG. 31. Thus, the tactile sense presentation apparatus 120 can change a mode of tactile sense depending on the shape of the exposure section 123.

[About Other Configurations]

Figure 51:
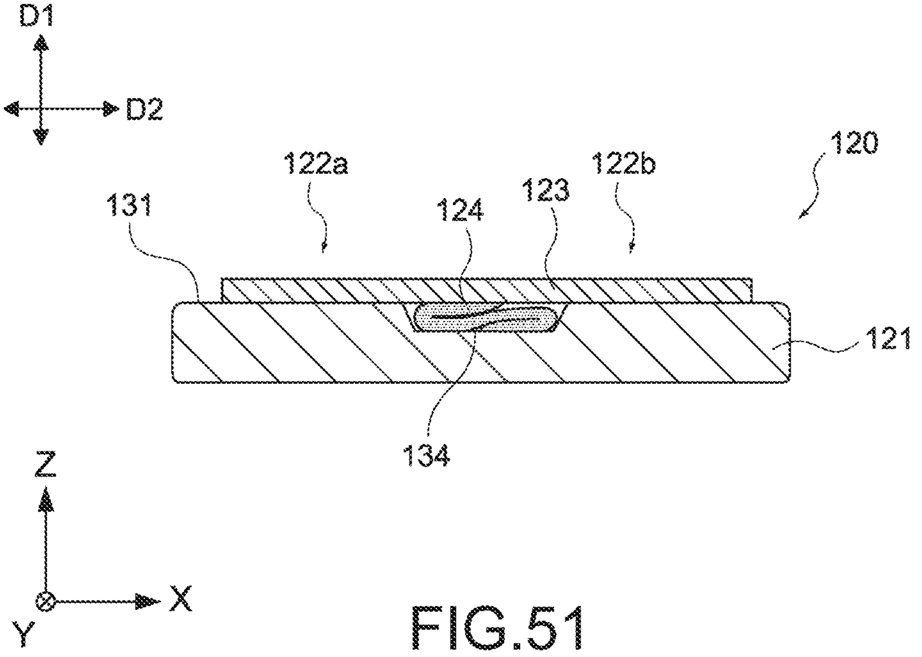
FIG. 51 A cross sectional diagram of a tactile sense presentation apparatus having other configuration of the first specific configuration according to the embodiment of the present technology.
Figure 52:
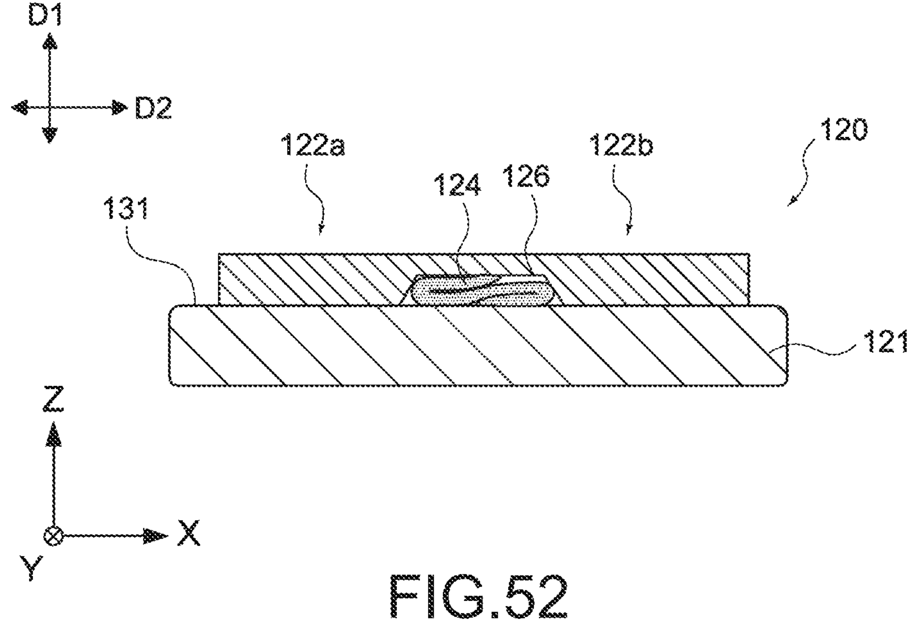
FIG. 52 A cross sectional diagram of a tactile sense presentation apparatus having other configuration of the first specific configuration according to the embodiment of the present technology.
Figure 53:
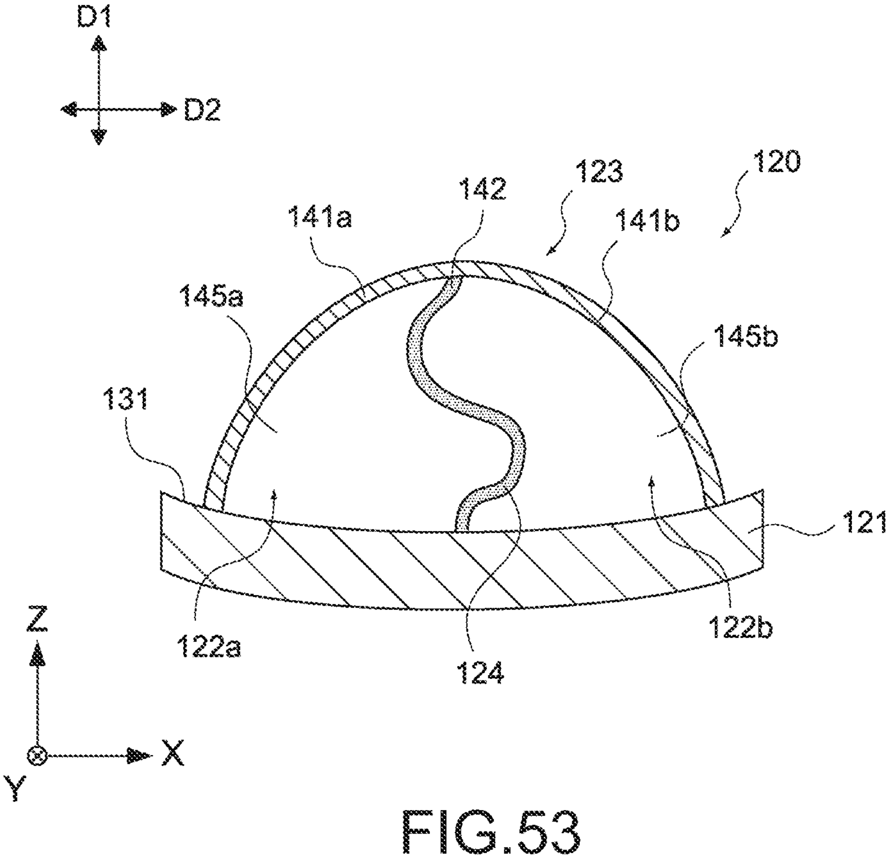
FIG. 53 A cross sectional diagram of a tactile sense presentation apparatus having other configuration of the first specific configuration according to the embodiment of the present technology.

Other configurations of the tactile sense presentation apparatus 120 will be described. FIGS. 51 to 53 are cross sectional diagram showing various configurations of the tactile sense presentation apparatus 120.

As shown in FIG. 51, the placement surface 131 of the enclosure section 121 may be provided with a concave portion 134. The concave portion 134 can accommodate the boundary section 124 when the bellows structure of the boundary section 124 is folded, thereby making the exposure section 123 flat. As shown in FIG. 52, a concave portion 126 may be provided on a side of the boundary section 124 of the exposure section 123. Similarly, the concave portion 126 can accommodate the boundary section 124 when the bellows structure of the boundary section 124 is folded, thereby making the exposure section 123 flat. In addition, both the enclosure section 121 and the exposure section 123 may be provided with concave portions that accommodate the boundary section 124 when the bellows structure is folded.

Furthermore, as shown in FIG. 53, the placement surface 131 of the enclosure section 121 may be the concave surface. The concave surface includes cylindrical, spherical, and other curved surfaces. By making the placement surface 131 to the concave surface, the exposure section 123 can be shaped to follow a convex skin shape of the finger or the like.

[Specific Configuration 2 of Tactile Sense Presentation Apparatus]

Figure 54:
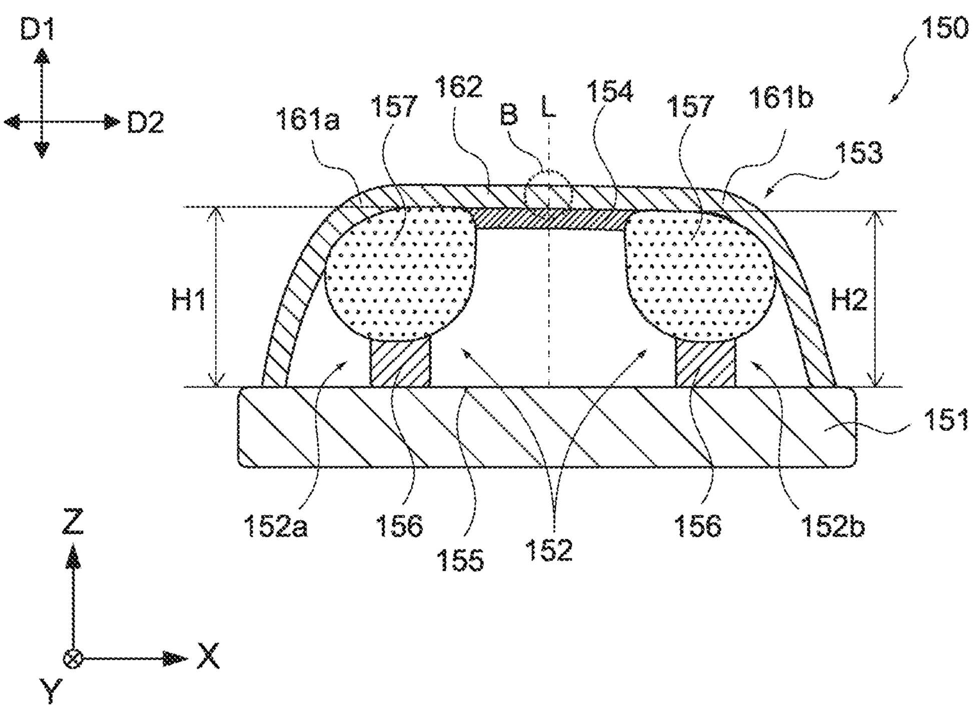
FIG. 54 A cross sectional diagram of a tactile sense presentation apparatus having a second specific configuration of according to the embodiment of the present technology.

As a specific configuration of the tactile sense presentation apparatus 100, a tactile sense presentation apparatus 150 will be described. FIG. 54 shows a cross sectional diagram of the tactile sense presentation apparatus 150. As shown in these figures, the tactile sense presentation apparatus 150 has an enclosure section 151, operation sections 152, an exposure section 153, and a boundary section 154.

The enclosure section 151 supports the operation sections 152. The enclosure section 151 has a placement surface 155 that faces the exposure section 153, on which the operation sections 152 are placed. A material of the enclosure section 151 is not limited and is made of metal or synthetic resin or the like. A shape of the enclosure section 151 is not limited, but has a disc shape, for example.

The operation sections 152 vary in heights with respect to the enclosure section 121. As shown in FIG. 54, the tactile sense presentation apparatus 150 has two operation sections 152, the two operation sections 152 being the first operation section 152*a* and the second operation section 152*b*. Each of the operation sections 152 varies in height in the first direction D1 with respect to the enclosure section 151. The first direction D1 is a direction of approach and leave to/from the enclosure section 151. In FIG. 54, a height of the first operation section 152*a* in the first direction D1 is defined as a height H1, and a height of the second operation section 152*b* in the first direction D1 is defined as a height H2. The tactile sense presentation apparatus 150 may have three or more operation sections 152.

As shown in FIG. 54, each of the operation sections 152 has a drive section 156 and a flexible section 157. The drive section 156 is an extend/contract mechanism that extends and contracts along the first direction D1 by electromagnetic force of a solenoid actuator. The flexible section 157 has flexibility and is placed between the drive section 156 and the exposure section 153. The flexible section 157 may be made of a flexible material or may be made by sealing a fluid such as air with a flexible membrane. Not all of the operation sections 152 may be provided with the drive section 156 and the flexible section 157, and the tactile sense presentation apparatus 150 may be provided with the operation sections 152 that vary in heights according to other configurations.

The exposure section 153 is passively deformed by the change in the heights of the operation sections 152. The exposure section 153 is a membrane like member having flexibility and covers the outer periphery of the operation sections 152. The outer periphery of the exposure section 153 is bonded to the enclosure section 151 by adhesion or other means. As shown in FIG. 54, the exposure section 153 has a first contact portion 161*a*, a second contact portion 161*b*, and a middle portion 162. The first contact portion 161*a* is a portion of the exposure section 153 with which the first operation section 152*a* makes contact, and the second contact portion 161*b* is a portion of the exposure section 153 with which the second operation section 152*b* makes contact. The middle portion 162 is a portion between the first contact portion 161*a* and the second contact portions 161*b* and is bonded to the boundary section 154.

The boundary section 154 is placed between the first operation section 152*a* and the second operation section 152*b*, connects the flexible section 157 of the first operation section 152*a* and the flexible section 157 of the second operation section 152*b*, and gives and receives a tensile force between them.

[Operation of Tactile Sense Presentation Apparatus]

Figure 55:
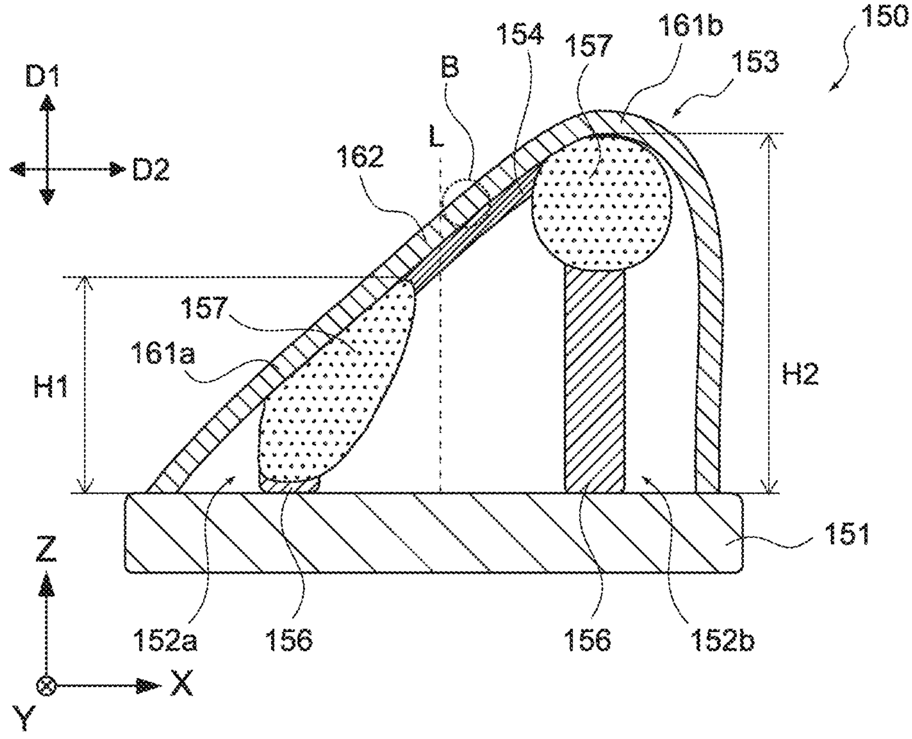
FIG. 55 A schematic diagram showing an operation of the tactile sense presentation apparatus.
Figure 56:
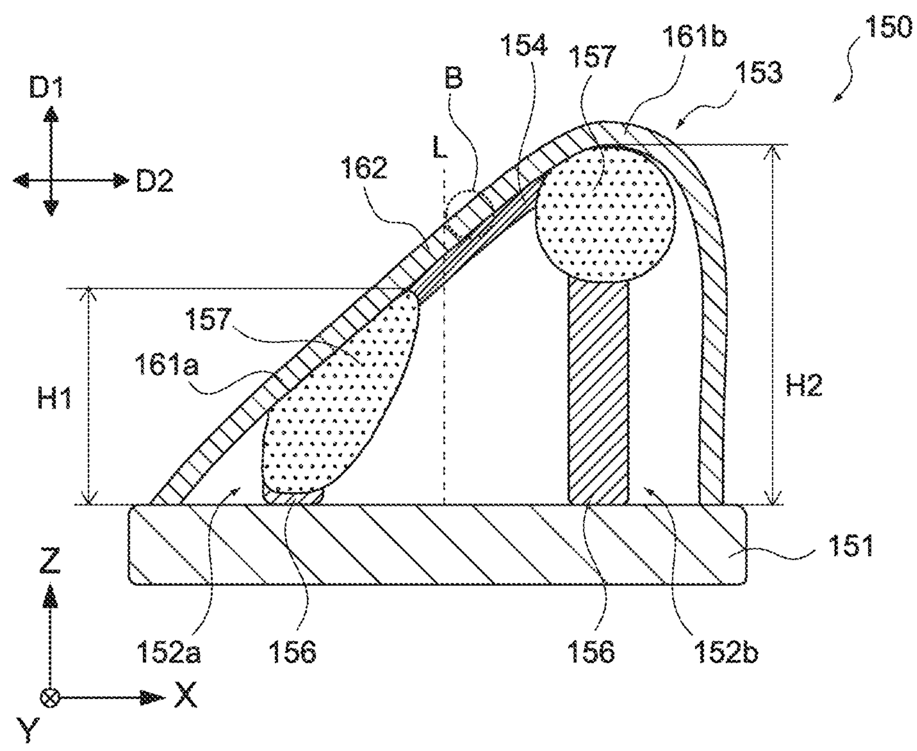
FIG. 56 A schematic diagram showing the operation of the tactile sense presentation apparatus.

An operation of the tactile sense presentation apparatus 150 will be described. FIGS. 55 and 56 are schematic diagram showing the operation of the tactile sense presentation apparatus 150. As shown in FIG. 55, when the drive section 156 of the second operation section 152*b* is driven, a height H2 of the second operation section 152*b* is increased. Here, since the flexible section 157 of the first operation section 152*a* and the flexible section 157 of the second operation section 152*b* are connected by the boundary section 154, the flexible section 157 of the first operation section 152*a* and the flexible section 157 of the second operation section 152*b* receive the tensile force from the boundary section 124, and the flexible section 157 of the first operation section 152*a* is pulled to a second contact portion 161*b* side. As a result, the middle portion 162 is pulled toward a second contact portion 161*b* side and displaced toward the second contact portion 161*b* side. A point of the middle portion 162 is shown as a circle B in FIGS. 54 to 56 to represent the positional relationship with respect to the reference line L. The reference line L has a fixed position with respect to the enclosure section 151.

Furthermore, when each drive section 156 is driven such that the height H2 of the second operation section 152*b* is higher and the height H1 of the first operation section 152*a* is lower as shown in FIG. 56, the difference between the height H2 and the height H1 becomes even larger, and the middle portion 162 is pulled further toward the second contact portion 161*b* side and is further displaced toward the second contact portion 161*b* side. Thus, the displacement of the middle portion 162 includes the component S1 in the first direction D1 and the component S2 in the second direction D2 (see FIG. 8), and the magnitudes of the component S1 and the component S2 vary according to the height H1 of the first operation section 152*a* and the height H2 of the second operation section 152*b*.

As described above, also in tactile sense presentation apparatus 150, as in the tactile sense presentation apparatus 120, it is possible to control the position, the movement, the area, and the pressing force of the region A (see FIG. 22) on which the finger touches by means of the height H1 and the height H2.

[About Another Configurations]

Figure 57:
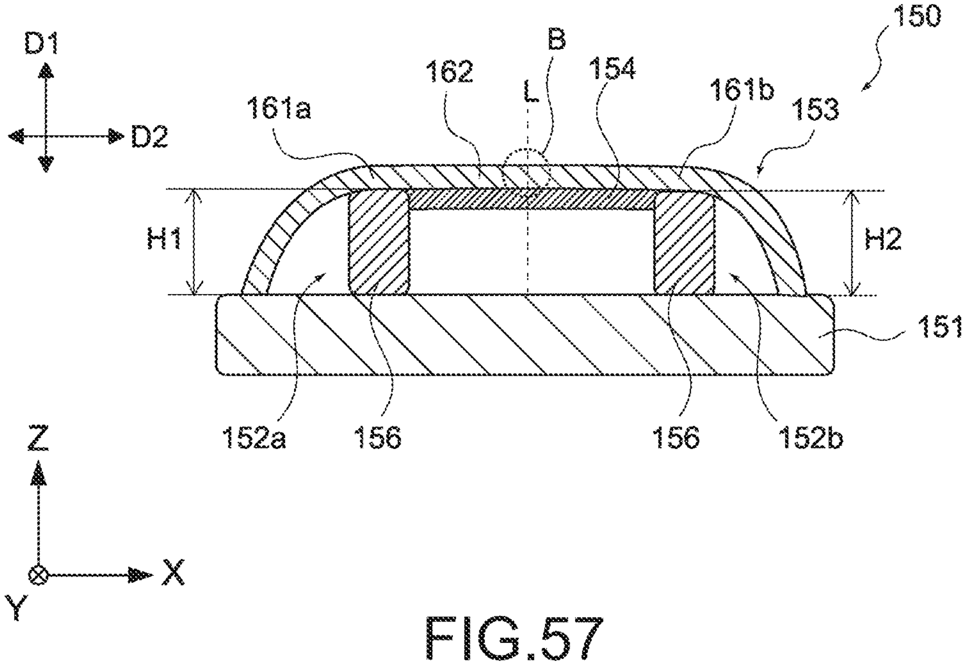
FIG. 57 A cross sectional diagram of a tactile sense presentation apparatus having other configuration of the second specific configuration of according to the embodiment of the present technology.

Another configurations of the tactile sense presentation apparatus 150 will be described. FIG. 57 is a cross sectional diagram of the tactile sense presentation apparatus 150 with another configuration. As shown in the same figure, the tactile sense presentation apparatus 150 may have the first operation section 152*a* and the second operation section 152*b* including no flexible section 157 and including only the drive sections 156. In this configuration, the boundary section 154 connects the drive section 156 of the first operation section 152*a* and the drive section 156 of the second operation section 152*b*, and gives and receives the tensile force between them.

Figure 58:
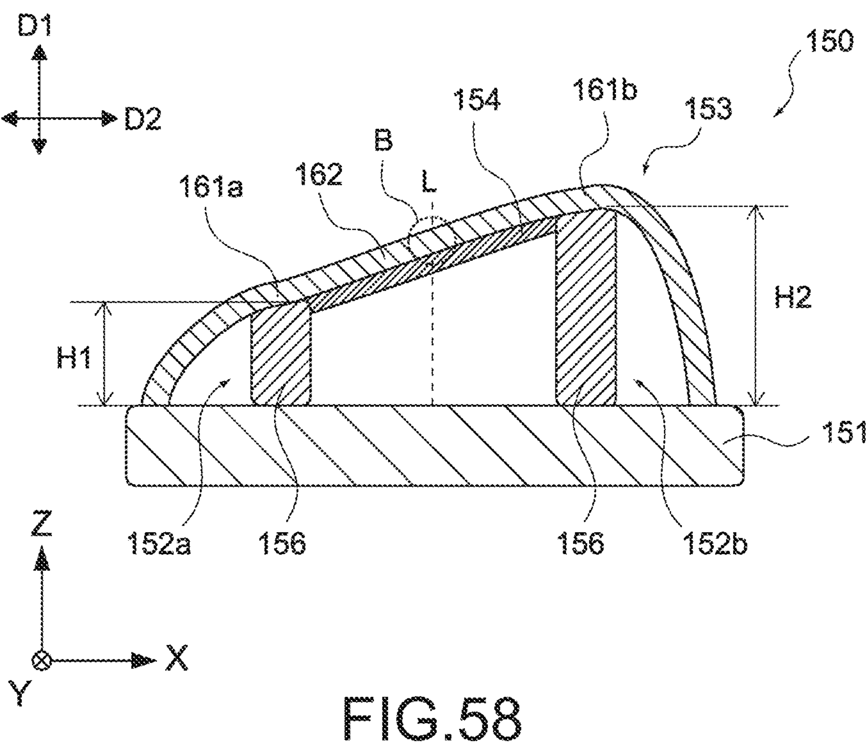
FIG. 58 A schematic diagram showing an operation of the tactile sense presentation apparatus.
Figure 59:
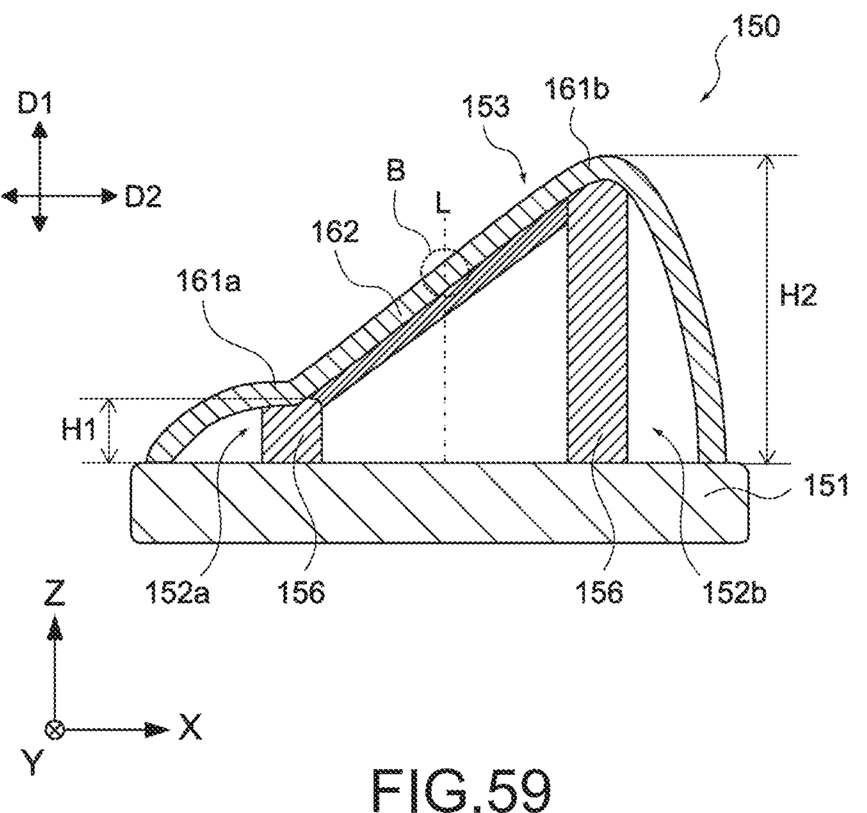
FIG. 59 A schematic diagram showing the operation of the tactile sense presentation apparatus.

In this configuration, as shown in FIGS. 58 and 59, if a difference is made between the height H1 of the first operation section 152*a* and the height H2 of the second operation section 152*b*, the displacement of the middle portion 162 includes only the component S1 in the first direction D1 (see FIG. 8) and does not include the component S2 in the second direction D2. Therefore, in this configuration, it is not possible to control the position and the movement of the region A (see FIG. 22) on which the finger touches by the height H1 and the height H2, but it is possible to control the area and the pressing force of the region A.

[About Tactile Sense Presentation System]

Figure 60:
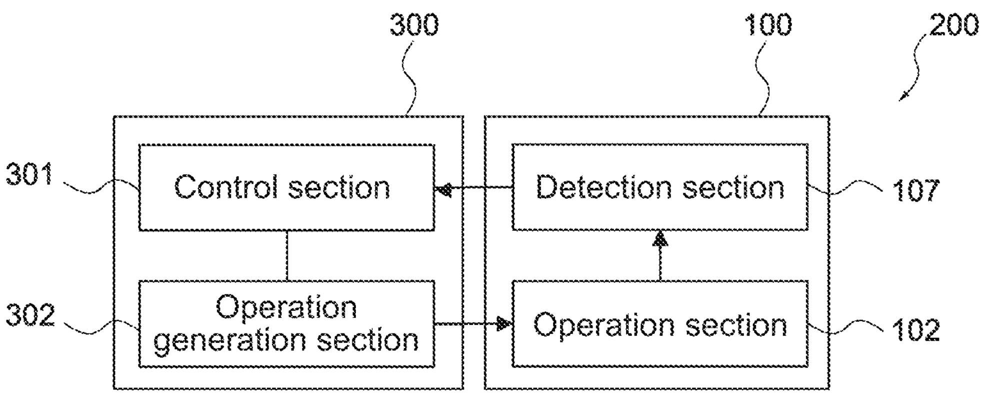
FIG. 60 A bock diagram of a tactile sense presentation system according to an embodiment of the present technology.

The tactile sense presentation apparatus 100 according to the present embodiment can constitute a tactile sense presentation system. FIG. 60 is a block diagram of a tactile sense presentation system 200. As shown in the same figure, the tactile sense presentation system 200 has the tactile sense presentation apparatus 100 and the control apparatus 300.

The tactile sense presentation apparatus 100 has the configuration described above. The tactile sense presentation apparatus 100 may also have a detection section 107. The detection section 107 detects displacement or a pressing force of the exposure section 103. The control apparatus 300 has a control section 301 and an operation generation section 302. The control section 301 and the operation generation section 302 are functional configurations realized by cooperation of software and hardware.

The control section 301 generates an operation pattern for the tactile sense presentation apparatus 100 based on a shape of the virtual object to be presented to the user. In doing so, the control section 301 may generate the operation pattern using a detection result of the detection section 107. The operation generation section 302 determines the control parameters for each of the operation sections 102 based on the operation pattern generated by the control section 301. The control parameter is a parameter that defines the height of each of the operation sections 102, for example, a pressure of the sealed space in the configuration of the tactile sense presentation apparatus 120 or an operation amount of the drive section in the configuration of the tactile sense presentation apparatus 150.

Figure 61:
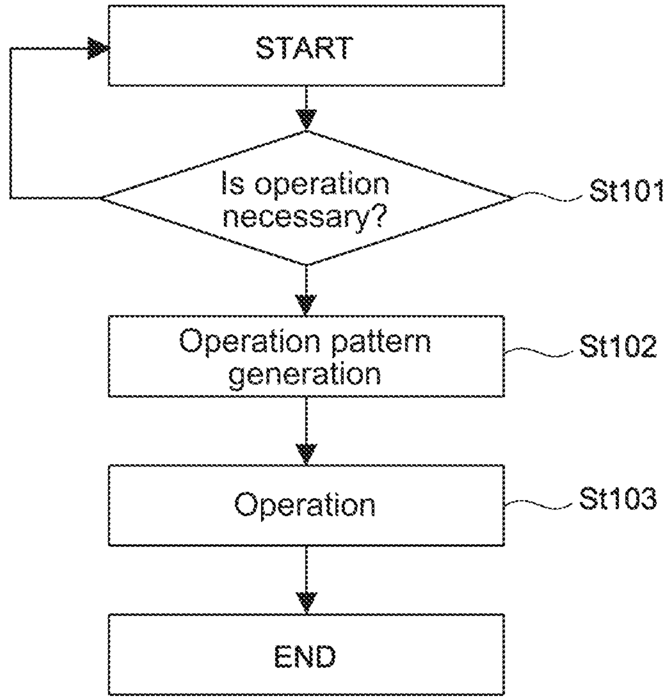
FIG. 61 A flowchart showing an operation of the tactile sense presentation system.

FIG. 61 is a flowchart showing the operation of the tactile sense presentation system 200. The control section 301 determines whether or not the operation of the tactile sense presentation apparatus 100 is necessary based on VR (Virtual Reality) contents, etc. (St101). If the operation of the tactile sense presentation apparatus 100 is necessary (St101; Yes), the operation pattern is generated based on the shape of the virtual object, etc. (St102), and is supplied to the operation generation section 302. The operation generation section 302 generates the control parameters based on the operation pattern, and supplies them to each of the operation sections 102 to cause each of the operation sections 102 to operate (St103).

Figure 62:
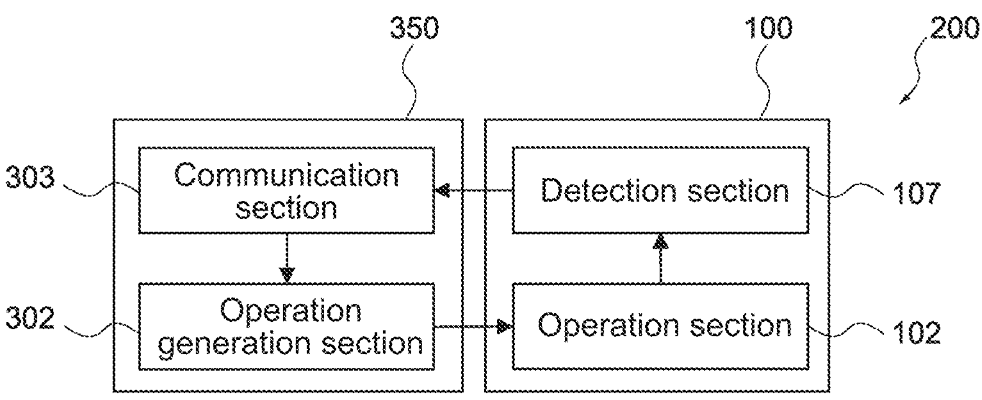
FIG. 62 A block diagram of a tactile sense presentation system having a different configuration according to the embodiment of the present technology.

The tactile sense presentation system according to the present embodiment can also be configured as follows: FIG. 62 is a block diagram of the tactile sense presentation system 200 with another configuration. As shown in the same figure, the tactile sense presentation system 200 has the tactile sense presentation apparatus 100 and a control apparatus 350, and the control apparatus 350 has the operation generation section 302 and a communication section 303. The operation generation section 302 and the communication section 303 are functional configurations realized by cooperation of software and hardware.

The communication section 303 receives the operation pattern from other information processing apparatus and supplies the received operation pattern to the operation generation section 302. When the tactile sense presentation apparatus 100 has the detection section 107, the communication section 303 transmits the detection result of the detection section 107 to other information processing apparatus. The operation generation section 302 determines the control parameters for each of the operation sections 102 based on the operation pattern received by the communication section 303. The control parameters are the same as those described above.

Figure 63:
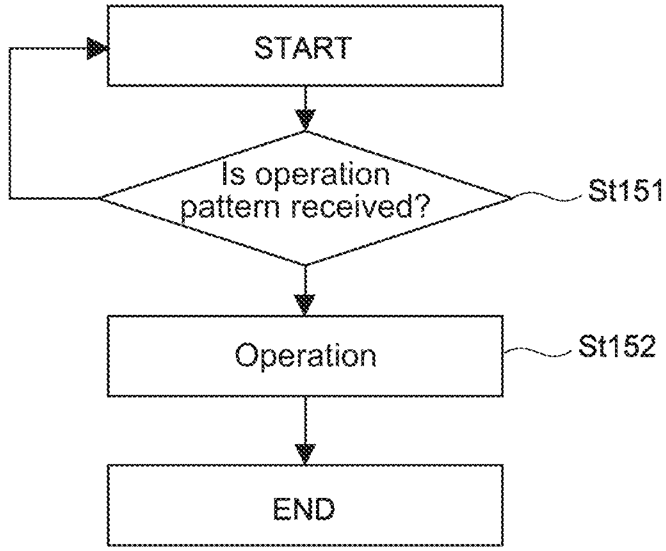
FIG. 63 A flowchart showing an operation of the tactile sense presentation system.

FIG. 63 is a flowchart showing the operation of the tactile sense presentation system 200. When the communication section 303 receives a control pattern from other information processing apparatus (St 151; Yes), it supplies the operation pattern to the operation generation section 302. The operation generation section 302 generates the control parameters based on the operation pattern and supplies them to each of the operation sections 102 to operate each of the operation sections 102 (St152).

[About Control Parameters]

Figure 64:
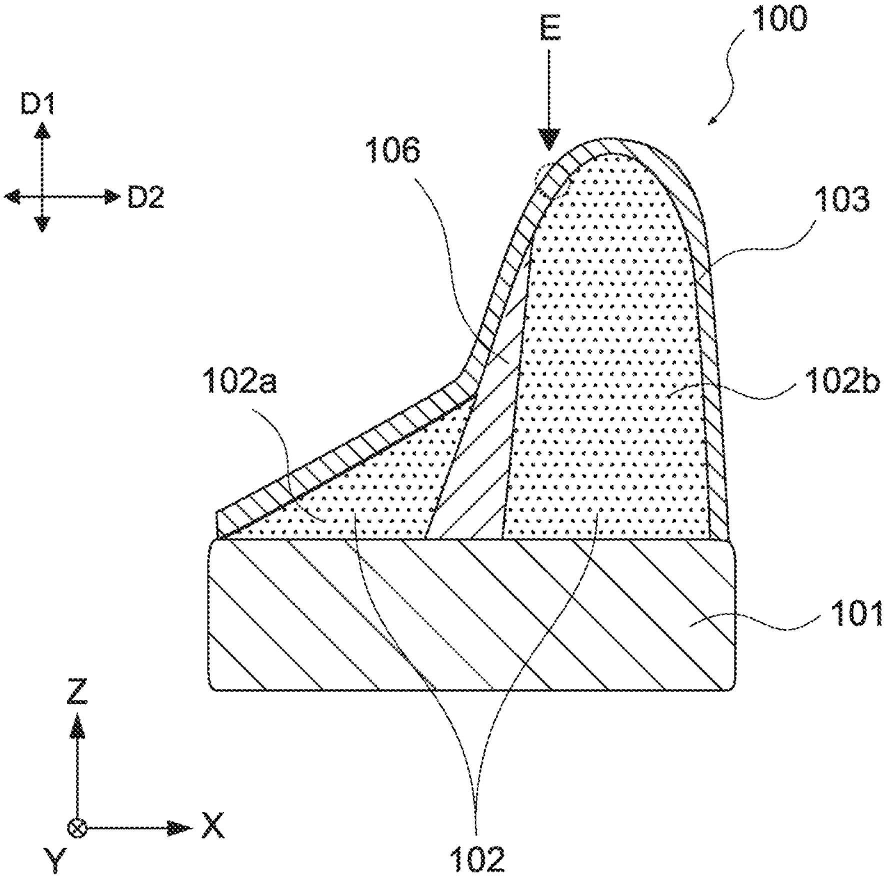
FIG. 64 A schematic diagram showing a method of generating control parameters of operation sections of the tactile sense presentation system according to the embodiment of the present technology.
Figure 65:
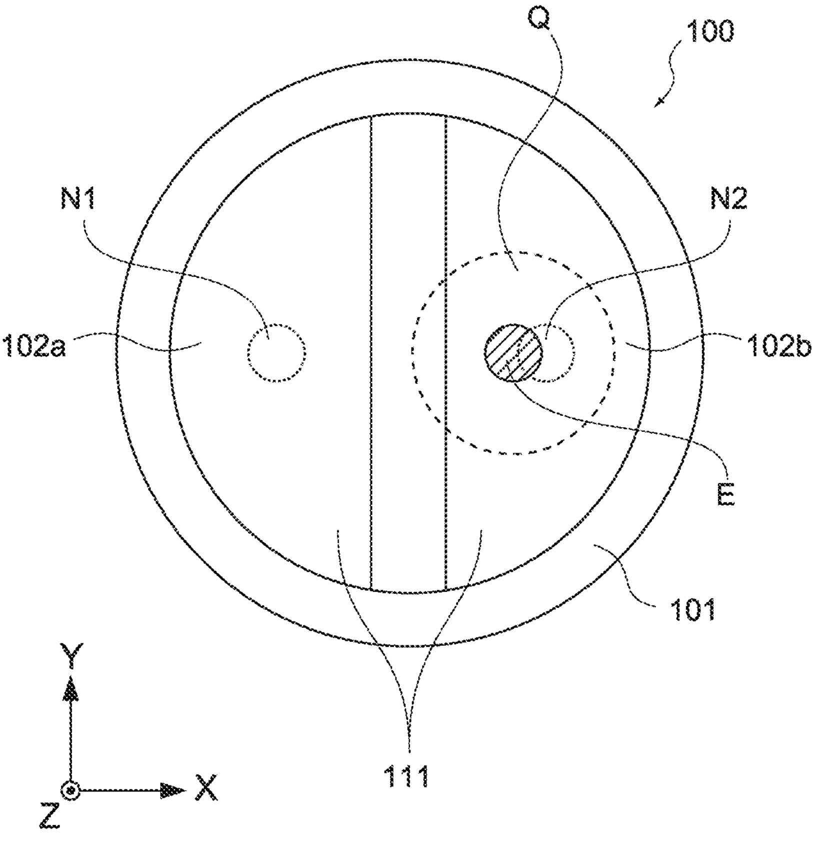
FIG. 65 A schematic diagram showing the method of generating control parameters of the operation sections of the tactile sense presentation system.
Figure 66:
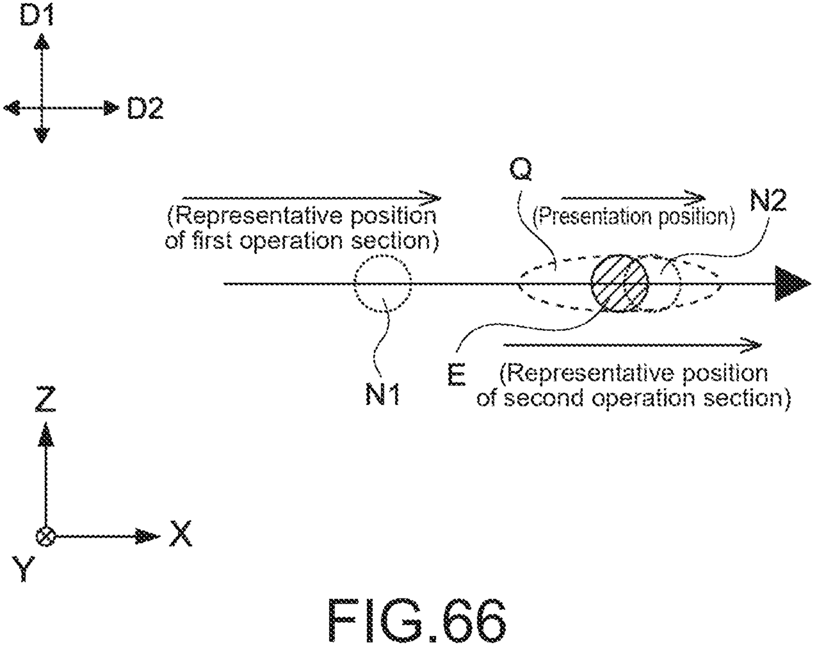
FIG. 66 A schematic diagram showing the method of generating control parameters of the operation sections of the tactile sense presentation system.

Details of the control parameters generated by the operation generation section 302 will be described. FIGS. 64 to 66 are schematic diagram showing how the control parameters are generated. As shown in these figures, the operation generation section 302 can generate the control parameters based on a presentation position E and a representative position N of each of the operation sections 102.

The presentation position E is a position at which the pressure stimulation is to be presented to the user and is a position at which the height of the first direction D1 is highest in the exposure section 103. The representative position N of the operation sections 102 is a position that protrudes the most in the exposure section 103 when the height of that operation section 102 is the highest and the height of the other operation section 102 is the lowest. The representative position of the first operation section 102*a* is shown in FIGS. 65 and 66 as the representative position N1, and the representative position of the second operation section 102*b* is shown as the representative position N2. The operation generation section 302 can generate the control parameters based on a distance between the presentation position E and the representative position N of each operation section 102.

Furthermore, in addition to the presentation position E and the representative position N of each operation section 102, the operation generation section 302 can also generate the control parameters based on the area of a presentation region Q. The presentation region Q is a region of the exposure section 103 that is to be touched with the finger of the user, and is a region area in the exposure section 103 where the height in the first direction D1 is to be above a certain level.

Specifically, the operation generation section 302 can generate the control parameters using the following (Equation 1), (Equation 2) or (Equation 3).

[Math. 1]

$$(\text{Control parameter of operation section } i) = maxP - s\times\left(\overrightarrow{\begin{pmatrix}\text{Presentation}\\ \text{position}\end{pmatrix}} - \overrightarrow{\begin{pmatrix}\text{Representative position}\\ \text{of operation section } i\end{pmatrix}}\right) \quad \text{(Equation 1)}$$

(In (Equation 1), maxP is a maximum value of the control parameter, and s is a parameter negatively correlated with the area of the presentation region Q.

[Math. 2]

$$(\text{Control parameter of operation section } i) = a\times\left(\overrightarrow{\begin{pmatrix}\text{Presentation}\\ \text{position}\end{pmatrix}} - \overrightarrow{\begin{pmatrix}\text{Representative position}\\ \text{of operation section } i\end{pmatrix}}\right) + b \quad \text{(Equation 2)}$$

(In (Equation 2), a and b are constants.

[Math. 3]

$$(\text{Control parameter of operation section } i) = f\left(\overrightarrow{\begin{pmatrix}\text{Presentation}\\ \text{position}\end{pmatrix}}, \overrightarrow{\begin{pmatrix}\text{Representative position}\\ \text{of operation section } i\end{pmatrix}}\right) \quad \text{(Equation 3)}$$

(In (Equation 3), f is some function.

A method of generating the control parameters by the operation generation section 302 is not limited to those described above, and the control parameters may be generated using an operation generation section 302 data driven model building method, a machine learning, or the like.

Figure 67:
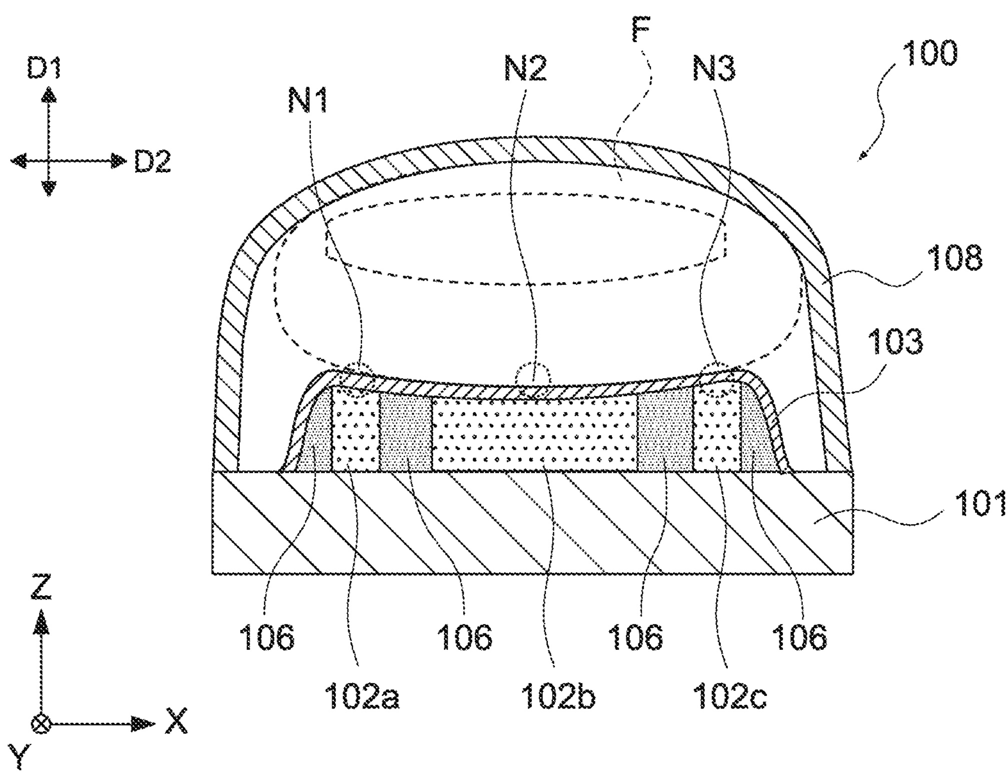
FIG. 67 A schematic diagram showing a representative position of each operation section of a tactile sense presentation apparatus included in the tactile sense presentation system.
Figure 68:
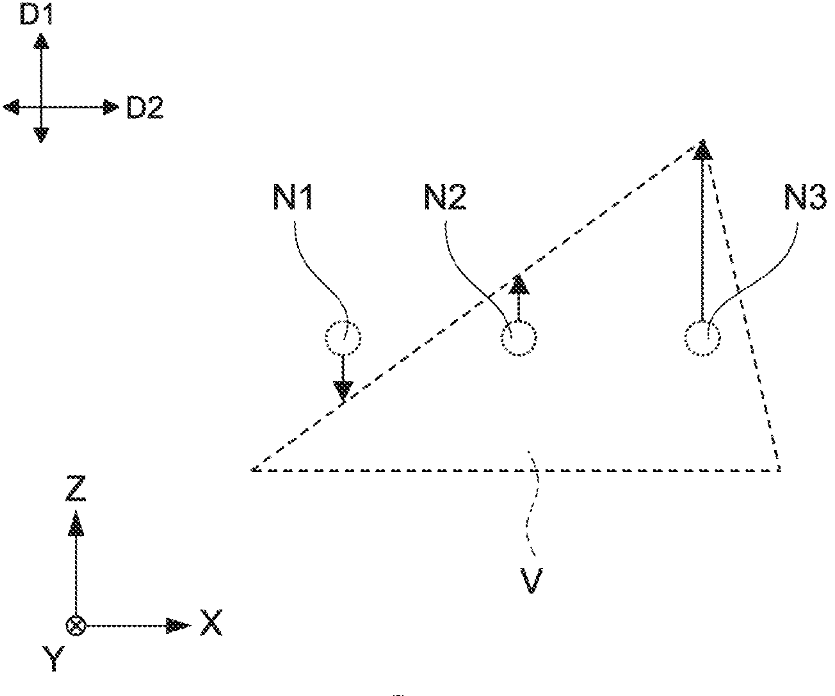
FIG. 68 A schematic diagram showing a shape of a presentation subject presented by the tactile sense presentation apparatus.
Figure 69:
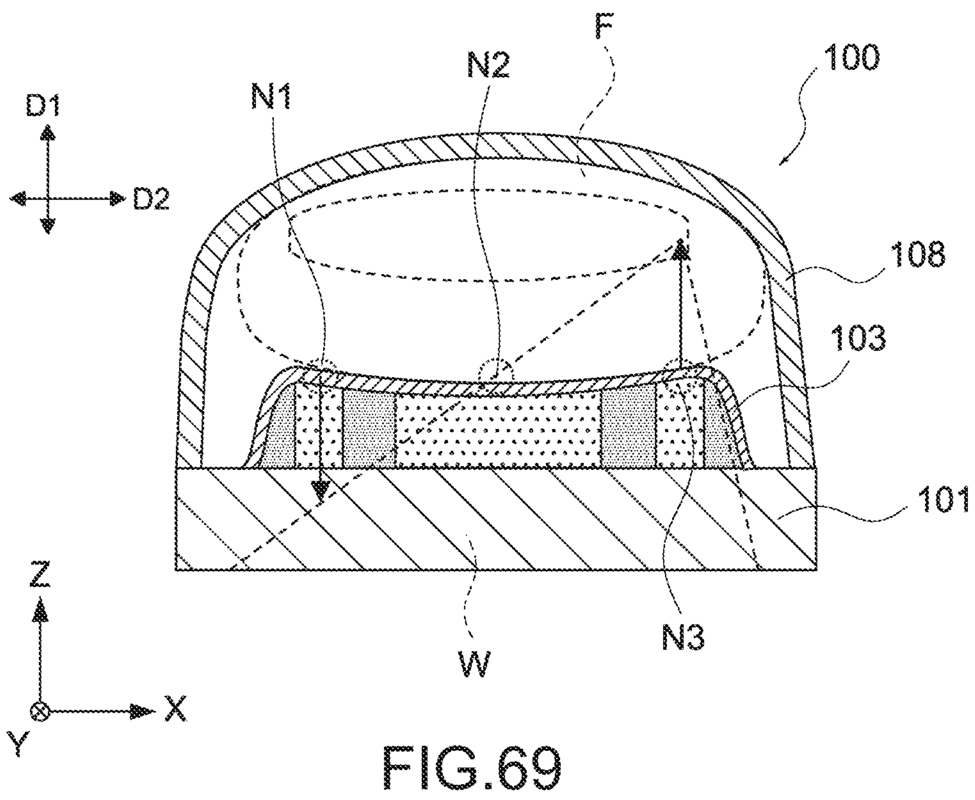
FIG. 69 A schematic diagram showing a positional relationship between the representative position of each operation section of the tactile sense presentation apparatus and the presentation subject.
Figure 70:
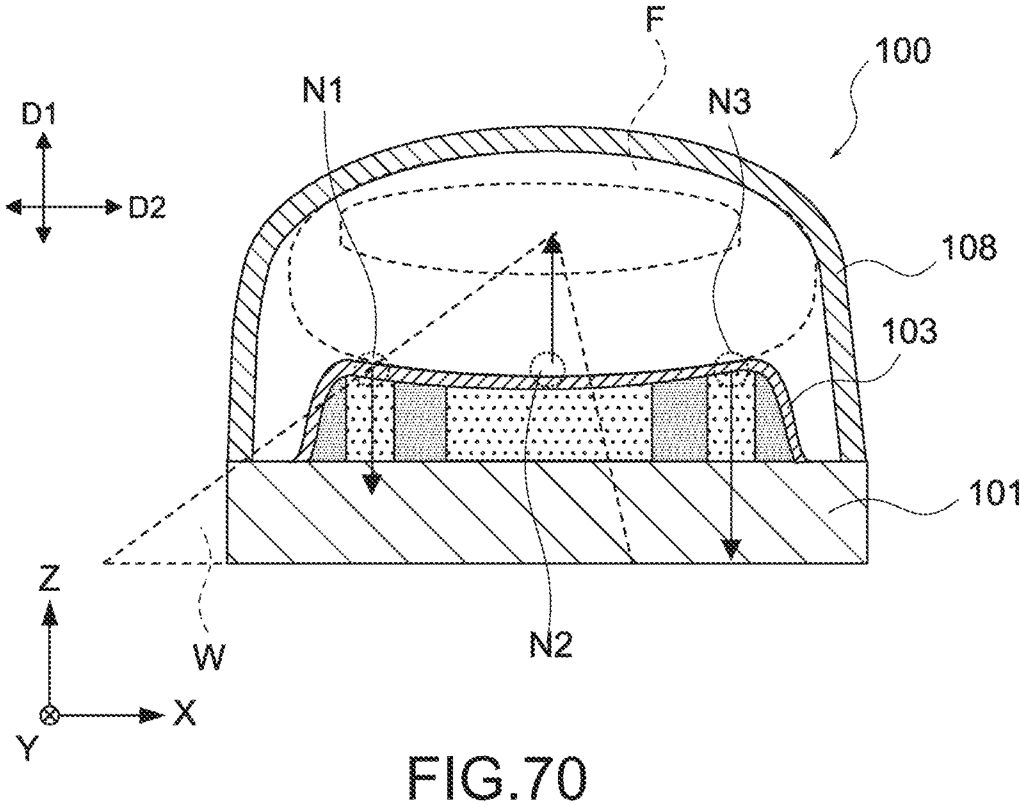
FIG. 70 A schematic diagram showing the relationship between the representative position of each operation section of the tactile sense presentation apparatus and the position of the presentation subject.
Figure 71:
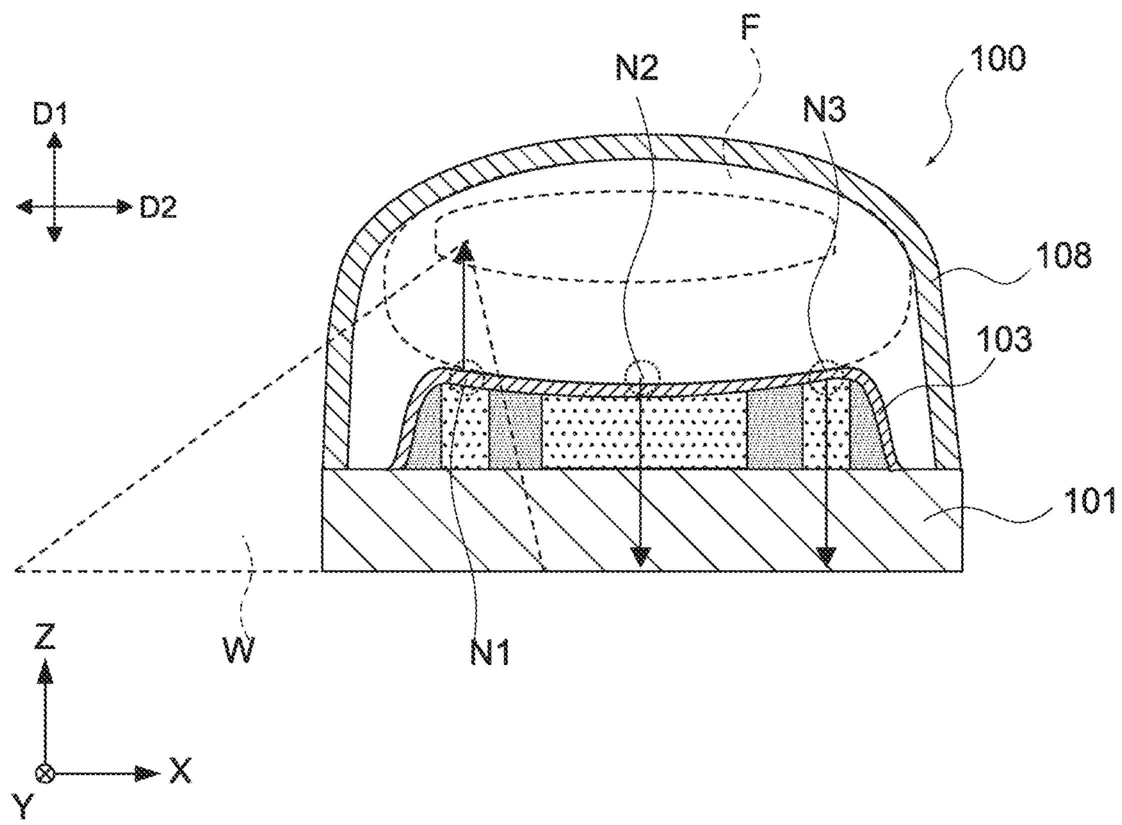
FIG. 71 A schematic diagram showing the relationship between the representative position of each operation section of the tactile sense presentation apparatus and the position of the presentation subject.
Figures 72, 73:
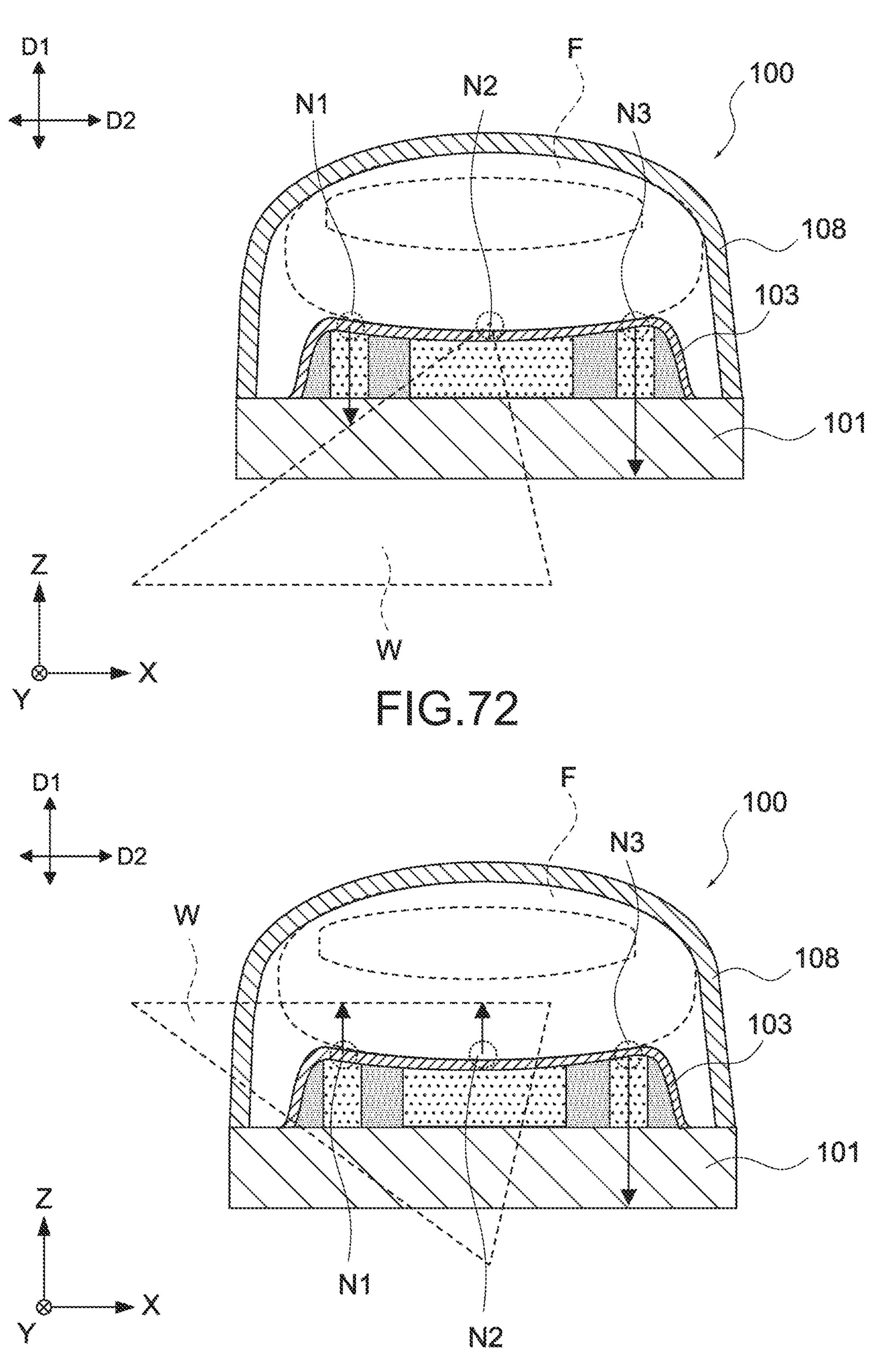
FIG. 72 A schematic diagram showing the relationship between the representative position of each operation section of the tactile sense presentation apparatus and the position of the presentation subject.
FIG. 73 A schematic diagram showing the relationship between the representative position of each operation section of the tactile sense presentation apparatus and the position of the presentation subject.

The operation generation section 302 can also generate the control parameters based on a shape of a presentation subject and the representative position of each of the operation sections 102. FIGS. 67 and 68 are schematic diagrams showing this method of generating the control parameters. FIG. 67 shows the finger F secured to the tactile sense presentation apparatus 100 by a mounting band 108, a representative position N1 of the first operation section 102*a*, a representative position N2 of the second operation section 102*b*, and a representative position N3 of the third operation section 102*c*. FIG. 68 is a schematic diagram showing a shape of a presentation subject V. The presentation subject V is an object to be presented in the exposure section 103. As shown in the same figure, the shape of the presentation subject V can be presented to the finger F by displacing the exposure section 103 at the representative positions N1 to N3 as shown in the same figure.

The operation generation section 302 can also determine the shape of the presentation subject V based on a positional relationship between the tactile sense presentation apparatus 100 and the presentation subject. The presentation subject is a virtual object generated by VR contents, etc. FIGS. 69 to 73 are schematic diagrams showing the positional relationship between the representative positions N1 to N3 and a presentation subject W. At the representative positions N1 to N3, the shape of the presentation subject can be presented to the finger F by displacing the exposure section 103 as indicated by arrows according to the positional relationship with respect to the presentation subject W. The displacement indicated by the arrows can be determined by a distance from each representative position of the finger to an intersection of virtual rays of light emitted in a predetermined direction with a boundary surface of the presentation subject. The rays may be a spatially distributed space group of multiple rays, in which case the amount of displacement presented can be generated by an average value, a minimum value, or weighted addition value of a plurality of distances.

APPLICATION EXAMPLES

Application examples of the tactile sense presentation system 200 according to the present embodiment will be described.

Application Example 1

The tactile sense presentation apparatus 100 can be used as a fingertip mounted tactile device as shown in FIG. 67. In this mode of use, the control section 301 (see FIG. 60) can be combined with an HMD (Head Mounted Display) to generate the operation pattern that matches the contact position and a surface direction when in contact with the virtual object on the VR, and present it to the fingertip. For example, the operation pattern can be a narrow contact at a left side of the fingertip, a wide contact at a center right side, an entire contact on a tilted surface, and so on. The control section 301 acquires position information of the tactile sense presentation apparatus 100 from detection section 107 and generates the operation pattern according to the position information, which can realize the above described operation.

Application Example 2

The tactile sense presentation apparatus 100 can be used as an interface surface such as a grasping controller or a mouse. For example, the tactile sense presentation apparatus 100 with a plurality of operation sections arranged in an array as shown in FIG. 32 is suitable. In this mode of use, the control section 301 can change the operation pattern according to content of processing at the time of operation (touch or press down). For example, the operation pattern is a firing button that expands into a convex shape according to an amount of energy accumulated, a trigger of a gun having a saddle shape, or a button whose bulge moves left or right according to timing in a rhythm or golf game. All or any of the operation sections 102 may be provided with the detection section 107 that detects the contact or the press down of the finger.

Application Example 3

The tactile sense presentation apparatus 100 can be used on a surface of a wristwatch that can determine the time, etc. by visual and tactile senses. For example, a suitable tactile sense presentation apparatus 100 is one with a plurality of operation sections arranged in a circular pattern as shown in FIG. 34. In this mode of use, the control section 301 can change the operation pattern according to the content of the information being displayed. The operation pattern realizes, for example, navigation in which a convex shape faces toward a direction to go or a bulge moves toward the direction to go, or a watch in which a circumferential bulge moves in accordance with a second hand.

[Hardware Configuration of Control Apparatus]

Figure 74:
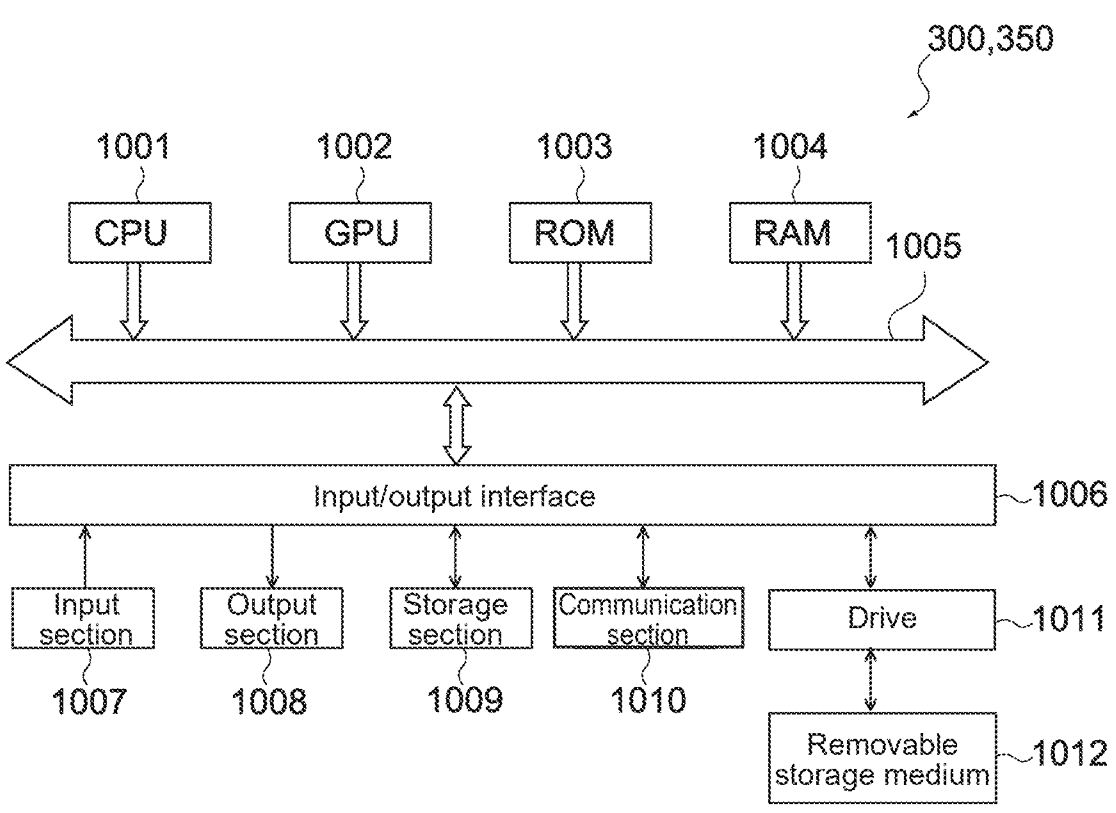
FIG. 74 A block diagram showing a hardware configuration of a control apparatus included in the tactile sense presentation system.

A hardware configuration that can realize a functional configuration of the control apparatus 300 and the control apparatus 350 will be described. FIG. 74 is a schematic diagram showing the hardware configuration.

As shown in the same figure, a CPU (Central Processing Unit) 1001 and a GPU (Graphics Processing Unit) 1002 are built in the control apparatus 300 and the control apparatus 350. An input/output interface 1006 is connected to the CPU 1001 and the GPU 1002 via a bus 1005. A ROM (Read Only Memory) 1003 and a RAM (Random Access Memory) 1004 are connected to the bus 1005.

To the input/output interface 1006, an input section 1007 including an input device such as a keyboard, a mouse, and the like into which the user inputs operation commands; an output section 1008 that outputs a processing operation screen and an image of a processing result to a display device; a storage section 1009 including a hard disk drive or the like that stores programs and various data; and a communication section 1010 including a LAN (Local Area Network) adapter or the like that executes communication processing via a network such as the Internet are connected. Also, a drive 1011 that reads and writes data to and from a removable storage medium 1012 such as a magnetic disk, an optical disk, an optical magnetic disk, or a semiconductor memory is connected.

The CPU 1001 executes various processing according to the programs stored in the ROM 1003, or programs that are read from the removable storage medium 1012 such as the magnetic disk, the optical disk, the optical magnetic disk, or the semiconductor memory, installed in the storage section 1009, and loaded from the storage section 1009 into the RAM 1004. The RAM 1004 also stores data and the like necessary for the CPU 1001 to perform the various processing. The GPU 1002 receives control by the CPU 1001 and executes calculation processing necessary for image drawing.

In the control apparatus 300 and control apparatus 350 configured as described above, a series of processing described above are performed by the CPU 1001 that loads and executes the programs stored in the storage section 1009, for example, into the RAM 1004 via the input/output interface 1006 and the bus 1005.

The programs to be executed by the control apparatus 300 and the control apparatus 350 can be provided by being recorded on the removable storage medium 1012, for example, as packaged medium. Also, the programs can also be provided via a wired or wireless transmission medium such as a local area network, the Internet, digital satellite broadcasting, or the like.

In the control apparatus 300 and the control apparatus 350, the programs can be installed in the storage section 1009 via the input/output interface 1006 by attaching the removable storage medium 1012 to the drive 1011. The program can also be received by the communication section 1010 via the wired or wireless transmission medium and installed in the storage section 1009. In addition, the programs can be installed in advance in the ROM 1003 or the storage section 1009.

The programs executed by the control apparatus 300 and the control apparatus 350 may be programs that are processed in chronological order according to a sequence described in the present disclosure, or may be programs that are processed in parallel or at necessary timing such as when a call is made. The hardware configuration of the control apparatus 300 and the control apparatus 350 needs not all be mounted on a single device, and the control apparatus 300 and the control apparatus 350 may be configured by plurality of apparatuses. Also, a portion of the hardware configuration of the control apparatus 300 and the control apparatus 350 or may be mounted on plurality of apparatuses connected via a network.

[About Present Disclosure]

The effects described in the present disclosure are only illustrative and are not limited, and there may be other effects. The description of the plurality of effects above does not necessarily mean that these effects will be achieved at the same time. It means that at least one of the effects can be obtained depending on conditions, etc., and it is possible that effects not described in the present disclosure may be achieved. It is also possible to combine at least two of the characteristic portions described in the present disclosure.

EXAMPLE

The tactile sense presentation apparatuses according to the example and the tactile sense presentation apparatus according to the comparative example were manufactured. The tactile sense presentation apparatuses according to the example had the structure shown in FIG. 14, and the length of the boundary section was 2 mm and 4 mm, respectively. The tactile sense presentation apparatus according to the comparative example had the structure shown in FIG. 14 with the length of the boundary section of 0 mm, i.e., the exposure section was directly connected to the enclosure section. The pressure in the sealed space of the first operation section (hereinafter referred to as "left sealed space") and the pressure in the sealed space of the second operation section (hereinafter referred to as "right sealed space") were varied for these three types of tactile sense presentation apparatuses, and a height of an exposure section surface in the first direction was measured using a line laser.

Figure 75:
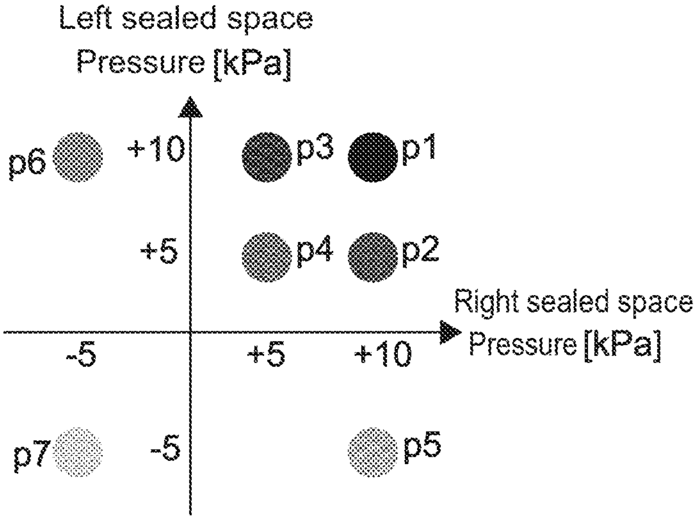
FIG. 75 A graph showing operation states of the tactile sense presentation apparatuses according to an example of the present technology and a comparative example.
Figure 76:
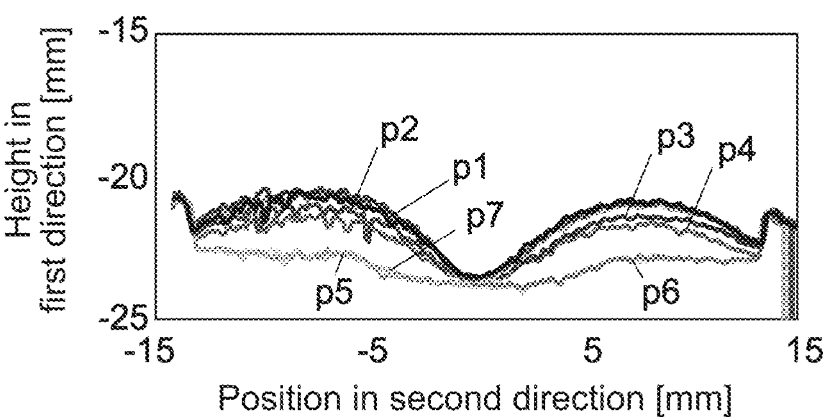
FIG. 76 A graph showing measurement results of the tactile sense presentation apparatus according to the comparative example.
Figure 77:
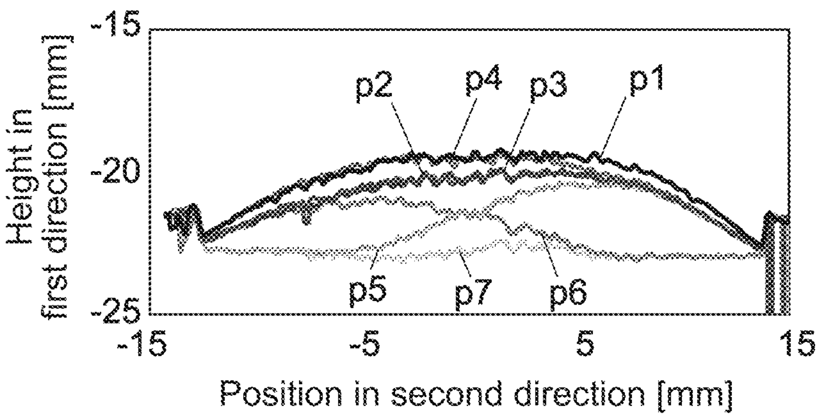
FIG. 77 A graph showing the measurement results of the tactile sense presentation apparatus according to the example.
Figure 78:
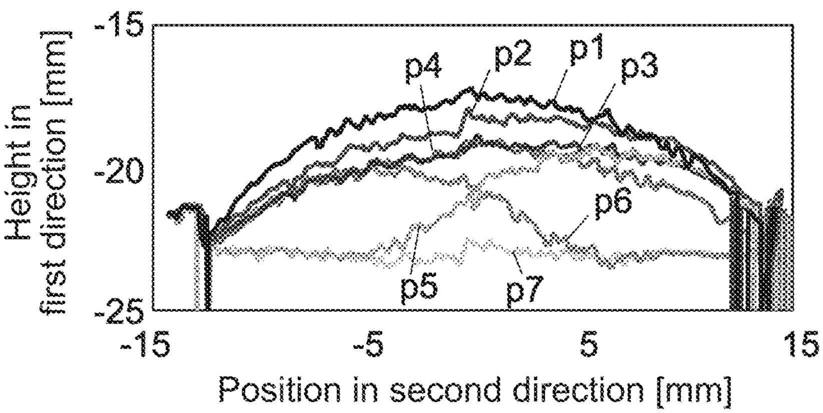
FIG. 78 A graph showing the measurement results of the tactile sense presentation apparatus according to the example.

FIG. 75 is a graph showing the pressure in the right sealed space and left sealed space. FIG. 76 is measurement results of the tactile sense presentation apparatus with the boundary section of 0 mm (comparative example), FIG. 77 is measurement results of the tactile sense presentation apparatus with the boundary section of 2 mm (example), and FIG. 78 is measurement results of the tactile sense presentation apparatus with the boundary section of 4 mm (example). In FIGS. 76 to 78, p1 to p7 correspond to the pressure in FIG. 75. As shown in FIG. 76, two protrusions are formed in the tactile sense presentation apparatus with the boundary section of 0 mm (comparative example), indicating that a pressure stimulation point is distributed. In contrast, as shown in FIGS. 77 and 78, the protrusions are not separated in the tactile sense presentation apparatus with the boundary section of 2 mm (example) and the tactile sense presentation apparatus with the boundary section of 4 mm (example), and positions thereof also change according to the pressure between the right sealed space and the left sealed space. It can also be seen that a shape change of the exposure section is increased as the length of the boundary section is increased.

Figure 79:
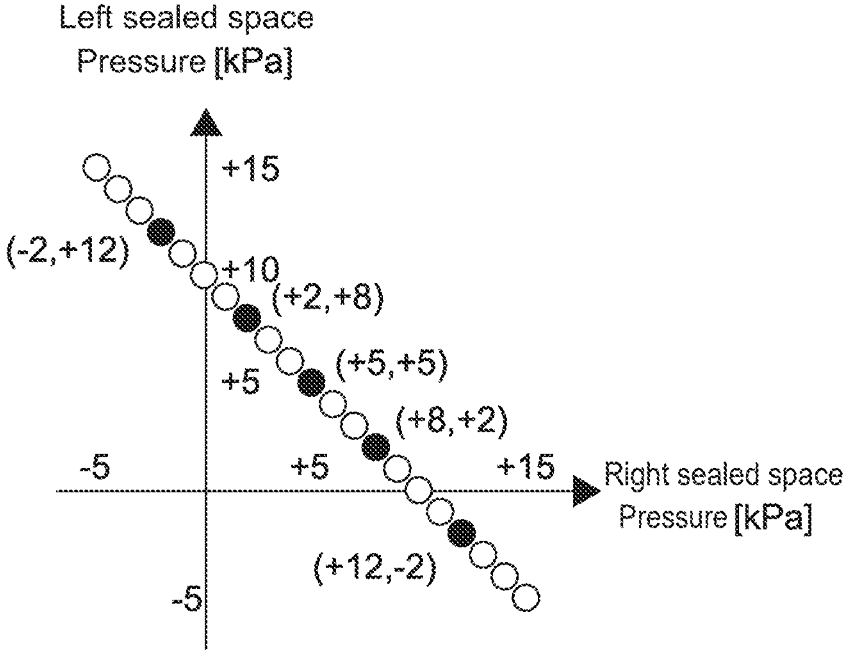
FIG. 79 A graph showing the operating state of the tactile sense presentation apparatus according to the example of the present technology.
Figure 80:
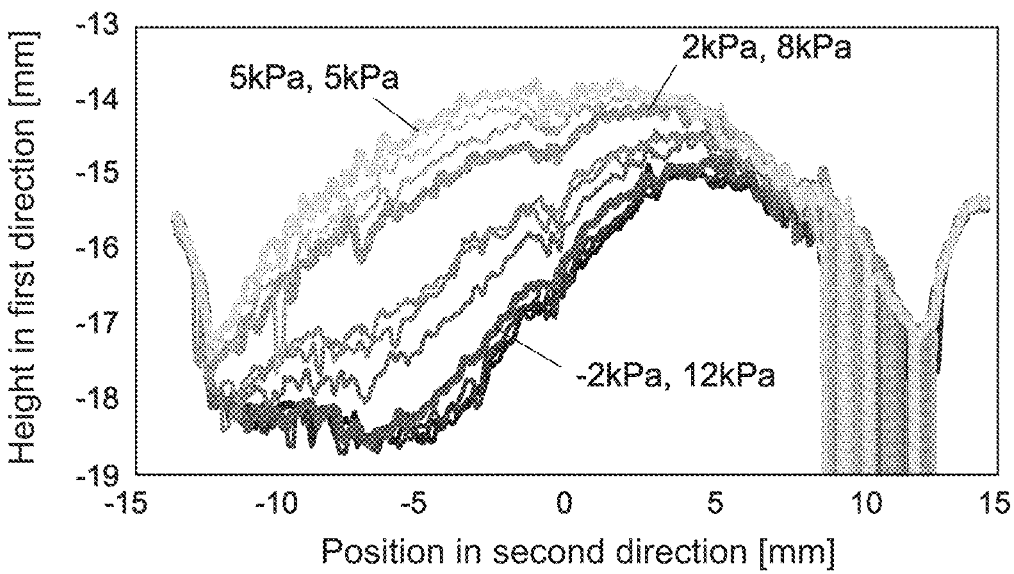
FIG. 80 A graph showing the measurement results of the tactile sense presentation apparatus.

FIG. 79 is a graph showing the pressure in the right sealed space and the left sealed space, and FIG. 80 is measurement results of the tactile sense presentation apparatuses. As shown in the same figure, the shape of the exposure section changes according to the pressure in the right sealed space and the left sealed space, and it can be seen that the shape change of the exposure section includes a component in the second direction (in right and left direction of graph). Therefore, it can be said that the position, the area, and the pressing force of the pressure stimulation can be controlled by the pressure in the right sealed space and the left sealed space.

The present technology may also have the following structures.

(1) A tactile sense presentation apparatus, including:

an enclosure section;

a plurality of operation sections including a first operation section whose height in a first direction with respect to the enclosure section changes and a second operation section whose height in the first direction with respect to the enclosure section changes; and an exposure section including a first contact portion with which the first operation section makes contact, a second contact portion with which the second operation section makes contact, and a middle portion which is a portion between the first contact portion and the second contact portion, and which is deformed along with displacement of the middle portion due to a change in the heights in the first direction of the first operation section and the second operation section, in which the displacement of the middle portion includes a component in the first direction.

(2) The tactile sense presentation apparatus according to (1), in which the exposure section includes a component in a second direction perpendicular to the first direction in the displacement of the middle portion.

(3) The tactile sense presentation apparatus according to (1) or (2), in which the exposure section has flexibility.

(4) The tactile sense presentation apparatus according to any one of (1) to (3), in which the enclosure section has a placement surface that faces the exposure section, on which the plurality of operation sections are placed, and the placement surface is a concave surface.

(5) The tactile sense presentation apparatus according to any one of (1) to (4), in which at least one of the plurality of operation sections has a drive section whose height in the first direction is changed by electromagnetic force, and a flexible section placed between the drive section and the exposure section and having flexibility.

(6) The tactile sense presentation apparatus according to any one of (1) to (5), in which at least one of the plurality of operation sections is filled with fluid, and the height in the first direction changes due to a change in volume or pressure of the fluid.

(7) The tactile sense presentation apparatus according to (6), further including:

a boundary section that is placed between the first operation section and the second operation section and separates the fluid between the first operation section and the second operation section.

(8) The tactile sense presentation apparatus according to (7), in which the boundary section connects the enclosure section and the exposure section.

(9) The tactile sense presentation apparatus according to (8), in which a thickness of a portion of the boundary section connected to the exposure section is 3 mm or less.

(10) The tactile sense presentation apparatus according to (8), in which the boundary section has a bellows structure.

(11) The tactile sense presentation apparatus according to (10), in which the enclosure section has a concave portion that accommodates the boundary section when the bellows structure of the boundary section is folded.

(12) The tactile sense presentation apparatus according to (10), in which the exposure section has a concave portion that accommodates the boundary section when the bellows structure of the boundary section is folded.

(13) The tactile sense presentation apparatus according to any one of (8) to (12), in which tensile strength of the exposure section is greater than tensile strength of the boundary section.

(14) The tactile sense presentation apparatus according to any one of (6) to (13), in which the fluid is air.

(15) A tactile sense presentation system, including:

a tactile sense presentation apparatus, including an enclosure section, a plurality of operation sections including a first operation section whose height in a first direction with respect to the enclosure section changes and a second operation section whose height in the first direction with respect to the enclosure section changes, and an exposure section including a first contact portion with which the first operation section makes contact, a second contact portion with which the second operation section makes contact, and a middle portion which is a portion between the first contact portion and the second contact portion, and which is deformed along with displacement of the middle portion due to a change in the heights in the first direction of the first operation section and the second operation section, in which the displacement of the middle portion includes a component in the first direction; and a control apparatus that determines respective control parameters of the plurality of operation sections based on the respective representative positions of the plurality of operation sections when one of the plurality of operation sections is most distant from the enclosure, the other of the plurality of operation sections is closest to the enclosure, and a position where the exposure section protrudes most is the representative position of the one of the operation sections.

(16) The tactile sense presentation system according to (15), in which the control apparatus determines the respective control parameters of the plurality of operation sections based on a presentation position that is a position at which the height in the first direction is to be highest in the exposure section, and the respective representative positions of the plurality of operation sections.

(17) The tactile sense presentation system according to (16), in which the control apparatus determines the respective control parameters of the plurality of operation sections based on a distance between the presentation position and the respective representative positions of the plurality of operation sections.

(18) The tactile sense presentation system according to (16), in which the control apparatus determines the respective control parameters of the plurality of operation sections based on the presentation position, the respective representative positions of the plurality of operation sections, and an area of a presentation region when the presentation region is a region where the height in the first direction is to be above a certain level in the exposure section.

(19) The tactile sense presentation system according to (15), in which the control apparatus determines the respective control parameters of the plurality of operation sections based on a shape of a presentation subject that is a shape of an object to be presented in the exposure section and the respective representative positions of the plurality of operation sections.

(20) The tactile sense presentation system according to (19), in which the control apparatus determines the shape of the presentation subject based on a positional relationship between the presentation subject that is a virtual object and the tactile sense presentation apparatus.

REFERENCE SIGNS LIST

100, 120, 150 tactile sense presentation apparatus
101, 121, 151 enclosure section
102, 122, 152 operation section
103, 123, 153 exposure section
104, 131, 155 placement surface
106, 124, 154 boundary section
111, 141, 161 contact portion
112, 142, 162 middle portion
200 tactile sense presentation system
300, 350 control apparatus
301 control section
302 operation generation section
303 communication section

The invention claimed is:

1. A tactile sense presentation apparatus, comprising:

an enclosure section;

a plurality of operation sections including a first operation section and a second operation section, wherein the first operation section is configured to change a first height of the first operation section in a first direction with respect to the enclosure section, and the second operation section is configured to change a second height of the second operation section in the first direction with respect to the enclosure section; and an exposure section including a first contact portion, a second contact portion, and a middle portion, wherein the first operation section is in contact with the first contact portion, the second operation section is in contact with the second contact portion, the middle portion is between the first contact portion and the second contact portion, the middle portion is configured to deform along with displacement of the middle portion, the deformation of the middle portion is based on the change in the first height and the change in the second height, and the displacement of the middle portion includes a first component in the first direction.

2. The tactile sense presentation apparatus according to claim 1, wherein the displacement of the middle portion further includes a second component in a second direction, and the second direction is perpendicular to the first direction.

3. The tactile sense presentation apparatus according to claim 1, wherein the exposure section is flexible.

4. The tactile sense presentation apparatus according to claim 1, wherein the enclosure section includes a placement surface, the placement surface faces the exposure section, the plurality of operation sections are on the placement surface, and the placement surface is a concave surface.

5. The tactile sense presentation apparatus according to claim 1, wherein at least one operation section of the plurality of operation sections comprises a drive section and a flexible section, the drive section is configured to change a third height, of the drive section, in the first direction is changed by based on electromagnetic force, the flexible section is between the drive section and the exposure section, and the flexible section is flexible.

6. The tactile sense presentation apparatus according to claim 1, wherein the first operation section comprises a fluid, and the first height in the first direction changes based on a change in one of a volume or a pressure of the fluid.

7. The tactile sense presentation apparatus according to claim 6, further comprising:

a boundary section between the first operation section and the second operation section, wherein the boundary section is configured to separate the first operation section and the second operation section.

8. The tactile sense presentation apparatus according to claim 7, wherein the boundary section is further configured to connect the enclosure section and the exposure section.

9. The tactile sense presentation apparatus according to claim 8, wherein a thickness of a portion, of the boundary section, connected to the exposure section is 3 mm or less.

10. The tactile sense presentation apparatus according to claim 8, wherein the boundary section comprises a bellows structure.

11. The tactile sense presentation apparatus according to claim 10, wherein the enclosure section includes a concave portion, and the concave portion is configured to accommodate the boundary section in a case where the bellows structure of the boundary section is folded.

12. The tactile sense presentation apparatus according to claim 10, wherein the exposure section includes a concave portion, and the concave portion is configured to accommodate the boundary section in a case where the bellows structure of the boundary section is folded.

13. The tactile sense presentation apparatus according to claim 8, wherein tensile strength of the exposure section is greater than tensile strength of the boundary section.

14. The tactile sense presentation apparatus according to claim 6, wherein the fluid is air.

15. A tactile sense presentation system, comprising:

a tactile sense presentation apparatus, including:

an enclosure section;

a plurality of operation sections including a first operation section and a second operation section, wherein the first operation section is configured to change a first height of the first operation section in a first direction with respect to the enclosure section, and the second operation section is configured to change a second height of the second operation section in the first direction with respect to the enclosure section changes; and an exposure section including a first contact portion, a second contact portion, and a middle portion, wherein the first operation section is in contact with the first contact portion, the second operation section is in makes contact with the second contact portion, the middle portion between the first contact portion and the second contact portion, the middle portion is configured to deform along with displacement of the middle portion, the deformation of the middle portion is based on the change in the first height and the change in the second height, and the displacement of the middle portion includes a first component in the first direction; and a control apparatus configured to determine respective control parameters of the plurality of operation sections based on respective representative positions of the plurality of operation sections, wherein the respective control parameters are determined in a case where the first operation section of the plurality of operation sections is most distant from the enclosure section and the second operation section of the plurality of operation sections is closest to the enclosure section, and a position where the exposure section protrudes most is a representative position of the first operation section.

16. The tactile sense presentation system according to claim 15, wherein the control apparatus is further configured to the respective control parameters of the plurality of operation sections based on a presentation position and the respective representative positions of the plurality of operation sections, and the presentation position is a position at which a third height in the first direction is highest in the exposure section.

17. The tactile sense presentation system according to claim 16, wherein the control apparatus is further configured to determine the respective control parameters of the plurality of operation sections based on a respective distance between the presentation position and the respective representative positions of the plurality of operation sections.

18. The tactile sense presentation system according to claim 16, wherein the control apparatus is further configured to determine the respective control parameters of the plurality of operation sections based on:

the presentation position, the respective representative positions of the plurality of operation sections, and an area of a presentation region where a fourth height in the first direction is above a specific level in the exposure section.

19. The tactile sense presentation system according to claim 15, wherein the control apparatus is further configured to determine the respective control parameters of the plurality of operation sections based on:

a shape of a presentation subject, wherein the presentation subject is an object presented in the exposure section, and the respective representative positions of the plurality of operation sections.

20. The tactile sense presentation system according to claim 19, wherein the control apparatus is further configured to determine the shape of the presentation subject based on a positional relationship between the presentation subject and the tactile sense presentation apparatus, and the presentation subject is a virtual object.

* * * * *